(12) United States Patent
Cho et al.

(10) Patent No.: US 12,446,198 B2
(45) Date of Patent: Oct. 14, 2025

(54) ELECTRONIC DEVICE INCLUDING SLIDING STRUCTURE AND FLEXIBLE DISPLAY

(71) Applicant: Samsung Electronics Co., Ltd., Suwon-si (KR)

(72) Inventors: Hyoungtak Cho, Suwon-si (KR); Bohyeon Kim, Suwon-si (KR); Hyunggwang Kang, Suwon-si (KR); Hojin Jung, Suwon-si (KR); Hyunju Hong, Suwon-si (KR); Yangwook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 18/446,436

(22) Filed: Aug. 8, 2023

(65) Prior Publication Data

US 2023/0389243 A1  Nov. 30, 2023

Related U.S. Application Data

(63) Continuation of application No. PCT/KR2022/017584, filed on Nov. 9, 2022.

(30) Foreign Application Priority Data

Nov. 9, 2021  (KR) .......................... 10-2021-0152953

(51) Int. Cl.
*H05K 7/20* (2006.01)
*G06F 1/16* (2006.01)
(Continued)

(52) U.S. Cl.
CPC ....... *H05K 7/20963* (2013.01); *G06F 1/1624* (2013.01); *G06F 1/1652* (2013.01);
(Continued)

(58) Field of Classification Search
CPC .............. H05K 7/20963; H05K 5/0217; G06F 1/1624; G06F 1/1652; H02K 7/003; H02K 7/116; H04M 1/0235; H04M 1/0268
(Continued)

(56) References Cited

U.S. PATENT DOCUMENTS 9,080,279 B2   7/2015  Jun et al.
10,747,269 B1  8/2020  Choi et al.
(Continued)

FOREIGN PATENT DOCUMENTS

CN    101426037    5/2009
CN    209283315 5  8/2019
(Continued)

OTHER PUBLICATIONS

International Search Report for PCT/KR2022/017584 mailed Jan. 31, 2023, 3 pages.
(Continued)

*Primary Examiner* — Zhengfu J Feng
(74) *Attorney, Agent, or Firm* — Nixon & Vanderhye, P.C.

(57) ABSTRACT

According to an embodiment of the disclosure, an electronic device may include: a first housing, a second housing, a first support, a second support, a flexible display, a motor assembly including a motor, and a first thermal conductive member including a thermally conductive material. The second housing may be slidable relative to the first housing. The first support may be positioned in the first housing. The second support may be positioned in the second housing. The flexible display may include a first area and a second area configured to extend from the first area. The first area may be disposed on the first support and be configured to be visible to the outside of the electronic device. The second area may be configured to, during sliding of the second
(Continued)

housing, be withdrawn from or inserted into an inner space of the electronic device while being supported by the second support. The motor assembly may be connected to the second support through a bracket disposed on the second support and be configured to provide a drive force for sliding of the second housing. The first thermal conductive member may be disposed on the first support. Based on the second area being inserted in the inner space of the electronic device, the bracket may be configured to be in contact with the first thermal conductive member.

20 Claims, 25 Drawing Sheets

(51) Int. Cl.
*H02K 7/00* (2006.01)
*H02K 7/116* (2006.01)
*H04M 1/02* (2006.01)
*H05K 5/02* (2006.01)

(52) U.S. Cl.
CPC ............ *H02K 7/003* (2013.01); *H02K 7/116* (2013.01); *H04M 1/0235* (2013.01); *H04M 1/0268* (2013.01); *H05K 5/0217* (2013.01)

(58) Field of Classification Search
USPC ........................................ 361/707
See application file for complete search history.

(56) References Cited

U.S. PATENT DOCUMENTS

| | | | |
|---|---|---|---|
| 11,194,363 | B2 | 12/2021 | Kim et al. |
| 11,775,016 | B2 | 10/2023 | Choi et al. |
| 2014/0042867 | A1 | 2/2014 | Hui |
| 2018/0014417 | A1* | 1/2018 | Seo ..................... G09F 9/301 |
| 2019/0273421 | A1 | 9/2019 | Velderman et al. |
| 2020/0107458 | A1* | 4/2020 | Park ..................... H05K 3/0061 |
| 2022/0155823 | A1* | 5/2022 | Shin ..................... G09F 9/301 |
| 2022/0253103 | A1* | 8/2022 | Choi ..................... G06F 1/1624 |
| 2023/0098597 | A1* | 3/2023 | Gao ..................... H05K 5/0217 361/807 |

FOREIGN PATENT DOCUMENTS

| | | |
|---|---|---|
| CN | 112118718 | 12/2020 |
| CN | 112640597 | 4/2021 |
| CN | 113329590 | 8/2021 |
| KR | 20080085252 A | 9/2008 |
| KR | 20130044762 A | 5/2013 |
| KR | 20190004618 A | 1/2019 |
| KR | 20190062855 A | 6/2019 |
| KR | 20210114533 A | 9/2021 |
| WO | 2020256183 A1 | 12/2020 |
| WO | 2021/015310 6 | 1/2021 |
| WO | 2021015310 A1 | 1/2021 |

OTHER PUBLICATIONS

Written Opinion of the ISA for PCT/KR2022/017584 mailed Jan. 31, 2023, 4 pages.

* cited by examiner

ELECTRONIC DEVICE INCLUDING SLIDING STRUCTURE AND FLEXIBLE DISPLAY

CROSS-REFERENCE TO RELATED APPLICATIONS

This application is a continuation of International Application No. PCT/KR2022/017584 designating the United States, filed on Nov. 9, 2022, in the Korean Intellectual Property Receiving Office and claiming priority to Korean Patent Application No. 10-2021-0152953, filed on Nov. 9, 2021, in the Korean Intellectual Property Office, the disclosures of which are incorporated by reference herein in their entireties.

BACKGROUND

Field

The disclosure relates to an electronic device including a sliding structure and a flexible display.

Description of Related Art

In line with development of digital technologies, electronic devices have been provided in various types such as a smartphone, a tablet personal computer, or a personal digital assistant. Electronic devices tend to be designed to provide larger screens while having portable sizes that do not inconvenience users' hands. Electronic devices may be implemented to be able to expand screens in a sliding type, for example.

The information described above may be provided as the related art for the purpose of enhancing the understanding of the disclosure. No assertion or determination is made with respect to the applicability of any of the above-mentioned as the prior art related to the disclosure.

An electronic device may include a heat dissipation structure (for example, a cooling system) for heating management. The heat dissipation structure may distribute or diffuse heat generated by current consumption in at least one component, for example, to another location, thereby reducing performance degradation or damage related to at least one component. When an electronic device is implemented to be able to expand the screen in a sliding type, structural characteristics related to sliding operations may place restrictions on positioning the heat dissipation structure in the electronic device.

SUMMARY

Embodiments of the disclosure address at least the above-mentioned problems and/or disadvantages and to provide at least the advantages described below. Accordingly, embodiments of the disclosure provide an electronic device including a sliding structure and a flexible display, wherein an electronic device configured to be able to expand the screen in a sliding type includes a heat dissipation structure.

In accordance with an example embodiment of the disclosure, an electronic device may include: a first housing, a second housing, a first support, a second support, a flexible display, a motor assembly including a motor, and a first thermal conductive member comprising a thermally conductive material. The second housing may be slidable relative to the first housing. The first support may be positioned in the first housing. The second support may be positioned in the second housing. The flexible display may include a first area and a second area configured to extend from the first area. The first area may be disposed on the first support and be configured to be visible to the outside of the electronic device. The second area may be configured to, during sliding of the second housing, be withdrawn from or inserted into an inner space of the electronic device while being supported by the second support. The motor assembly may be connected to the second support through a bracket disposed on the second support and be configured to provide a drive force for sliding of the second housing. The first thermal conductive member may be disposed on the first support. Based on the second area being inserted in the inner space of the electronic device, the bracket may be configured to be in contact with the first thermal conductive member.

According to an example embodiment of the disclosure, an electronic device may include: a first housing, a second housing, a first support, a second support, a flexible display, a motor assembly including a motor, and a first thermal conductive member comprising a thermally conductive material. The second housing may be slidable relative to the first housing. The first support may be positioned in the first housing. The second support may be positioned in the second housing. The flexible display may include a first area and a second area configured to extend from the first area. The first area may be disposed on the first support member and be configured to be visible to the outside of the electronic device. The second area may be configured to, during sliding of the second housing, be withdrawn from or inserted into an inner space of the electronic device while being supported by the second support. The motor assembly may be connected to the second support through a bracket disposed on the second support and be configured to provide a drive force for sliding of the second housing. The first thermal conductive member may be disposed on the first support. Based on the second area being inserted in the inner space of the electronic device, the first support may be configured to be in contact with the first thermal conductive member.

An electronic device including a sliding structure and a flexible display according to various example embodiments of the disclosure may diffuse or distribute heat generated by a motor configured to provide a driving force to the sliding structure for screen expansion or screen reduction to the periphery, thereby reducing performance degradation or damage related to the motor, and may reduce vibration or noise that may occur in the electronic device due to motor driving.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout are drawings, it should be noted that like reference numbers are used to depict the same or similar elements, features, and structure.

DETAILED DESCRIPTION

Hereinafter, various example embodiments of the disclosure will be described in greater detail with reference to the accompanying drawings.

Figure 1:
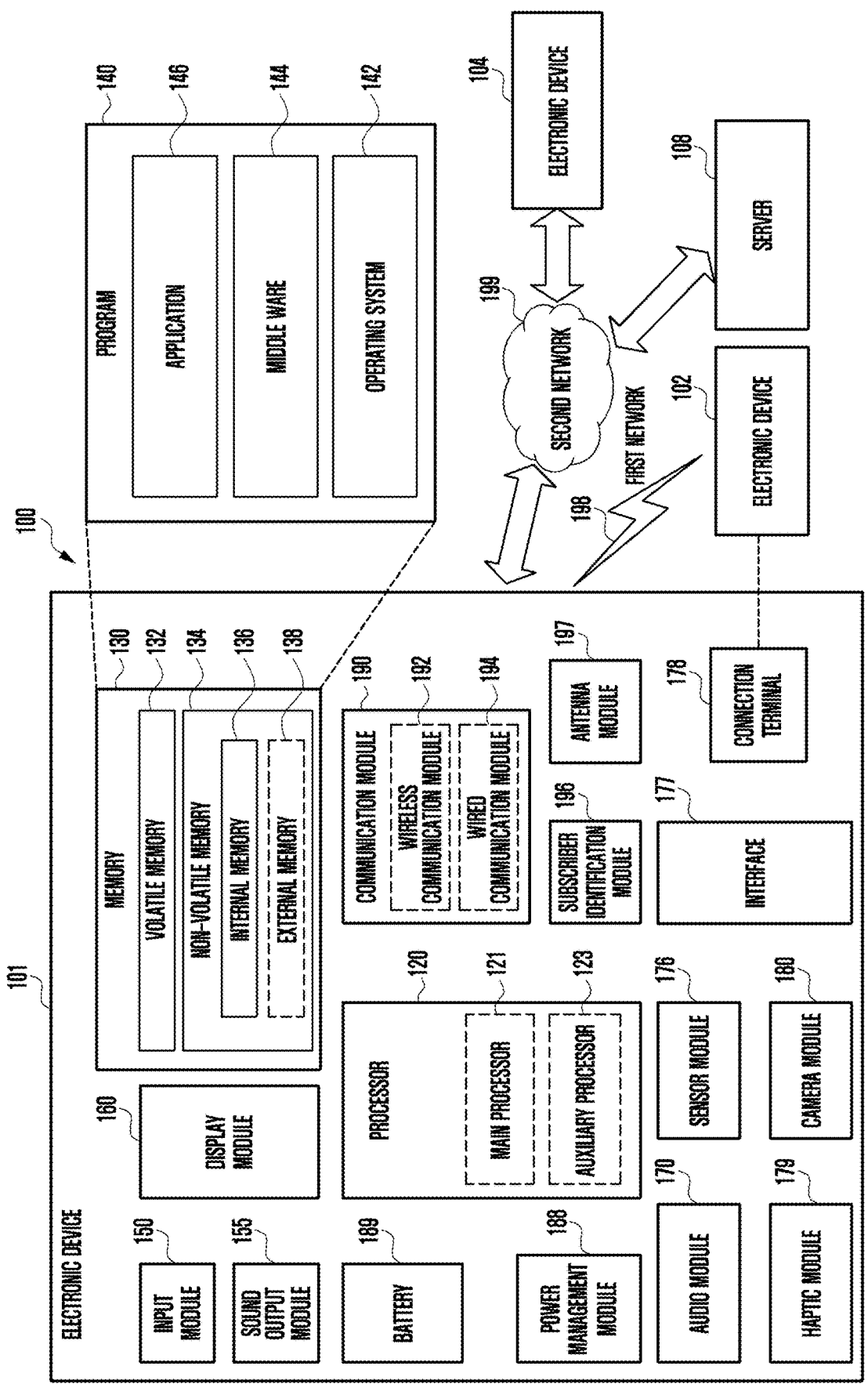
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, and/or an antenna module 197. In various embodiments of the disclosure, at least one (e.g., the connection terminal 178) of the components may be omitted from the electronic device 101, or one or more other components may be added in the electronic device 101. In various embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connection terminal 178 may include a connector via which the electronic device 101 may be physically connected with the external electronic device (e.g., the external electronic device 102). The connection terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a millimeter wave (mmWave) band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beamforming, or large-scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate for implementing eMBB (e.g., 20 gigabits per second (Gbps) or more), loss coverage for implementing mMTC (e.g., 164 decibels (dB) or less), or U-plane latency for realizing URLLC (e.g., 0.5 milliseconds (ms) or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form an mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., an mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices (e.g., external electronic devices 102 and 104, or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In an embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
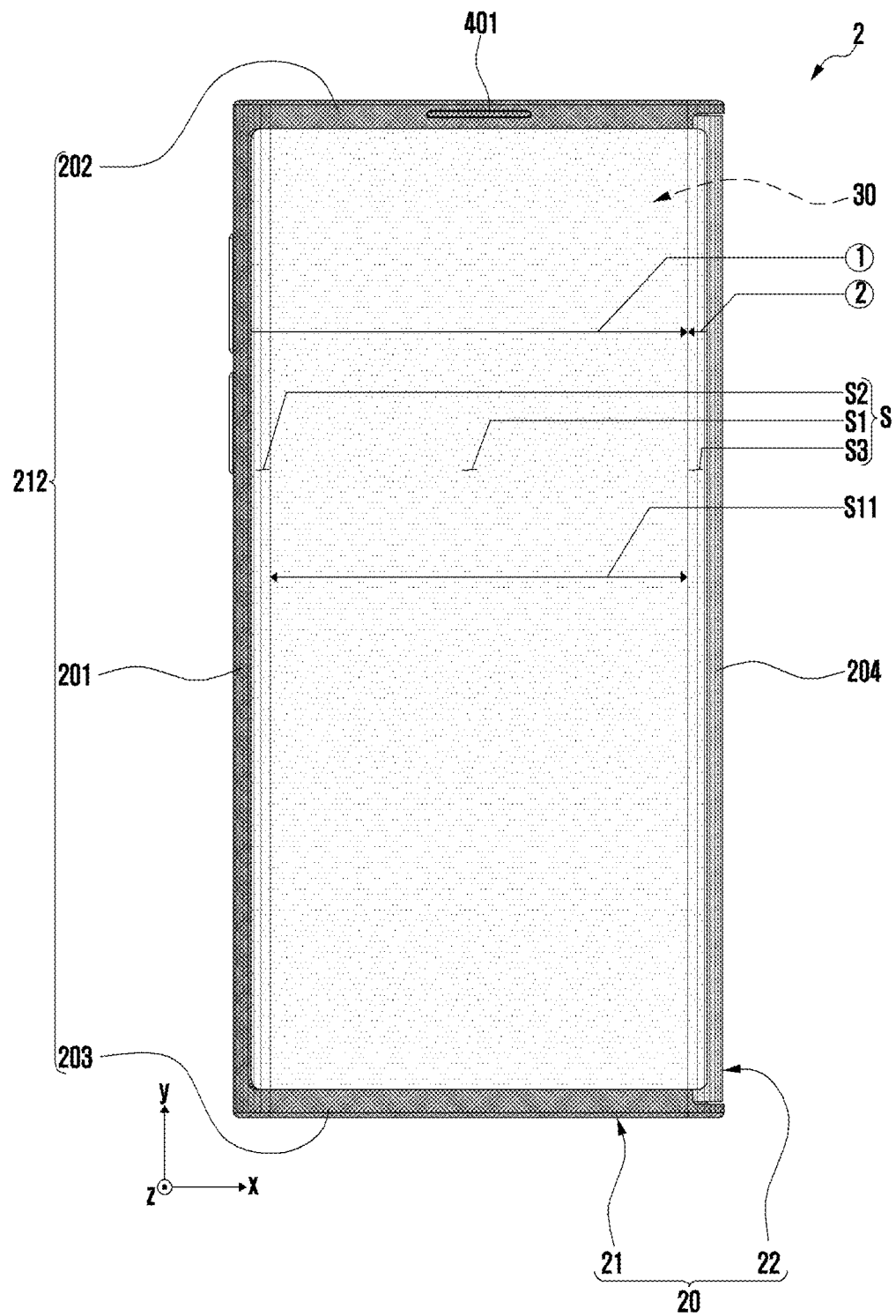
FIG. 2 is a diagram illustrating a front view of an electronic device in a closed state according to various embodiments.
Figure 3:
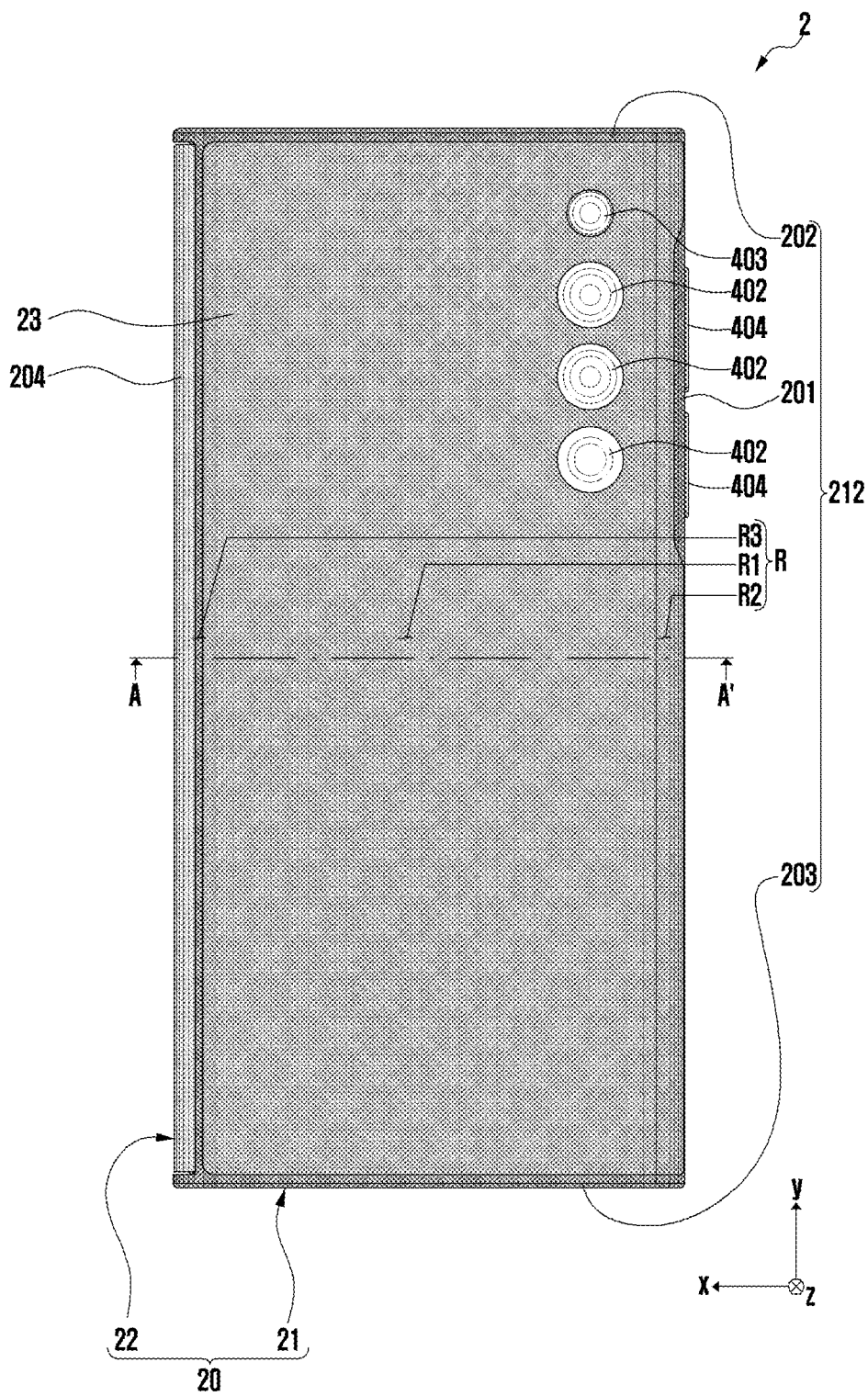
FIG. 3 is a diagram illustrating a rear view of an electronic device in a closed state according to various embodiments.
Figure 4:
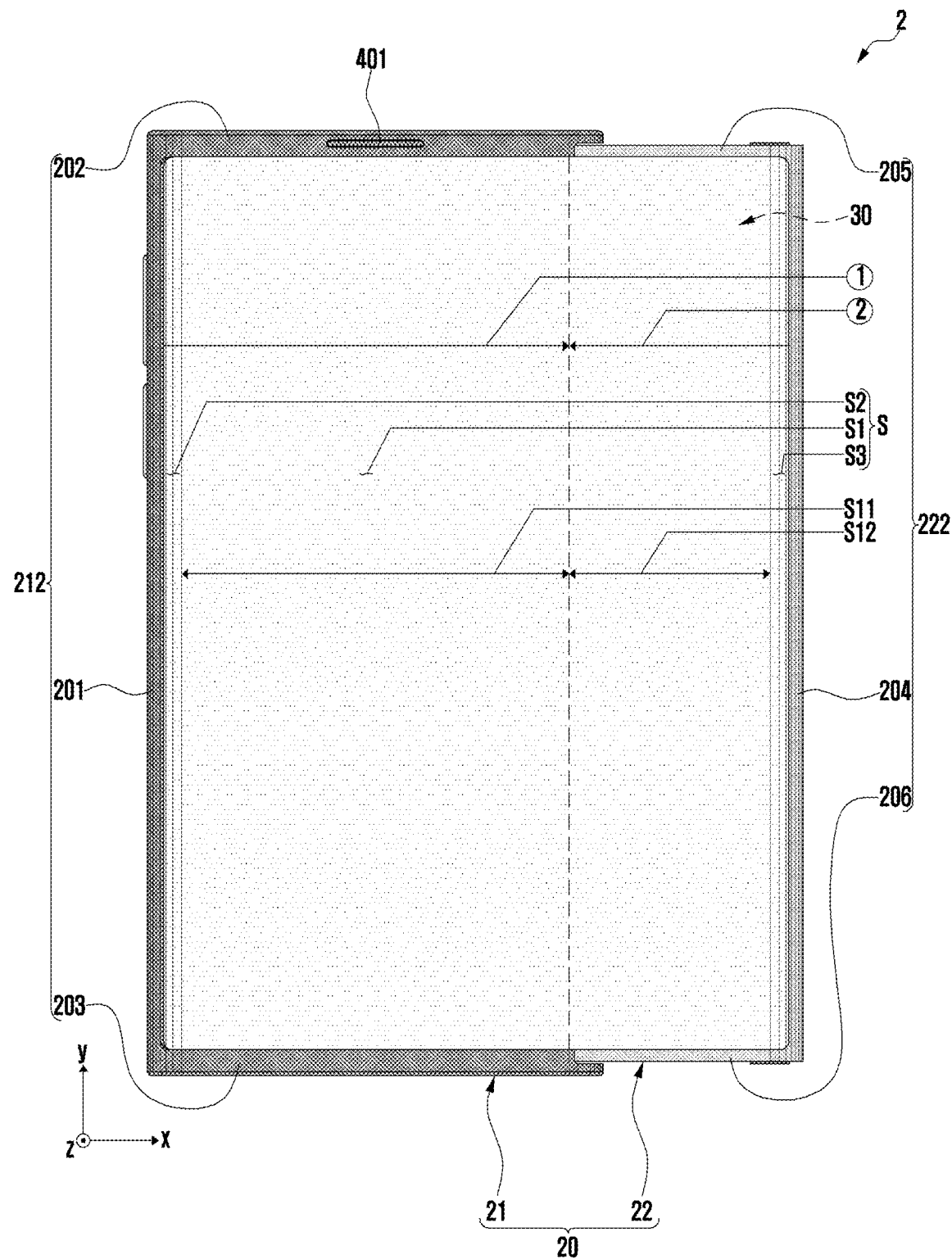
FIG. 4 is a diagram illustrating a front view of an electronic device in an open state according to various embodiments.
Figure 5:
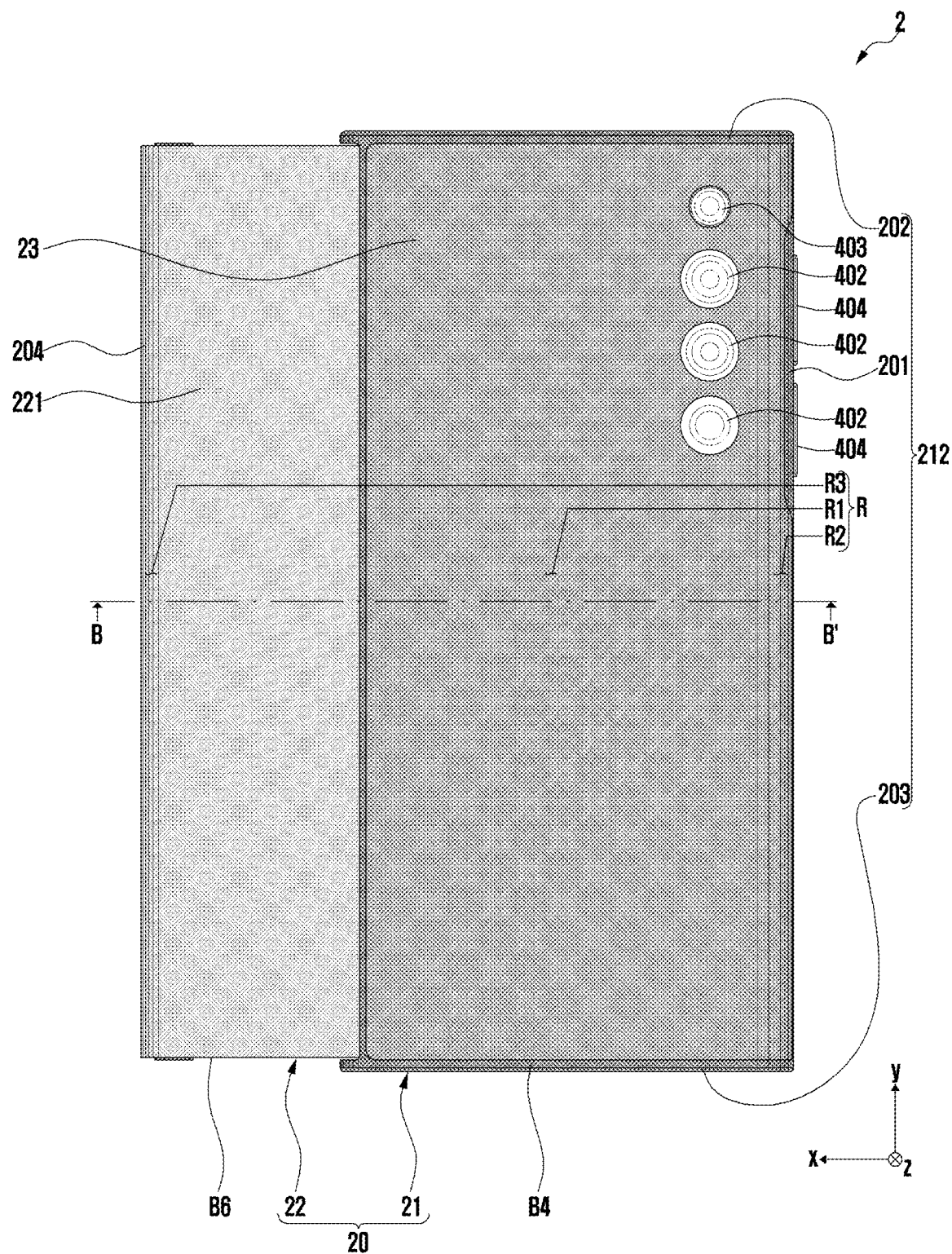
FIG. 5 is a diagram illustrating a rear view of an electronic device in an open state according to various embodiments.

FIG. 2 is a diagram illustrating a front view of an electronic device (e.g., a slidable electronic device) 2 in a closed state according to various embodiments. FIG. 3 is a diagram illustrating a rear view of an electronic device 2 in a closed state according to various embodiments. FIG. 4 is a diagram illustrating a front view of an electronic device 2 in an open state according to various embodiments. FIG. 5 is a diagram illustrating a rear view of an electronic device 2 in an open state according to various embodiments. In various embodiments of the disclosure, for the convenience of explanation, a surface oriented in the direction (for example, the +z-axis direction), in which a screen S is visually exposed, is interpreted and used as the front surface of the electronic device 2, and a surface oriented in the direction (for example, the −z-axis direction) opposite thereto is interpreted and used as the rear surface of the electronic device 2. As used herein with reference to the display or screen, the terms "exposed", "visually exposed", "visible" and the like may be used interchangeably and include a display having a cover glass, cover layer, protective layer, or the like.

Referring to FIGS. 2, 3, 4, and 5, the electronic device 2 may include a housing (or a housing structure) 20 and a flexible display 30. The housing 20 may include a first housing (or a first housing part or a first housing structure) 21 and a second housing (or a second housing part or a second housing structure) 22. The second housing 22 may be slidable relative to the first housing 21. A sliding structure for sliding the second housing 22 may be provided between the first housing 21 and the second housing 22. For example, the sliding structure may include a guide rail, and a slide or a roller which is guided and moved by the guide rail. In addition, the sliding structure may be implemented in various other types. The flexible display 30 may form the screen (a display area, or an active area) S which is visible to the outside of the electronic device 2. The flexible display 30 may include a first area ① corresponding to the first housing 21, and a second area ② extending from the first area ① and corresponding to the second housing 22. At least a part of the second area ② may be withdrawn to the outside of the electronic device 2 or inserted into the inside of the electronic device 2 according to sliding of the second housing 22, and thus the size of the screen S may be changed. The second area ② may be a portion of the flexible display 30, which is bent in a state change (e.g., the switching between a closed state and an open state) of the electronic device 2, and may be referred to as other terms such as, for example, "a bendable area" or "a bendable section". FIG. 2 illustrates the electronic device 2 in a state where the screen S is not expanded, and FIG. 4 illustrates the electronic device 2 in a state where the screen S is expanded. The state where the screen S is not expanded may be a state where the second housing 22 is not moved relative to the first housing 21 in a first direction (e.g., the +x-axis direction), and may be referred to as a closed state of the electronic device 2. The state where the screen S is expanded may be a state where the second housing 22 is no longer moved in the first direction, that is, maximally moved, and may be referred to as an open state of the electronic device 2. In various embodiments, an open state may include a fully open state (see FIG. 4) or an intermediate state. The intermediate state may indicate a state between a closed state (see FIG. 2) and a fully open state. In various embodiments, the case where the second housing 22 is at least partially moved relative to the first housing 21 in the first direction may be referred to as "a slide-out" of the second housing 22. In various embodiments, the case where the second housing 22 is at least partially moved relative to the first housing 21 in a second direction (e.g., the −x-axis direction) opposite to the first direction may be referred to as "a slide-in" of the second housing 22. Hereinafter, the first direction may be referred to as "a slide-out direction, and the second direction may be referred to as "a slide-in direction". In the electronic device 2 having the screen S which is expandable corresponding to a slide-out of the second housing part 22, the flexible display 30 may be referred to as other terms such as "an expandable display", "a slidable a display", or "a slide-out display".

According to an embodiment, the flexible display 30 may include a touch sensor (or a touch detection circuit) configured to detect a touch. In various embodiments, the flexible display 30 may include a pressure sensor configured to measure the intensity of a force generated by the touch. In various embodiments, the flexible display 30 may include an electromagnetic induction panel (e.g., a digitizer) for detecting a magnetic field type pen input device (e.g., an electronic pen or a stylus pen), or may be coupled to an electromagnetic induction panel.

According to an embodiment, the screen S may include a first flat-surface part S1, a first curved-surface part S2, and/or a second curved-surface part S3. The first flat-surface part S1 may be positioned between the first curved-surface part S2 and the second curved-surface part S3. The first curved-surface part S2 and the second curved-surface part S3 may have a shape of being bent from the first flat-surface part S1 toward a rear surface R of the electronic device 2. The first curved-surface part S2 and the second curved-surface part S3 may be substantially symmetrical while having the first flat-surface part S1 interposed therebetween. The first flat-surface part S1 may be expanded or reduced according to a state change (e.g., the switching between a closed state and an open state) of the electronic device 2. A portion of the second area ② of the flexible display 30, which forms the second curved-surface part S3 may be changed according to a state change of the electronic device 2, and the second curved-surface part S3 may be provided in substantially the same shape even in case that a state of the electronic device 2 changes. In a closed state or an open state of the electronic device 2, the first curved-surface part S2 may be positioned at the side opposite to the second curved-surface part S3, and thus may improve aesthetic impression of the screen S. According to various embodiments, the first flat-surface part S1 may also be implemented in an expanded form without the first curved-surface part S2. The housing 20 may form the rear surface R of the electronic device 2, which is positioned at the side opposite to the screen S. For example, the rear surface R of the electronic device 2 may form a second flat-surface part R1, a third curved-surface part R2, and/or a fourth curved-surface part R3. In a closed state of the electronic device 2, the second flat-surface part R1 may be positioned to correspond to the first flat-surface part S1 of the screen S, and may be substantially parallel to the first flat-surface part S1. The third curved-surface part R2 may have a shape of being bent from the second flat-surface part R1 toward the first curved-surface part S2 to correspond to the first curved-surface part S2 of the screen S. The fourth curved-surface part R3 may have a shape of being bent from the second flat-surface part R1 toward the second curved-surface part S3 to correspond to the second curved-surface part S3 of the screen S.

According to an embodiment, the first housing 21 may include a first plate (e.g., the first plate 211 in FIG. 6 or 7), a first side wall structure 212 extending from the first plate, and/or a back cover 23. When seen from above the screen S (e.g., when seen in the −z-axis direction), the first plate may overlap the screen S. The first side wall structure 212 may include a first side wall 201, a second side wall 202, and a third side wall 203. The first side wall 201 may be positioned to correspond to the first curved-surface part S2 of the screen S. The second side wall 202 may extend from one end of the first side wall 201, and may be positioned to correspond to an edge area of one side of the screen S, which connects one end of the first curved-surface part S2 and one end of the second curved-surface part S3. The third side wall 203 may extend from the other end of the first side wall 201, and may be positioned to correspond to an edge area of the other side of the screen S, which connects the other end of the first curved-surface part S2 and the other end of the second curved-surface part S3. The first housing 21 may have a first space (e.g., the first space 214 in FIG. 6 or 7) formed by the first plate and the first side wall structure 212. For example, the first plate, the first side wall 201, the second side wall 202, and the third side wall 203 may be integrally formed, and may include the same material (e.g., a metal material such as aluminum, stainless steel (STS), or magnesium, or a non-metal material such as polymer). The back cover 23 may be disposed on or coupled to the first plate so as to form a part of the rear surface of the electronic device 2.

According to an embodiment, the second housing 22 may include a second plate 221 and a second side wall structure 222 extending from the second plate 221. The second housing 22 may be positioned in the first space (e.g., the space formed by the first plate 211 (refer to FIG. 6 or 7) and the first side wall structure 212) of the first housing 21. When seen from above the screen S (e.g., when seen in the −z-axis direction), the second plate 221 may overlap the screen S. When seen from above the screen S, the area, in which the first plate and the second plate 221 overlap each other, may decrease in case of a slide-out of the second housing 22 and increase in case of a slide-in thereof. The second side wall structure 222 may include a fourth side wall 204, a fifth side wall 205, and a sixth side wall 206. The fourth side wall 204 may be positioned to correspond to the second curved-surface part S3 of the screen S. When seen from above the screen S, the fourth side wall 204 may be positioned to be spaced apart from the first side wall 201 of the first housing 21 in the slide-out direction (e.g., the +x-axis direction). The fifth side wall 205 may extend from one end of the fourth side wall 204, and may be positioned to correspond to an edge area of one side of the screen S, which connects one end of the first curved-surface part S2 and one end of the second curved-surface part S3. When seen in a direction orthogonal to the slide-out direction and orthogonal to the direction (e.g., +the z-axis direction) in which the screen S is oriented (e.g., when seen in the y-axis direction), the fifth side wall 205 may overlap the second side wall 202 of the first housing 21. The sixth side wall 206 may extend from the other end of the fourth side wall 204, and may be positioned to correspond to an edge area of the other side of the screen S, which connects the other end of the first curved-surface part S2 and the other end of the second curved-surface part S3. When seen in a direction orthogonal to the slide-out direction and orthogonal to the direction in which the screen S is oriented, the sixth side wall 206 may overlap the third side wall 203 of the first housing 21. For example, the second plate 221, the fourth side wall 204, the fifth side wall 205, and the sixth side wall 206 may be integrally formed, and may include the same material (e.g., a metal material such as aluminum, stainless steel (STS), or magnesium, or a non-metal material such as polymer). The second plate 221, the fifth side wall 205, and the sixth side wall 206 may not be substantially exposed to the outside in a closed state of the electronic device 2. The second plate 221, the fifth side wall 205, and the sixth side wall 206 may be visible from the outside in an open state of the electronic device 2. The distance, in which the fourth side wall 204 is separated from the first side wall 201 in the slide-out direction, may increase in case of a slide-out of the second housing 22 and decrease in case of a slide-in of the second housing 22. When seen in a direction orthogonal to the slide-out direction and orthogonal to the direction in which the screen S is oriented, the area in which the second side wall 202 and the fifth side wall 205 overlap each other, and the area in which the third side wall 203 and the sixth side wall 206 overlap each other, may decrease in case of a slide-out of the second housing 22 and increase in case of a slide-in of the second housing 22.

According to an embodiment, when seen from above the screen S (e.g., when seen in the −z-axis direction), the first side wall structure 212 of the first housing 21 and the second side wall structure 222 of the second housing 22 may form a bezel structure for surrounding the screen S. The second housing 22 may have a second space (e.g., the second space 224 in FIG. 6 or 7) formed by the second plate 221 and the second side wall structure 222. The housing 20 may have a space in the form of a recess due to the first housing 21 and the second housing 22. The space in the form of a recess of the housing 20 may increase in case of a slide-out of the second housing 22 and decrease in case of a slide-in of the second housing 22, according to a relative position between the first space of the first housing 21 and the second space of the second housing 22. Elements accommodated in the space in the form of a recess of the housing 20, elements accommodated in the first space of the first housing 21, or elements accommodated in the second space of the second housing 22 may be positioned so as not to interfere with sliding of the second housing 22.

According to an embodiment, the housing 20 may be provided with a sliding structure which allows the second housing 22 to slide relative to the first housing 21. The sliding structure may be formed between the first plate (e.g., the first plate 211 in FIG. 6 or 7) of the first housing 21 and the second plate 221 of the second housing 22, between the second side wall 202 of the first housing 21 and the fifth side wall 205 of the second housing 22, and/or between the third side wall 203 of the first housing 21 and the sixth side wall 206 of the second housing 22. The sliding structure may be implemented such that the second housing 22 is stably moved without shaking in the slide-out direction or the slide-in direction while preventing and/or reducing the second housing 22 from being separated from the first housing 21. For example, the sliding structure may include a guide rail including a groove or a recess corresponding to a sliding movement path of the second housing 22. In order to reduce a frictional force between the first housing 21 and the second housing 22, a lubricant (e.g., grease) may be placed between the first housing 21 and the second housing 22, or the friction surface between the first housing 21 and the second housing 22 may be coated by a lubricant. In order to reduce a frictional force between the first housing 21 and the second housing 22, a rolling member such as a roller or a bearing may be interposed between the first housing 21 and the second housing 22.

According to an embodiment, the electronic device 2 may include a first support member (e.g., the first support member 721 in FIG. 6 or 7) coupled to the first housing 21 or at least partially formed integrally with the first housing 21. The first area ① of the flexible display 30 may be disposed on or coupled to the first support member. The electronic device 2 may include a second support member (e.g., the second support member 722 in FIG. 6 or 7) coupled to the second housing 22 so as to correspond to the second area ② of the flexible display 30 or at least partially formed integrally with the second housing 22. In case that the second housing 22 slides, the second area ② may be supported by the second support member, and may be withdrawn from the inner space of the housing 20 or inserted into the inner space of the housing 20. For example, in a slide out of the second housing 22, due to a relative position between the first support member coupled to the first area ① and the second support member corresponding to at least part of the second area ②, at least a part of the second area ② may be withdrawn from the inner space of the housing 20 to the outside through between the fourth side wall 204 and the second support member. For example, in a slide-in of the second housing 22, due to a relative position between the first support member coupled to the first area ① and the second support member corresponding to at least part of the second area ②, at least a part of the second area ② may be inserted into the inner space of the housing 20 to the outside through between the fourth side wall 204 and the second support member. For example, in the first support member, one surface coupled to the first area ① of the flexible display 30 may include a flat-surface area and a curved-surface area. The flat-surface area of the first support member may contribute to forming the first flat-surface part S1 of the screen S. The curved-surface area of the first support member may contribute to forming the first curved-surface part S2 of the screen S. The second curved-surface part S3 of the screen S may be formed to correspond to the curved-surface part of the second support member. In an embodiment, in a closed state of the electronic device 2, the first flat-surface part S1 of the screen S may include a first flat-surface area S11, and in an open state of the electronic device 2, the first flat-surface part S1 of the screen S may include the first flat-surface area S11 and a second flat-surface area S12. The first flat-surface area S11 may be supported by the first support member. The second flat-surface area S12 may be supported by the second support member in case of a slide-out of the second housing 22.

According to various embodiments, in the state (e.g., a closed state of the electronic device 2) where the second area ② of the flexible display 30 is at least partially inserted into the inner space of the housing 20, at least a part of the second area ② may be visible to the outside through the back cover 23. In this case, at least a partial area of the back cover 23 may be implemented to be transparent or translucent. In various embodiments, in case that there is a member positioned between the back cover 23 and at least a part of the second area② in a closed state of the electronic device 2, at least a partial area of the member may include an opening or may be formed transparently or translucently.

According to an embodiment, the electronic device 2 may include at least one of one or more audio modules (e.g., the audio module 170 in FIG. 1), one or more sensor modules (e.g., the sensor module 176 in FIG. 1), one or more camera modules (e.g., the camera module 180 in FIG. 1), one or more light-emitting modules, one or more input modules (e.g., the input module 150 in FIG. 1), and/or one or more connection terminal modules (e.g., the interface 177 or the connection terminal 178 in FIG. 1). In various embodiments, at least one of the elements may be omitted from the electronic device 2, or the electronic device may additionally include other elements. The position or number of the elements may be various.

For example, any one of the one or more audio modules may include a microphone positioned inside the electronic device 2, and a microphone hole formed through the exterior of the electronic device 2 to correspond to the microphone. For example, any one of the one or more audio modules may include a speaker (e.g., an external speaker or a receiver for phone calling) positioned inside the electronic device 2, and a speaker hole formed through the exterior of the electronic device 2 to correspond to the speaker. In an embodiment, the speaker may include a receiver for phone calling, and in this case, the speaker hole may be referred to as a receiver hole (e.g., see the audio module indicated by reference numeral "401"). For example, an audio module 401 including a receiver for phone calling may be positioned to correspond to a second side wall 422 of the first housing 21. The position or number of audio modules associated with a speaker or a microphone may be various. In various embodiments, the microphone hole and the speaker hole may be implemented as one hole. In various embodiments, an audio module associated with a speaker may include a piezo speaker in which a speaker hole is omitted.

For example, the one or more sensor modules may generate an electrical signal or a data value corresponding to an internal operation state of the electronic device 2 or an external environmental state. In an embodiment, any one of the one or more sensor modules may include an optical sensor positioned in the inner space of the housing 20 to correspond to the screen S. For example, the optical sensor may include a proximity sensor or an illuminance sensor. The optical sensor may be aligned with the opening formed through the first area ① of the flexible display 30. External light may reach the optical sensor through a transparent cover and the opening of the first area ①. The transparent cover may function to protect the flexible display 30 from the outside, and for example, may include a flexible member such as a plastic film (e.g., a polyimide film) or ultra-thin glass (UTG). In various embodiments, the optical sensor may be positioned on the rear surface of first area ①, or below or beneath the first area ①, and the optical sensor may perform a related function while the position thereof is not visually distinguished (or exposed). In various embodiments, the optical sensor may be positioned to be aligned with a recess formed on the rear surface of the first area ①. The optical sensor may be disposed to overlap at least a part of the screen S, and may perform a sensing function without being exposed to the outside. In this case, an area of the first area ①, which at least partially overlaps the optical sensor, may include a different pixel structure and/or a wiring structure compared with other areas. For example, an area of the first area ①, which at least partially overlaps the optical sensor, may have a different pixel density compared with other areas. In various embodiments, multiple pixels may not be arranged in an area of the first area ①, which at least partially overlaps the optical sensor. In various embodiments, the electronic device 2 may include a biometric sensor (e.g., a fingerprint sensor) positioned on the rear surface of the first area ① or below the first area ①. The biometric sensor may be implemented in an optical type, an electrostatic type, or an ultrasonic type, and the position or number thereof may be various. In addition, the electronic device 2 may include at least one of various other sensor modules, for example, a gesture sensor, a gyro sensor, a barometric pressure sensor, a magnetic sensor, an acceleration sensor, a grip sensor, a color sensor, an infrared (IR) sensor, a temperature sensor, or a humidity sensor.

For example, the one or more camera modules may include one lens or multiple lenses, an image sensor, and/or an image signal processor. The position or number of the camera modules may be various. In an embodiment, the electronic device 2 may include multiple rear camera modules 402 positioned to correspond to the back cover 23. For example, the back cover 23 may include multiple openings formed to correspond to the multiple rear camera modules 402, and the multiple rear camera modules 402 may be exposed to the outside through multiple openings (hereinafter, referred to as camera holes). In various embodiments, the back cover 23 may be formed to include a light-transmitting area corresponding to the multiple rear camera modules 402 without camera holes. The multiple rear camera modules 402 may have different attributes (e.g., view angles) or functions, and for example, may include a dual camera or a triple camera. The multiple rear camera modules 402 may include multiple camera modules including lenses having different view angles, and the electronic device 2 may control to change a view angle of the camera module, which is performed in the electronic device 2, based on a user selection. The multiple rear camera modules 402 may include at least one of a wide-angle camera, a telephoto camera, a color camera, a monochrome camera, or an infrared (IR) camera (e.g., a time of flight (TOF) camera or a structured light camera). In various embodiments, the IR camera may also be operated as at least a part of a sensor module. A light-emitting module 403 (e.g., a flash) may be exposed to the outside through an opening (hereinafter, referred to as a flash hole) formed through the back cover 23. In various embodiments, the back cover 23 may be formed to include a light-transmitting area corresponding to the light-emitting module 403 without a flash hole. The light-emitting module 403 may include a light source for the multiple rear camera modules 402. For example, the light-emitting module 403 may include a light-emitting diode (LED) or a xenon lamp.

According to various embodiments, the electronic device 2 may include a front camera module positioned in the inner space of the housing 20 to correspond to the screen S. For example, the first area ① of the flexible display 30 may include an opening aligned with the front camera module.

External light may reach the front camera module through a transparent cover (e.g., a flexible member functioning to protect the flexible display 30 from the outside) and the opening of the first area ①.

The opening of the first area ①, which is aligned with or overlaps the front camera module, may be provided in a through-hole shape or a notch shape. In various embodiments, the front camera module may be positioned on the rear surface of first area ①, or below or beneath the first area ①, and may perform a related function (e.g., image capturing) while the position thereof is not visually distinguished (or exposed). For example, the front camera module may include a hidden display rear camera (e.g., an under-display camera (UDC)). In various embodiments, the front camera module may be positioned to be aligned with a recess formed on the rear surface of the first area ①. The front camera module may be disposed to overlap at least a part of the screen S, and may obtain an image of an external subject without being visually exposed to the outside. In this case, an area of the first area ①, which at least partially overlaps the front camera module, may include a different pixel structure and/or a wiring structure compared with other areas. For example, an area of the first area ①, which at least partially overlaps the front camera module, may have a different pixel density compared with other areas. The pixel structure and/or the wiring structure formed in an area of the first area ①, which at least partially overlaps the front camera module, may reduce light loss between the outside and the front camera module. In various embodiments, a pixel may not be disposed in an area of the first area ①, which at least partially overlaps the front camera module. In various embodiments, the front camera module may be positioned to correspond to the second side wall 422 of the first housing 21. The electronic device 2 may include a light-emitting module (e.g., an LED, an IR LED, or a xenon lamp) capable of providing state information of the electronic device 2 in the form of light. In various embodiments, the light-emitting module may provide a light source operating in association with an operation of the front camera module.

For example, the one or more input modules may include key input devices. The multiple key input devices 404 may be positioned in openings formed through the first side wall 421 of the first housing 21. In various embodiments, the electronic device 2 may not include some or all of the key input devices, and the key input devices not included therein may be implemented as a soft key using the screen S. The position or number of the input modules may be various, and in various embodiments, the input modules may include at least one sensor module.

For example, the one or more connection terminal modules (connector modules, or interface terminal modules) may include a connector (or an interface terminal) positioned inside the electronic device 2, and a connector hole formed through the exterior of the electronic device 2 to correspond to the connector. The position or the number of the connection terminal modules may be various. The electronic device 2 may transmit and/or receive power and/or data to and/or from an external electronic device electrically connected to the connector. In an embodiment, the connector may include a USB connector or an HDMI connector. In various embodiments, the electronic device 2 may include a connection terminal module including an audio connector (e.g., a headphone connector or an earphone connector).

Figure 6:
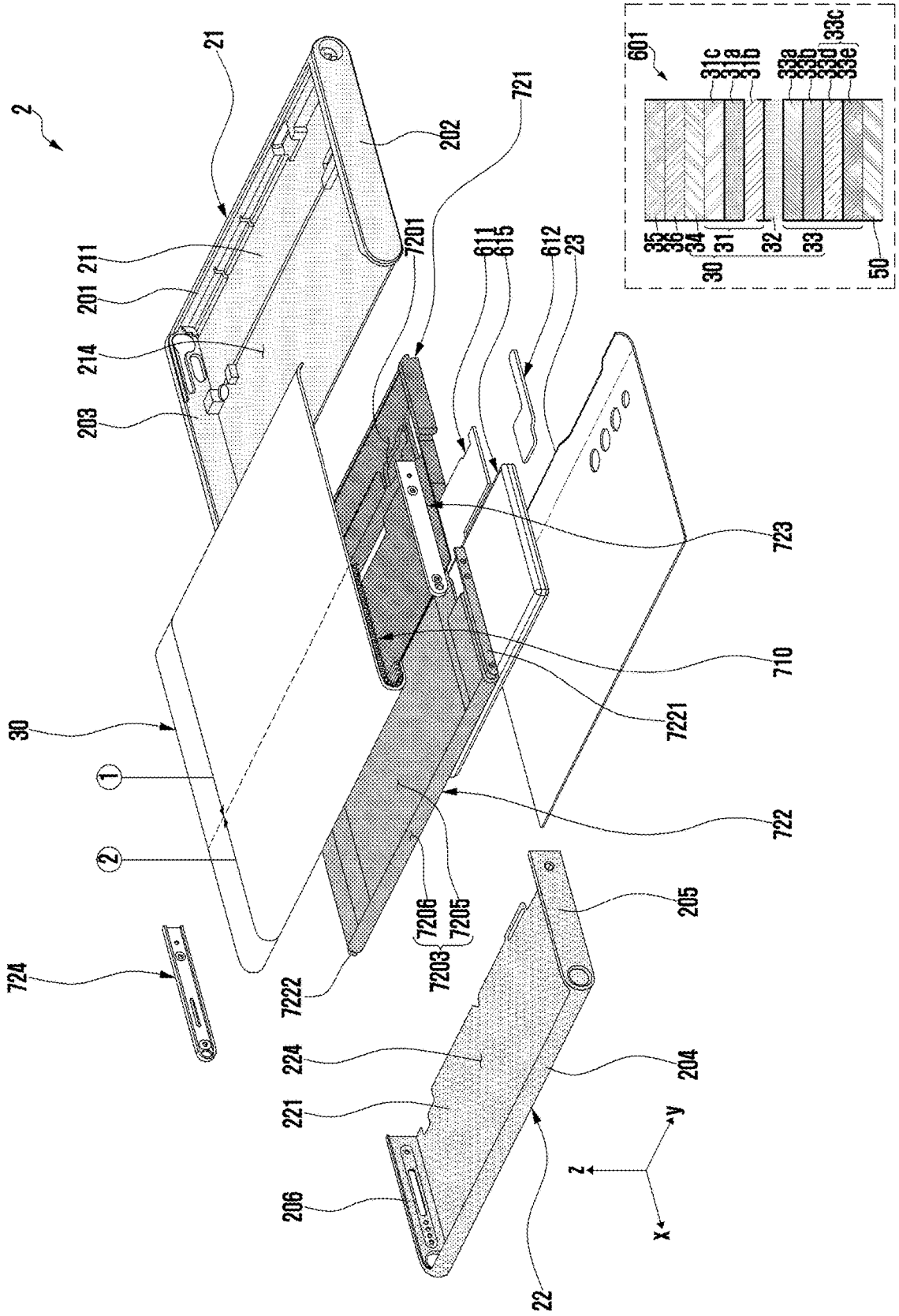
FIGS. 6 and 7 are exploded perspective views illustrating an example electronic device according to various embodiments.
Figure 7:
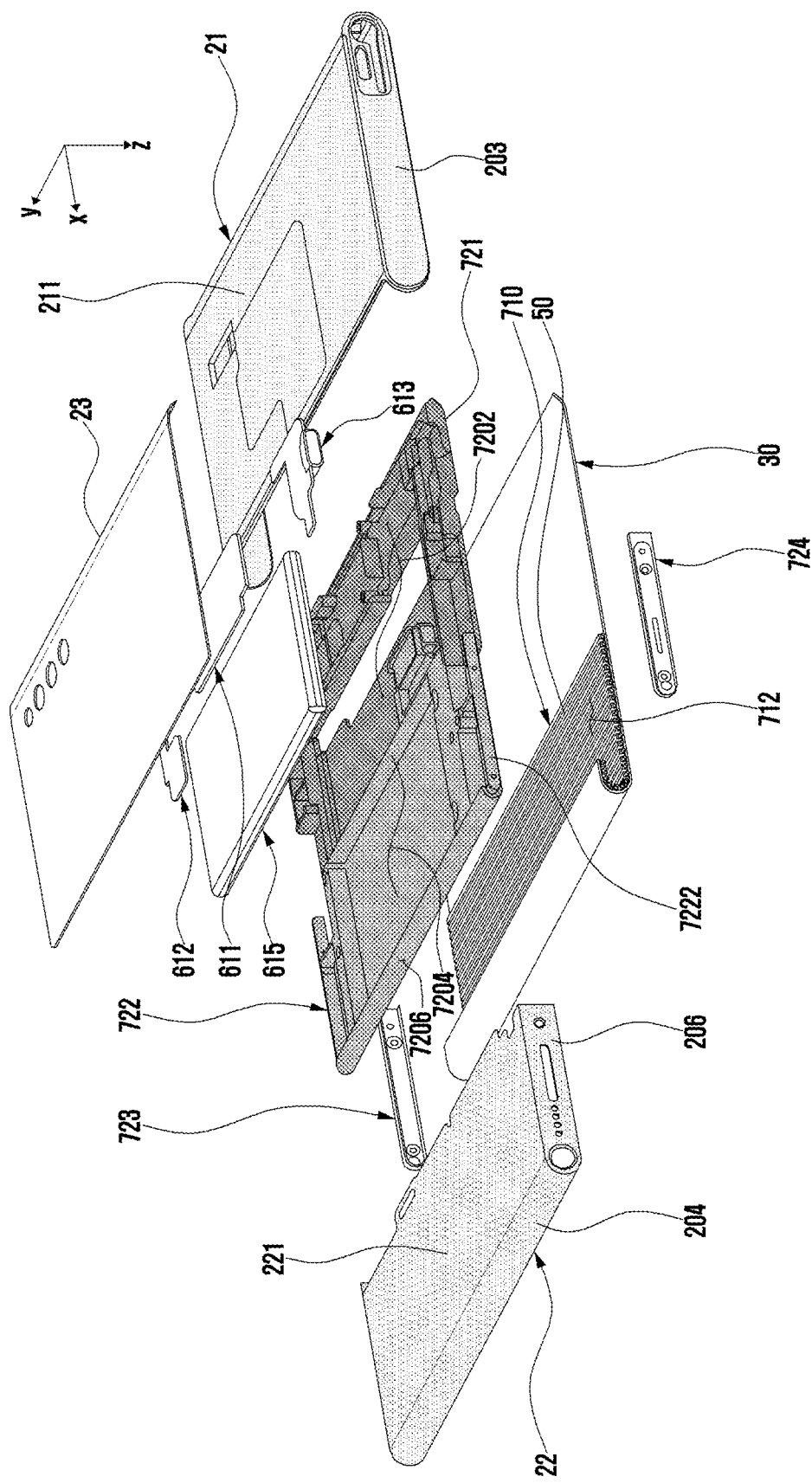
Figure 8:
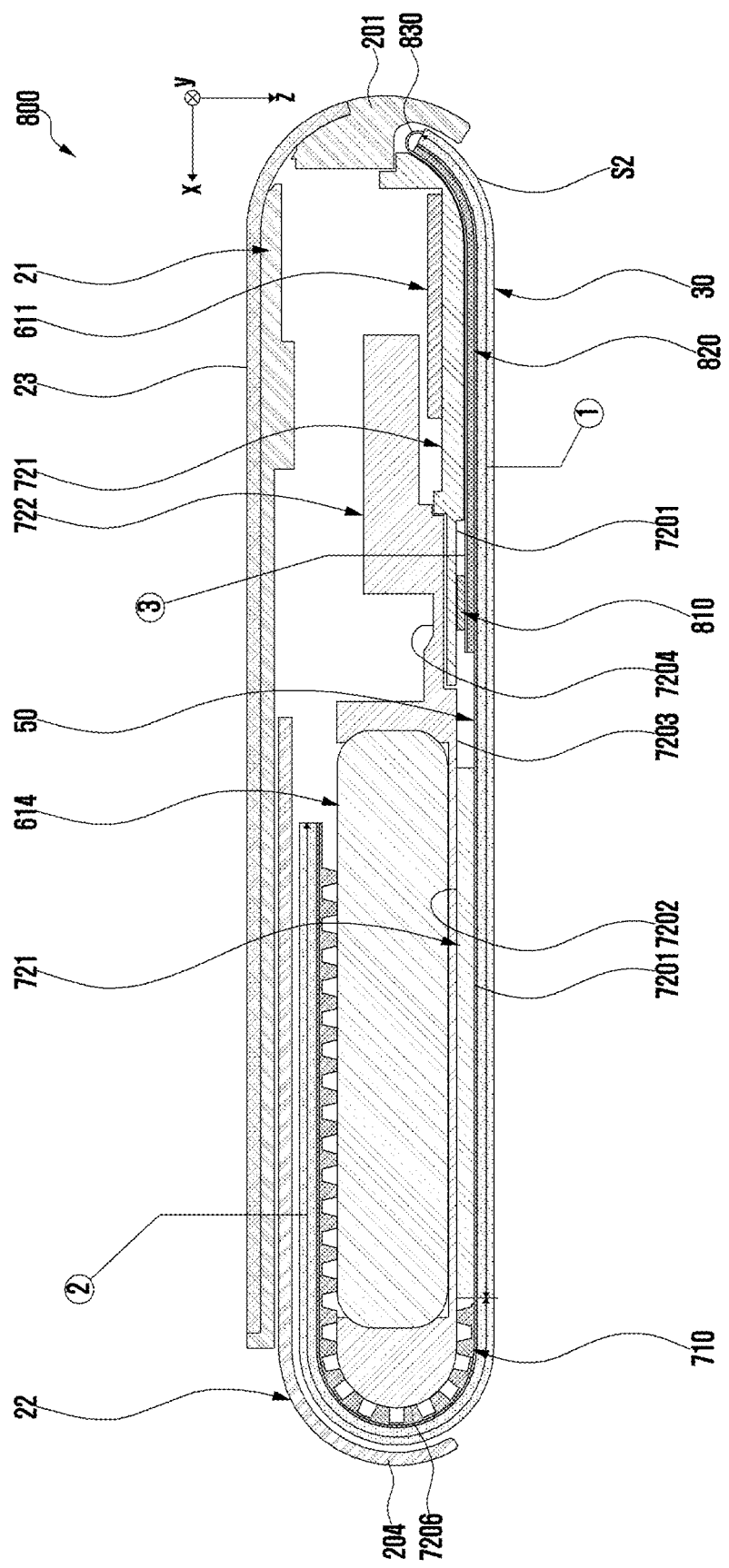
FIG. 8 is a cross-sectional view of an electronic device taken along line A-A' in FIG. 3 according to various embodiments.
Figure 9:
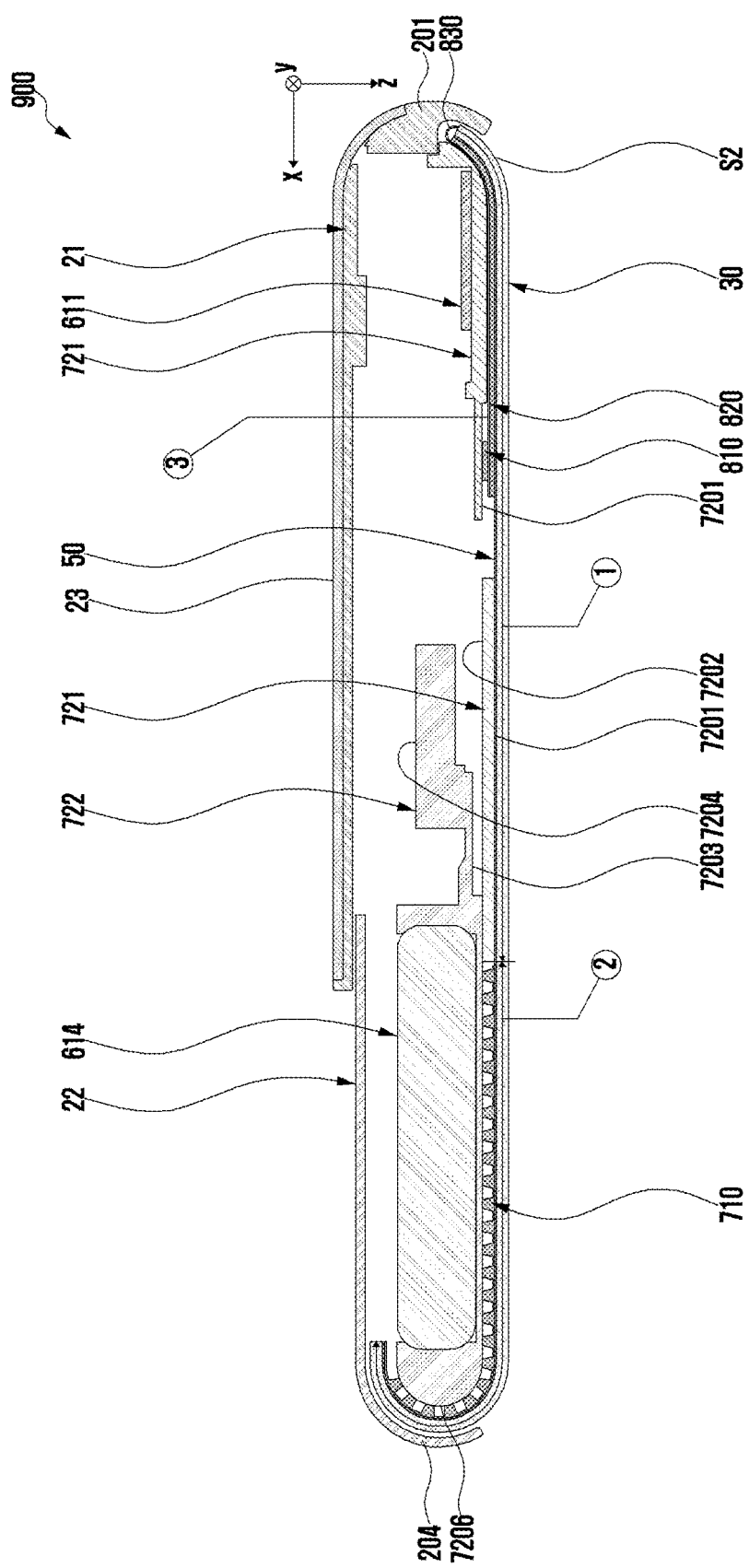
FIG. 9 is a cross-sectional view of an electronic device taken along line B-B' in FIG. 5 according to various embodiments.

FIGS. 6 and 7 are exploded perspective views of an electronic device 2 according to various embodiments. FIG. 8 is a cross-sectional view 800 of the electronic device 2 taken along line A-A' in FIG. 3 according to various embodiments. FIG. 9 is a cross-sectional view 900 of the electronic device 2 taken along line B-B' in FIG. 5 according to various embodiments.

Referring to FIGS. 6, 7, 8, and 9, the electronic device 2 may include the first housing 21, the second housing 22, the flexible display 30, a first printed circuit board 611, a second printed circuit board 612, a third printed circuit board 613, a fourth printed circuit board 614, a battery 615, a display support structure 710, a first support member 721, a second support member 722, a third support member 723, a fourth support member 724, a display drive circuit 810, and/or an adhesive member 820.

According to an embodiment, the first support member 721 may be positioned inside the electronic device 2 to correspond to the first housing 21. The first support member 721 may be connected to the first housing 21, or at least a part of the first support member 721 may be integrally formed with the first housing 21. The first housing 21 may have a first space 214 formed by the first plate 211, the first side wall 201, the second side wall 202, and the third side wall 203. The first support member 721 may be at least partially positioned in the first space 214, and may be connected to or be at least partially formed integrally with the first plate 211, the first side wall 201, the second side wall 202, or the third side wall 203. The first housing 21 may include a first seat structure capable of stably positioning the first support member 721. For example, the first seat structure may include an insert-fitting structure or a recess structure which allows the first support member 721 to be stably positioned in the first housing 21 without shaking. In an embodiment, the first support member 721 positioned on the first seat structure may be coupled to the first housing 21 by screw fastening. In various embodiments, the first support member 721 may be coupled to the first housing 21 by snap-fit fastening. In case of the snap-fit fastening, a hook (or a hook structure) and a hook fastening structure (or an engagement structure), to which the hook is fastened, may be included therein. For example, the hook may be formed on the first support member 721, and the hook fastening structure may be formed in the first housing 21. For another example, the hook may be formed in the first housing 21, and the hook fastening structure may be formed on the first support member 721. In various embodiments, the first seat structure may be interpreted as including a structure for screw fastening or a structure for snap-fit fastening. In various embodiments, the first support member 721 may be coupled to the first housing 21 by bonding including an adhesive material. The first housing 21 and the first support member 721 may form a first frame (a first frame structure, or a first framework) capable of withstanding a load to contribute to the durability or rigidity of the electronic device 2. Electronic components or various members associated with the electronic components may be arranged on the first frame or supported by the first frame. The first support member 721 may be a first internal structure positioned in the inner space of the electronic device 2 to correspond to the first housing 21, and in various embodiments, may be referred to as various other terms such as "a first bracket" or "a first support structure". In various embodiments, the first support member 721 may be interpreted as a part of the first housing 21.

According to an embodiment, the second support member 722 may be positioned inside the electronic device 2 to correspond to the second housing 22. The second support member 722 may be connected to the second housing 22, or at least a part of the second support member 722 may be integrally formed with the second housing 22. The second housing 22 may have a second space 224 formed by the second plate 221, the fourth side wall 204, the fifth side wall 205, and the sixth side wall 206. The second support member 722 may be at least partially positioned in the second space 224, and may be connected to or be at least partially formed integrally with the second plate 221, the fourth side wall 204, the fifth side wall 205, or the sixth side wall 206. The second housing 22 may include a second seat structure capable of stably positioning the second support member 722. For example, the second seat structure may include an insert-fitting structure or a recess structure which allows the second support member 722 to be stably positioned in the second housing 22 without shaking. In an embodiment, the second support member 722 positioned in the second seat structure may be coupled to the second housing 22 by screw fastening. In various embodiments, the second support member 722 may be coupled to the second housing 22 by snap-fit fastening. In case of the snap-fit fastening, a hook (or a hook structure) and a hook fastening structure (or an engagement structure), to which the hook may be fastened, may be included therein. For example, the hook may be formed on the second support member 722, and the hook fastening structure may be formed in the second housing 22. For another example, the hook may be formed in the second housing 22, and the hook fastening structure may be formed on the second support member 722. In various embodiments, the second seat structure may be interpreted as including a structure for screw fastening or a structure for snap-fit fastening. In various embodiments, the second support member 722 may be coupled to the second housing 22 by bonding including an adhesive material. The second housing 22 and the second support member 722 may form a second frame (a second frame structure, or a second framework) capable of withstanding a load to contribute to the durability or rigidity of the electronic device 2. Electronic components or various members associated with the electronic components may be arranged on the second frame or supported by the second frame. The second support member 722 may be a second internal structure positioned in the inner space of the electronic device 2 to correspond to the second housing 22, and in various embodiments, may be referred to as various other terms such as "a second bracket" or "a second support structure". In various embodiments, the second support member 722 may be interpreted as a part of the second housing 22.

According to an embodiment, the first support member 721 and/or the second support member 722 may include a metal material. For example, the first support member 721 and/or the second support member 722 may include magnesium, magnesium alloy, aluminum, aluminum alloy, zinc alloy, or copper alloy. For another example, first support member 721 and/or second support member 722 may include titanium, an amorphous alloy, a metal-ceramic composite material (e.g., cermet), or stainless steel. In various embodiments, the first support member 721 and the second support member 722 may include the same metal material. In various embodiments, the first support member 721 may include a first metal material, and the second support member 722 may include a second metal material different from the first metal material.

According to various embodiments, the first support member 721 or the second support member 722 may include a conductive structure including a metal material, and a non-conductive structure which includes a non-metal material and is connected to the conductive structure.

According to various embodiments, the first support member 721 or the second support member 722 may include a first conductive structure including a metal material, and a second conductive structure which includes a metal material different from that of the first conductive structure and is connected to the first conductive structure.

According to an embodiment, the first support member 721 may include a first support area 7201 and a second support area 7202 positioned at the side opposite to the first support area 7201. The second support area 7202 may face the first plate 211 of the first housing 21. The first area ① of the flexible display 30 may be disposed in the first support area 7201. For example, the first area ① of the flexible display 30 may be disposed on the first support member 721 using a heat-reactive adhesive material, a light-reactive adhesive material, a general adhesive, a double-sided tape, or an organic adhesive material. The flat-surface area included in the first support area 7201 may contribute to forming the first flat-surface area S11 (see FIG. 2 or 4) of the screen S. The curved-surface area included in the first support area 7201 may contribute to forming the first curved-surface part S2 (see FIG. 2 or 4). In an embodiment, a seat structure for positioning electronic components may be formed in the second support area 7202. For example, the first printed circuit board 611, the second printed circuit board 612, and the third printed circuit board 613 may not overlap each other when seen from above the second support area 7202 (e.g., when seen in the −z-axis direction), and the seat structure may include an insert-fitting structure or a recess structure which allows the first printed circuit board 611, the second printed circuit board 612, and the third printed circuit board 613 to be positioned on the first support member 721 without shaking. The first printed circuit board 611, the second printed circuit board 612, and the third printed circuit board 613 may be arranged in the seat structure by screw fastening. In various embodiments, the seat structure may include a hook structure for snap-fit fastening with respect to the first printed circuit board 611, the second printed circuit board 612, or the third printed circuit board 613. In an embodiment, the second printed circuit board 612 may be positioned closer to the second side wall 202 than the third side wall 203 of the first housing 21, and the third printed circuit board 613 may be positioned closer to the third side wall 203 than the second side wall 202 of the first housing 21. The first printed circuit board 611 may be positioned between the second printed circuit board 612 and the third printed circuit board 613. The first printed circuit board 611 may be electrically connected to the second printed circuit board 612 and the third printed circuit board 613 using an electrical path such as a flexible printed circuit board (FPCB) or a cable. For example, the first printed circuit board 611, the second printed circuit board 612, or the third printed circuit board 613 may include a printed circuit board (PCB), a flexible PCB (FPCB), or a rigid-flexible PCB (RFPCB). In various embodiments, two printed circuit boards or an integrated printed circuit board may be implemented in place of the first printed circuit board 611, the second printed circuit board 612, and the third printed circuit board 613.

According to an embodiment, the second support member 722 may include a third support area 7203 and a fourth support area 7204. The third support area 7203 may support the second area ② of the flexible display 30. The fourth support area 7204 may face the second plate 221 of the second housing 22. In case that the second housing 22 slides, the second area ② of the flexible display 30 may be supported by the third support area 7203 of the second support member 722, and thus may be withdrawn from the inner space of the housing 20 or inserted into the inner space of the housing 20. In an embodiment, the third support area 7203 may include a flat-surface area 7205 and a curved-surface area 7206. In case that the electronic device 2 is an open state or the second housing 22 slides, the flat-surface area 7205 of the third support area 7203 may support a part of the second area ② of the flexible display 30, which includes the second flat-surface area S12 (see FIG. 4) of the screen S. In case that the second housing 22 slides out, the area of the flat-surface area 7205 of the third support area 7203, which is not covered by the first support member 721 and thus supports the flexible display 30, may be increased. The curved-surface area 7206 of the third support area 7203 may be positioned to correspond to the fourth side wall 204 of the second housing 22. In case that the second housing 22 slides out or slides in, the second area ② of the flexible display 30 may be moved in the curved space between the curved-surface area 7206 of the third support area 7203 and the fourth side wall 204 of the second housing 22. The curved-surface area 7206 of the third support area 7203 may support a part of the second area ② of the flexible display 30, which includes the second curved-surface part S3 of the screen S. The curved-surface area 7206 of the third support area 7203 may contribute to forming the second curved-surface part S3 of the screen S.

According to an embodiment, a seat structure for positioning electronic components may be formed in the fourth support area 7204 of the second support member 722. For example, the battery 615 may be positioned on the second support member 722, and the seat structure of the second support member 722 may include an insert-fitting structure or a recess structure which allows the battery 615 to be positioned on the second support member 722 without shaking. The battery 615 may be a device for supplying power to at least one element of the electronic device 2, and for example, may include a non-rechargeable primary cell, a rechargeable secondary cell, or a fuel cell. In various embodiments, the electronic device 2 may further include an additional battery positioned on the seat structure of the first support member 721.

According to an embodiment, the display support structure 710 may be disposed on or coupled to the rear surface of the flexible display 30. The rear surface of the flexible display 30 may indicate a surface positioned at the side opposite to a surface in which light is emitted from a display panel including multiple pixels. The display support structure 710 may reduce a lifting phenomenon of the screen S due to the elasticity of the flexible display 30 or the elasticity of a display assembly including the flexible display 30, and thus may contribute to forming the seamless screen S.

For example, the display support structure 710 may support the second area ② so that the second area ② is not lifted due to the elasticity of the flexible display 30 or the elasticity of the display assembly including the flexible display 30, and may contribute so that the second area ② is maintained in a form of being seamlessly connected to the first area ①. The display support structure 710 may support the second area ② so that the second area ② of the flexible display 30 is maintained in a form of being seamlessly connected to the first area ① of the flexible display 30. In a closed state or an open state of the electronic device 2, for example, a part of the display support structure 710 may support the second area second area ②, between the curved-surface area 7206 of the second support member 722 and the second area ② of the flexible display 30. In an open state of the electronic device 2, for example, a part of the display support structure 710 may support the first flat-surface part 51 (see FIG. 4) of the screen S. The display support structure 710 may contribute to a smooth movement of the flexible display 30 in case that the second housing 22 slides. For example, in the switching between a closed state (see FIG. 2) and an open state (see FIG. 4) of the electronic device 2, the display support structure 710 may contribute so that the second area ② of the flexible display 30 is movable while maintaining the form seamlessly connected to the first area ①.

For example, the display support structure 710 may include one surface (not shown) facing the second area ② of the flexible display 30, and the other surface 712 positioned at the side opposite to the one surface. According to an embodiment, the display support structure 710 may include a multi-bar structure (or a multi-bar assembly). For example, the multi-bar structure may include a form in which multiple support bars extending a direction (e.g., the y-axis direction) orthogonal to the first direction (e.g., the +x-axis direction) of the slide-out and orthogonal to the direction (e.g., the +z-axis direction) in which the screen S (see FIG. 2 or 4) is oriented are arranged on one surface thereof. The multi-bar structure may have flexibility due to portions, which have a relatively thin thickness, between multiple support bars. In various embodiments, the multi-bar structure may be provided without portions for connecting the multiple support bars. In various embodiments, the multi-bar structure may be referred to as other terms such as "a flexible track". The display support structure 710 may include a metal material such as stainless steel, and/or a non-metal material such as polymer.

According to an embodiment, the display support structure 710 may support the flexible display 30, between the flexible display 30 and the third support area 7203 of the second support member 722. In case that the second housing 22 slides out, the area of the flat-surface area 7205 of the third support area 7203 included in the second support member 722, which is not covered by the first support member 721 and thus supports the display support structure 710, may be increased. In a slide-out or slide-in of the second housing 22, the display support structure 710 may move while rubbing against the third support area 7203 of the second support member 722. In a slide-out or slide-in of the second housing 22, the second support member 722 may move while rubbing against the display support structure 710.

According to an embodiment, in order to reduce a frictional force between the third support area 7203 of the second support member 722 and the display support structure 710, a lubricant (e.g., grease) may be placed (or applied) between the third support area 7203 and the display support structure 710. In various embodiments, the surface of the third support area 7203 or the display support structure 710 may be formed with a lubricating coating (e.g., a coating using various lubricating materials such as a Teflon coating).

Reference numeral "601" is a cross-sectional view of a display assembly including the flexible display 30. For example, the display assembly may include the flexible display 30, a transparent cover 35, an optical transparent adhesive member 36, and/or a support sheet 50. The flexible display 30 may be coupled to the transparent cover 35 using the optical transparent adhesive member 36 (e.g., optical clear adhesive (OCA), optical clear resin (OCR), or super view resin (SVR)). The transparent cover 35 (e.g., a window) may cover the flexible display 30 to protect the flexible display 30 from the outside. The transparent cover 35 may be implemented in the form of a thin-film (e.g., a thin-film layer) having flexibility. For example, the transparent cover 35 may include a plastic film (e.g., a polyimide film) or thin-film glass (e.g., ultra-thin glass). In various embodiments, the transparent cover 35 may include multiple layers. For example, the transparent cover 35 may have a form in which various coating layers are arranged on the plastic film or the thin-film glass. For example, the transparent cover 35 may have a form in which a coating layer or at least one protective layer including a polymer material (e.g., polyester (PET), polyimide (PI), or thermoplastic polyurethane (TPU)) is disposed on the plastic film or the thin-film glass. For example, the flexible display 30 may include a display panel 31, a base film 32, a lower panel 33, or an optical layer 34. The display panel 31 may be positioned between the optical layer 34 and the base film 32. The base film 32 may be positioned between the display panel 31 and the lower panel 33. The optical layer 34 may be positioned between the optical transparent adhesive member 36 and the display panel 31. An adhesive material (not shown) made of various polymers may be arranged between the display panel 31 and the base film 32, between the base film 32 and the lower panel 33, and/or between the display panel 31 and the optical layer 34. For example, the display panel 31 may include a light-emitting layer 31a, a thin-film transistor (TFT) film (or a TFT substrate) 31b, and/or an encapsulation (e.g., a thin-film encapsulation (TFE)) 31c. For example, the light-emitting layer 31a may include multiple pixels implemented by a light-emitting element such as an OLED or a micro-LED. The light-emitting layer 31a may be disposed on the TFT film 31b through organic evaporation. The TFT film 31b may be positioned between the light-emitting layer 31a and the base film 32. The TFT film 31b may indicate a film structure in which at least one TFT is disposed on a flexible substrate (e.g., a PI film) through a series of processes such as deposition, patterning, and etching. The at least one TFT may control a current for a light-emitting element of the light-emitting layer 31a so as to adjust ON or OFF of a pixel, or the brightness of a pixel. For example, the at least one TFT may be implemented with an amorphous silicon (a-Si) TFT, a liquid crystalline polymer (LCP) TFT, a low-temperature polycrystalline oxide (LTPO) TFT, or a low-temperature polycrystalline silicon (LTPS) TFT. The display panel 31 may include a storage capacitor, and the storage capacitor may maintain a voltage signal to a pixel, may maintain voltage applied to a pixel within one frame, or may reduce a gate voltage change of a TFT caused by a leakage current during light-emitting time. The storage capacitor may maintain voltage applied to a pixel at predetermined time interval by a routine (e.g., initialization or data write) for controlling the at least one TFT. In an embodiment, the display panel 31 may be implemented based on an OLED, and the encapsulation 31c may cover the light-emitting layer 31a. An organic material for emitting light in an OLED and an electrode may react very sensitively to oxygen and/or moisture, and thus may lose the light-emitting property thereof. In order to prevent and/or reduce same, the encapsulation layer 31c may seal the light-emitting layer 31a so that oxygen and/or moisture does not permeate into the OLED. The base film 32 may include a flexible film formed of plastic or polymer such as polyimide or polyester (PET). The base film 32 may function to support and protect the display panel 31. In various embodiments, the base film 32 may be referred to as a protective film, a back film, or a back plate. The lower panel 33 may include multiple layers for various functions. Various polymer adhesive members (not shown) may be arranged between multiple layers included in the lower panel 33. For example, the lower panel 33 may include a light-blocking layer 33a, a buffer layer 33b, and/or a lower layer 33c. The light-blocking layer 33a may be positioned between the base film 32 and the buffer layer 33b. The buffer layer 33b may be positioned between the light-blocking layer 33a and the lower layer 33c. The light-blocking layer 33a may block at least a part of light having been incident from the outside. For example, the light-blocking layer 33a may include an embossed layer. The embossed layer may be a black layer including a bumpy pattern. The buffer layer 33b may alleviate external impact applied to the flexible display 30. For example, the buffer layer 33b may include a sponge layer or a cushion layer. The lower layer 33c may disperse, diffuse, or dissipate heat generated in the electronic device 2 or the flexible display 30. The lower layer 33c may absorb or shield electromagnetic waves. The lower layer 33c may alleviate external impact applied to the electronic device 2 or the flexible display For example, the lower layer 33c may include a composite sheet 33d or a copper sheet 33e. In an embodiment, the composite sheet 33d may be a sheet formed by combining and processing layers or sheets having different properties. For example, the composite sheet 33d may include at least one of polyimide or graphite. The composite sheet 33d may be replaced with a single sheet including one material (e.g., polyimide or graphite). The composite sheet 33d may be positioned between the buffer layer 33b and the copper sheet 33e. The copper sheet 33e may be replaced with various other metal sheets. In various embodiments, at least a part of the lower layer 33c may be a conductive member (e.g., a metal plate), may help to reinforce rigidity of the electronic device 2, and may be used to shield ambient noise and dissipate heat emitted from a heat dissipating component (e.g., a display drive circuit 810 (e.g., (a DDI)) therearound. For example, the conductive member may include at least one of copper (CU), aluminum (Al), stainless steel (SUS), or a CLAD (e.g., a lamination member in which SUS and Al are alternately arranged). The lower layer 33c may include various layers for various other functions. In various embodiments (not shown), at least one additional polymer layer (e.g., a layer including PI, PET, or TPU) may be disposed on the rear surface of the display panel 31 in addition to the base film 32. In various embodiments, at least one of multiple layers (e.g., the light-blocking layer 33a, the buffer layer 33b, the composite sheet 33d, and the conductive sheet 33e) included in the lower panel 33 may be omitted. In various embodiments, the arrangement order of the multiple layers included in the lower panel 33 is not limited to the illustrated embodiment, and may be variously changed. For example, the optical layer 34 may include a polarizing layer (or a polarizer) or a phase retardation layer (or retarder). The polarizing layer and the phase retardation layer may improve outdoor visibility of a screen. For example, the optical layer 34 may selectively transmit light which is generated from a light source of the display panel 31 and vibrates in a predetermined direction. In various embodiments, one layer, in which the polarizing layer and the phase retardation layer are combined, may be provided, and the one layer may be defined as "a circular polarizing layer". The optical transparent adhesive member 36 may be positioned between the transparent cover 35 and the optical layer 34. In various embodiments, the polarizing layer (or a circular polarizing layer) may be omitted, and in this case, a black pixel define layer (PDL) and/or a color filter may be provided to replace the polarizing layer. The electronic device 2 may include a touch detection circuit (e.g., a touch sensor) (not shown). The touch detection circuit may be implemented with a transparent conductive layer (or film)

based on various conductive materials such as indium tin oxide (ITO). In an embodiment, the touch detection circuit may be disposed between the transparent cover 35 and the optical layer 34 (e.g., an add-on type). In an embodiment, the touch detection circuit may be disposed between the optical layer 34 and the display panel 31 (e.g., an on-cell type). In an embodiment, the display panel 31 may include a touch detection circuit or a touch detection function (e.g., an in-cell type). In various embodiments, the display panel 31 may be based on an OLED, and may include the encapsulation 31c positioned between the light-emitting layer 31a and the optical layer 34. The encapsulation 31c may perform a function of a pixel protective layer for protecting multiple pixels the light-emitting layer 31a. In an embodiment (not shown), the flexible display 30 may include a conductive pattern such as a metal mesh (e.g., an aluminum metal mesh), as a touch detection circuit disposed on the encapsulation 31c, between the encapsulation 31c and the optical layer 34. For example, in response to the bending of the flexible display 30, the metal mesh may have durability greater than a transparent conductive layer implemented with an ITO. In various embodiments, the flexible display 30 may further include a pressure sensor (not shown) capable of measuring the intensity (pressure) of a touch. Multiple layers included in the display panel 31 or the lower panel 33, the lamination structure thereof, or the lamination order thereof may be various. The flexible display 30, according to the type of provision or the trend of convergence, may be implemented by omitting a part of elements or adding other elements.

According to an embodiment, the support sheet 50 may be disposed on the rear surface of the flexible display 30. For example, the support sheet 50 may cover at least a part of the lower panel 33 of the flexible display 30, and be attached to the rear surface of the lower panel 33. The support sheet 50 may be coupled to the lower panel 33 using an adhesive material. The support sheet 50 may be positioned between the lower panel 33 and the display support structure 710, and the display support structure 710 may be coupled to the support sheet 50. The display support structure 710 may be coupled to the support sheet 50 using an adhesive material. For example, an adhesive material between the flexible display 30 and the support sheet 50, and/or an adhesive material between the support sheet 50 and the display support structure 710 may include a thermal-reactive adhesive material, a photo-reactive adhesive material, a general adhesive, or a double-sided tape. For another example, the adhesive material may include various polymers such as triazine thiol, dithiopyrimitine, or silane-based compounds, or an organic adhesive material such as sealant. The support sheet 50 may contribute to the durability (e.g., rigidity reinforcement) of the flexible display 30. The support sheet 50 may reduce the influence of load or stress, which may occur in sliding of the second housing 22, on the flexible display 30. The support sheet 50 may contribute so that the flexible display 30 is not damaged by a force delivered when the second housing 22 slides. In an embodiment, the support sheet 50 may include a metal material. For example, the support sheet 50 may include stainless steel. The support sheet 50 may include various other metal materials. In various embodiments, the support sheet 50 may include engineering plastic.

According to an embodiment, the support sheet 50 may include a lattice structure which at least partially overlaps the second area ② of the flexible display 30. For example, the lattice structure may include multiple openings (or slits) passing between one surface of the support sheet 50, which faces the display support structure 710, and the other surface of the support sheet 50, which faces the lower panel 33 of the flexible display 30. The lattice structure may indicate a pattern structure in which multiple openings are regularly arranged. The multiple openings may be periodically formed, may have substantially the same shape, and may be repeatedly arranged at predetermined interval. The lattice structure may contribute to the flexibility of the second area ②, and the second area ② may be more flexible than the first area ① due to the lattice structure. In various embodiments, the lattice structure including multiple openings may be referred to as other terms such as "an opening pattern", "a hole pattern", or "a lattice pattern". In various embodiments, the support sheet 50 may include a recess pattern (not shown) including multiple recesses in place of the lattice structure. For example, the recess pattern may indicate a pattern structure in which multiple recesses having a dented shape are regularly arranged, the multiple recesses being formed on a surface of the support sheet 50, which faces the display support structure 710, or a surface of the support sheet 50, which faces the lower panel 33 of the flexible display 30. In various embodiments, the lattice structure or the recess pattern may be expanded to the first area ① of the flexible display 30. In various embodiments, the lattice structure or the recess pattern may be formed to correspond to the first curved-surface part S2 (see FIG. 2 or 4) of the screen S. In various embodiments, the support sheet 50 including the lattice structure or the recess pattern, or a conductive member corresponding thereto may also be formed of multiple layers. The support sheet 50 may prevent and/or reduce elements (e.g., a multi-bar structure) positioned inside the electronic device 2 from being substantially visible through the flexible display 30. Although the lattice structure of the support sheet 50, which corresponds to the second area ② of the flexible display 30, includes multiple openings, it may be possible to transmit light at a level which enables the multi-bar structure to be substantially invisible through the flexible display 30. Although the lattice structure of the support sheet 50, which corresponds to the second area ② of the flexible display 30, includes multiple openings, also, it may be possible to prevent and/or reduce a phenomenon in which the multiple support bars of the multi-bar structure protrudes and thus is visible through the flexible display 30.

According to various embodiments, the display support structure 710 may function as a support sheet 50, and in this case, the support sheet 50 may be omitted. In various embodiments, the display assembly may be defined or interpreted as including the display support structure 710.

According to an embodiment, in order to reduce a lifting phenomenon of the screen S (see FIG. 2 or 4), a tension device (or a tension structure) (not shown) for the display assembly including the flexible display 30 may be formed. The tension device may contribute to smooth slide motion while maintaining the tension applied to the flexible display 30 and/or the support sheet 50. For example, the tension device may apply tension to the flexible display 30 and the support sheet 50 using a belt (e.g., a wire type or a chain type belt). For another example, the tension device may apply tension to the flexible display 30 and the support sheet 50 using an elastic member such as a spring. In an embodiment, the tension device may be connected to the support sheet 50. In case that the tension by the tension device is in a critical range, in the closed state in FIG. 2 or in the open state in FIG. 4, the second area ② of the flexible display 30 may be maintained in a form of being seamlessly connected to the first area ① of the flexible display 30 without lifting. In case that the tension by the tension device is in a critical range, in the switching between the closed state in FIG. 2 and the open state in FIG. 4, the second area ② may be moved while maintaining the form of being seamlessly connected to the first area ① without lifting. In case that the tension by the tension device is within a critical range, in the switching between the closed state in FIG. 2 and the open state in FIG. 4, the slide motion thereof may be smoothly performed. For example, in the case of a comparative example in which the tension by the tension device is lower than a critical range, the second area ② may be lifted or may not be seamlessly arranged with the first area ① due to the elasticity of the flexible display 30 and/or the elasticity of the support sheet 50. For another example, in the case of a comparative example in which the tension by the tension device is larger than a critical range, the second area ② may be seamlessly connected to the first area ① without any lifting, but it may be difficult that the slide motion thereof is smoothly or naturally performed in the switching between the closed state in FIG. 2 and the open state in FIG. 4.

According to an embodiment, the electronic device 2 may include a rail part (or a guide rail) for guiding a movement of the display support structure 710. The third support member (or a third support structure) 723 may be positioned in the second space 224 of the second housing 22, and be coupled to the fifth side wall 205 of the second housing 22. The fourth support member (or a fourth support structure) 724 may be positioned in the second space 224 of the second housing 220, and may be coupled to the sixth side wall 206 of the second housing 22. In an embodiment, the electronic device 2 may include a first guide rail (not shown) on which one side of the display support structure 710 is positioned and which guides a movement thereof, and a second guide rail (not shown) on which the other side of the display support structure 710 is positioned and which guides a movement thereof. The first guide rail and the second guide rail may be formed symmetrically with reference to the center line (e.g., a line which is a symmetric basis with respect to the screen S) of the electronic device 2, which extends in the slide-out or the slide-in direction (e.g., the x-axis direction) of the second housing 22. In an embodiment, the first guide rail may be formed by the second support member 722 and the third support member 723, and the second guide rail may be formed by the second support member 722 and the fourth support member 724. The second support member 722 may include a first insert structure 7221 inserted in a first recess structure included in the third support member 723. For example, the first recess structure may include a first recess having a dented shape in a third direction (e.g., the +y-axis direction) orthogonal to the slide-out direction of the second housing 22 and orthogonal to the direction in which the screen S (see FIG. 2 or 4) is oriented. For example, the first insert structure 7221 may include a first insert protruding in the third direction (e.g., the +y-axis direction) to be inserted in the first recess. The first guide rail may include the first insert structure 7221 and the first recess structure. The first guide rail may have a rail-shaped first space (hereinafter, referred to as "a first rail part") formed between the first insert of the first insert structure 7221 and the first recess of the first recess structure to correspond to a designated movement path of the display support structure 710. One side part of the display support structure 710 may be positioned in the first rail part of the first guide rail. The second guide rail may include a second insert structure 7222 of the second support member 722 and a second recess structure (not shown) of the fourth support member 724, in substantially the same type as the first guide rail. For example, the second recess structure may include a second recess having a dented shape in a fourth direction (e.g., the −y-axis direction) opposite to the third direction. For example, the second insert structure may include a second insert protruding in the fourth direction to be inserted in the second recess. The second guide rail may have a rail-shaped second space (hereinafter, referred to as "a second rail part") formed between the second insert of the second insert structure 7222 and the second recess of the second recess structure to correspond to a designated movement path of the display support structure 710. The other side part of the display support structure 710 may be positioned in the second rail part of the second guide rail. In case that the second housing 22 slides, the display support structure 710 may be guided by the first guide rail and the second guide rail and thus moved. In various embodiments, the first guide rail may be formed by the fifth side wall 205 of the second housing 22, and the third support member 723 may be omitted. In various embodiments, the second guide rail may be formed by the sixth side wall 206 of the second housing 22, and the fourth support member 724 may be omitted.

According to an embodiment, in order to reduce a frictional force between the one side part of the display support structure 710 and the first guide rail, and a frictional force between the other side part of the display support structure 710 and the second guide rail, a lubricant (e.g., grease) may be placed (or applied) on the first guide rail and the second guide rail. In various embodiments, a surface of the one side part included in the display support structure 710 to correspond to the first guide rail, and a surface of the other side part included in the display support structure 710 to correspond to the second guide rail, may be formed with a lubricating coating (e.g., a coating using various lubricating materials such as a Teflon coating). For another example, the surface of the first guide rail and the surface of the second guide rail may be formed with a lubricating coating (e.g., a coating using various lubricating materials such as a Teflon coating).

According to various embodiments, the one side part of the display support structure 710, which is positioned on the first guide rail, may be modified into a form including a first rotation member such as a roller, and a shaft on which the first rotation member is rotatably positioned. The other side part of the display support structure 710, which is positioned on the second guide rail, may be modified into a form including a second rotation member such as a roller and a shaft on which the second rotation member is rotatably positioned. In case that the second housing 22 slides, the first rotation member may be guided by the first guide rail and thus moved in a position, and may be rotated due to friction with the first guide rail. In case that the second housing 22 slides, the second rotation member may be guided by the second guide rail and thus moved in a position, and may be rotated due to friction with the second guide rail.

According to various embodiments, a rotation member such as a roller or a pulley may be positioned to replace the curved-surface area 7206 of the third support area 7203 of the second support member 722. For example, one end of the rotation shaft related to the rotation member may be rotatably coupled to the third support member 723 (see FG. 6), and the other end of the rotation shaft related to the rotation member may be rotatably coupled to the fourth support structure 724 (see FIG. 6). In various embodiments, the rotation member may be interpreted as a curved-surface member, a curved-surface support member, or a curved-surface support structure which is rotatably implemented based on friction with the display support structure 710 (e.g., a multi-bar structure).

According to an embodiment, the display drive circuit 810 may be disposed on the flexible display 30 in a chip-on panel (COP) method. For example, the display drive circuit 810 may include a display drive integrated circuit (DDI) or a DDI chip. The flexible display 30 may include a third area ③ extending from the first area ①. In an embodiment, the third area ③ may be bent from the first curved-surface part S2 of the screen S toward the first area ①, and may be coupled to overlap the support sheet 50. For example, the third area ③ may include a folding section 830 which is bent with a corresponding curvature radius from the side of the first curved-surface part S2. The adhesive member 820 may be positioned between the third area ③ of the flexible display 30 and the support sheet 50. In an embodiment, the support sheet 50 and the adhesive member 820 may reduce stress of the folding section 830 while allowing the third area ③ of the flexible display 30 to be disposed in the state of being bent with the corresponding curvature radius. The display drive circuit 810 may be disposed in the third area ③. In an embodiment, the display driver circuit 810 may be disposed in the third area ③ by tape automated bonding (TAB).

According to an embodiment, the third area ③ of the flexible display 30 may extend from the display panel 31 (see FIG. 6). For example, the third area ③ may be a part of the TFT film (or a TFT substrate) 31*b* (see FIG. 6). The third area ③ may be electrically connected to the first printed circuit board 611 using a flexible printed circuit board (not shown). The third area ③ may include electrical paths (e.g., wires implemented with a conductive pattern) for electrically connecting at least one TFT and a flexible printed substrate. In an embodiment, the third area ③ may be electrically connected to the flexible printed circuit board by anisotropic conductive film bonding (ACF bonding). The third area ③ may be a portion which is not included in the screen S (see FIG. 2 or 4), and may not include a pixel implemented as a light-emitting device. In an embodiment, the light-emitting layer 31*a* and the encapsulation 31*c* in FIG. 6 may not be expanded to the third area ③. The TFT film 31*b* in FIG. 6 may be expanded to the third area ③, but may be implemented in a form in which a TFT is not included in the third area ③. The electrical paths included in the third area ③ may be arranged on the TFT film 31*b*. In various embodiments, the light-emitting layer 31*a* may be expanded to the third area ①, but may be implemented in a form in which multiple pixels do not substantially exist in the third area ③. In various embodiments, the encapsulation 31*c* may be expanded to the third area ③. A signal commanded by a processor (e.g., the processor 120 in FIG. 1) may be transferred to the display drive circuit 810 disposed in the third area ③ through the flexible printed circuit board. The display drive circuit 810 may function as a signal passage between the flexible display 30 and the processor so as to control pixels through TFTs in the flexible display 30. For example, the display drive circuit 810 may have a function of turning on or off pixels included in the flexible display 30, and be electrically connected to gate electrodes of the TFTs. The display drive circuit 810 may have a function of adjusting the amount of RGB (red, green, blue) signals of a pixel to make a color difference, and may be electrically connected to source electrodes of the TFTs. The TFT may include a gate line for electrically connecting the display drive circuit 810 and the gate electrode of the TFT, and a source line (or a data line) for electrically connecting the display drive circuit 810 and the source electrode of the TFT. In various embodiments, the display drive circuit 810 may operate in response to a red, green, blue, white (RGBW) type in which a white pixel is added to an RGB pixel.

According to various embodiments, the display drive circuit 810 may include a DDI package. The DDI package may include a DDI (or a DDI chip), a timing controller (T-CON), a graphic RAM (GRAM), or power generating circuits. In various embodiments, the graphic RAM may be omitted, or a memory, which is separately provided from the display drive circuit 810, may be utilized therefor. The timing controller may convert a data signal input from the processor into a signal required by the DDI. The timing controller may perform a function of adjusting input data information into a signal suitable for a gate driver (or a gate IC) and a source driver (or a source IC) of the DDI. The graphic RAM may function as a memory for temporarily storing data to be input to a driver (or IC) of the DDI. The graphic RAM may store an input signal and again send same to the driver of the DDI, and at this time, the signal may be processed by interacting with the timing controller. The power generating circuits may generate voltages for driving the flexible display 30 to supply required voltages to the gate driver and the source driver of the DDI.

According to various embodiments, the display drive circuit 810 may be disposed on the flexible display 30 in a chip-on film (COF) method. For example, the third area ③ of the flexible display 30 may be a flexible film substrate for connecting the display panel 31 (see FIG. 6) and a flexible printed circuit board electrically connected to the first printed circuit board 611. For example, the film substrate may include a flexible plastic substrate or a polymer substrate (e.g., a polyimide substrate) on which a circuit or a wire is formed. One end of the film substrate may be electrically connected to the display panel 31 (or the TFT film 31*b*) (see FIG. 6), and the other end of the film substrate may be electrically connected to a flexible printed circuit board electrically connected to the first printed circuit board 611. In an embodiment, the display drive circuit 810 may be disposed on the film substrate by the TAB. In an embodiment, the film substrate may be electrically connected to the display panel 31 and/or a flexible printed circuit board by ACF bonding.

According to various embodiments, the support sheet 50 may reduce electromagnetic interference (EMI) on the flexible display 30. In various embodiments, the support sheet 50 may disperse or diffuse heat emitted from a heat dissipation component (e.g., the display drive circuit 810).

Figure 10:
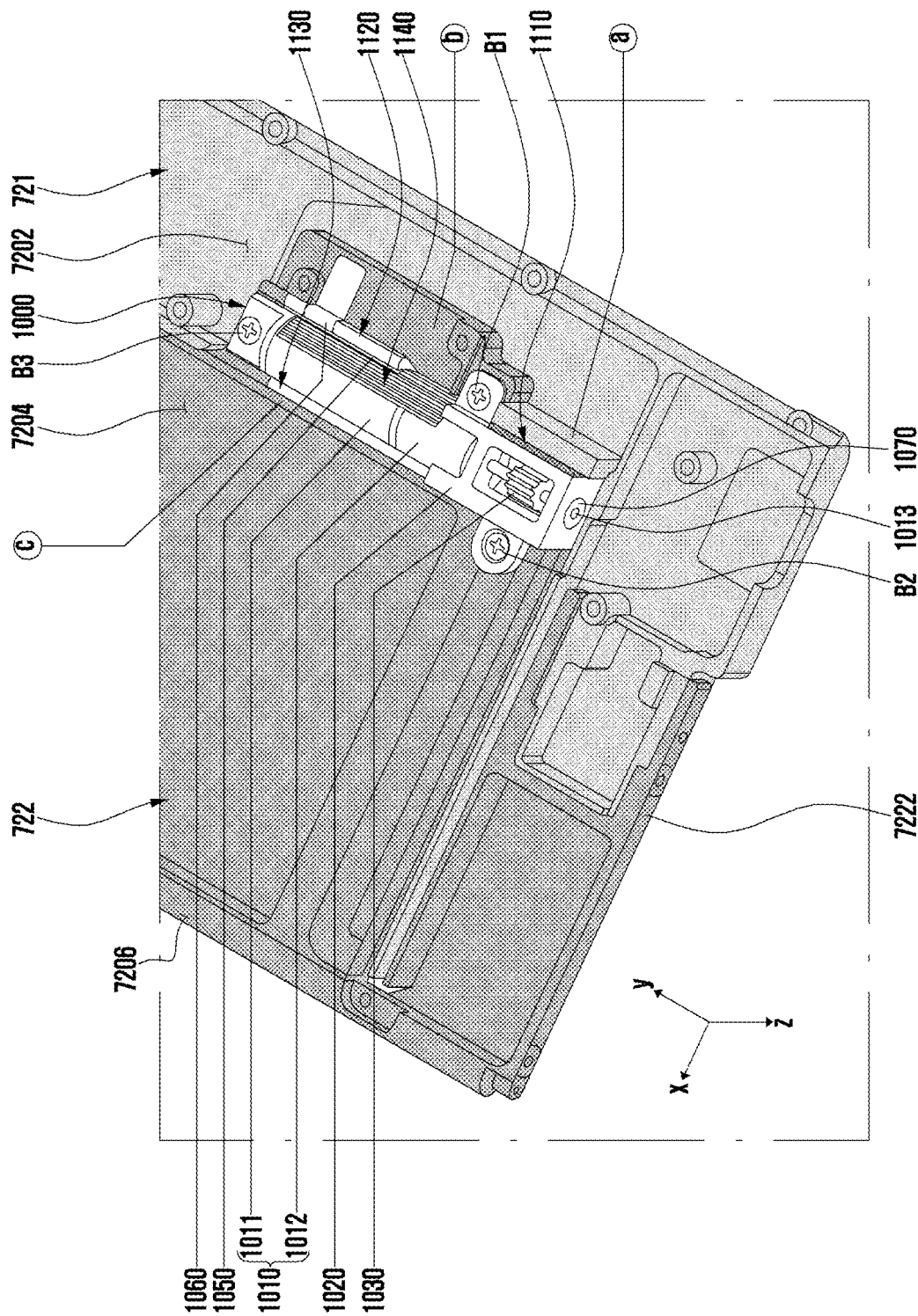
FIG. 10 is a partial perspective view showing a first support member, a second support member, a sliding drive device, a first thermal conductive member, a second thermal conductive member, a third thermal conductive member, and a fourth thermal conductive member in a closed state of an electronic device according to various embodiments.
Figure 11:
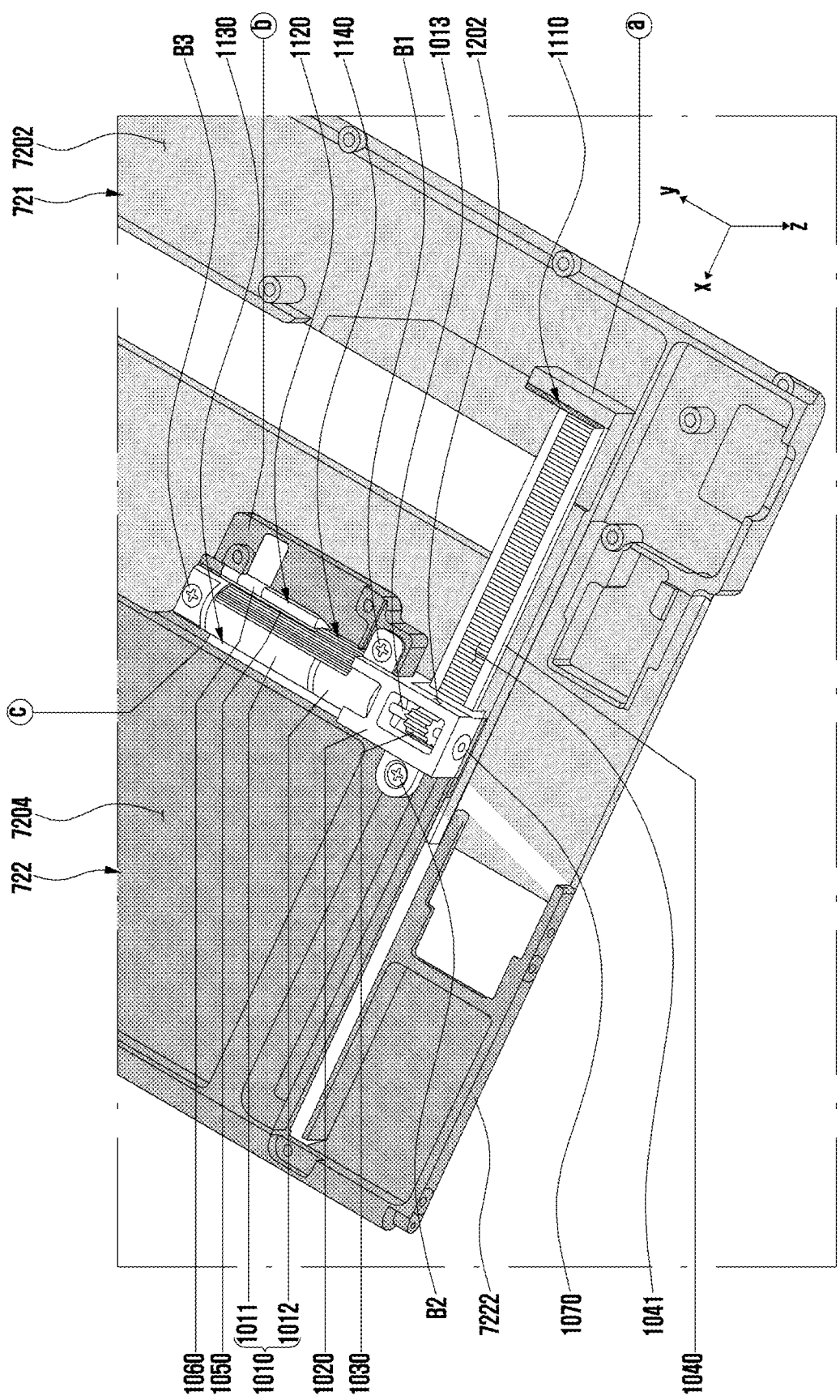
FIG. 11 is a partial perspective view showing a first support member, a second support member, a sliding drive device, a first thermal conductive member, a second thermal conductive member, a third thermal conductive member, and a fourth thermal conductive member in an open state of an electronic device according to various embodiments.
Figure 12:
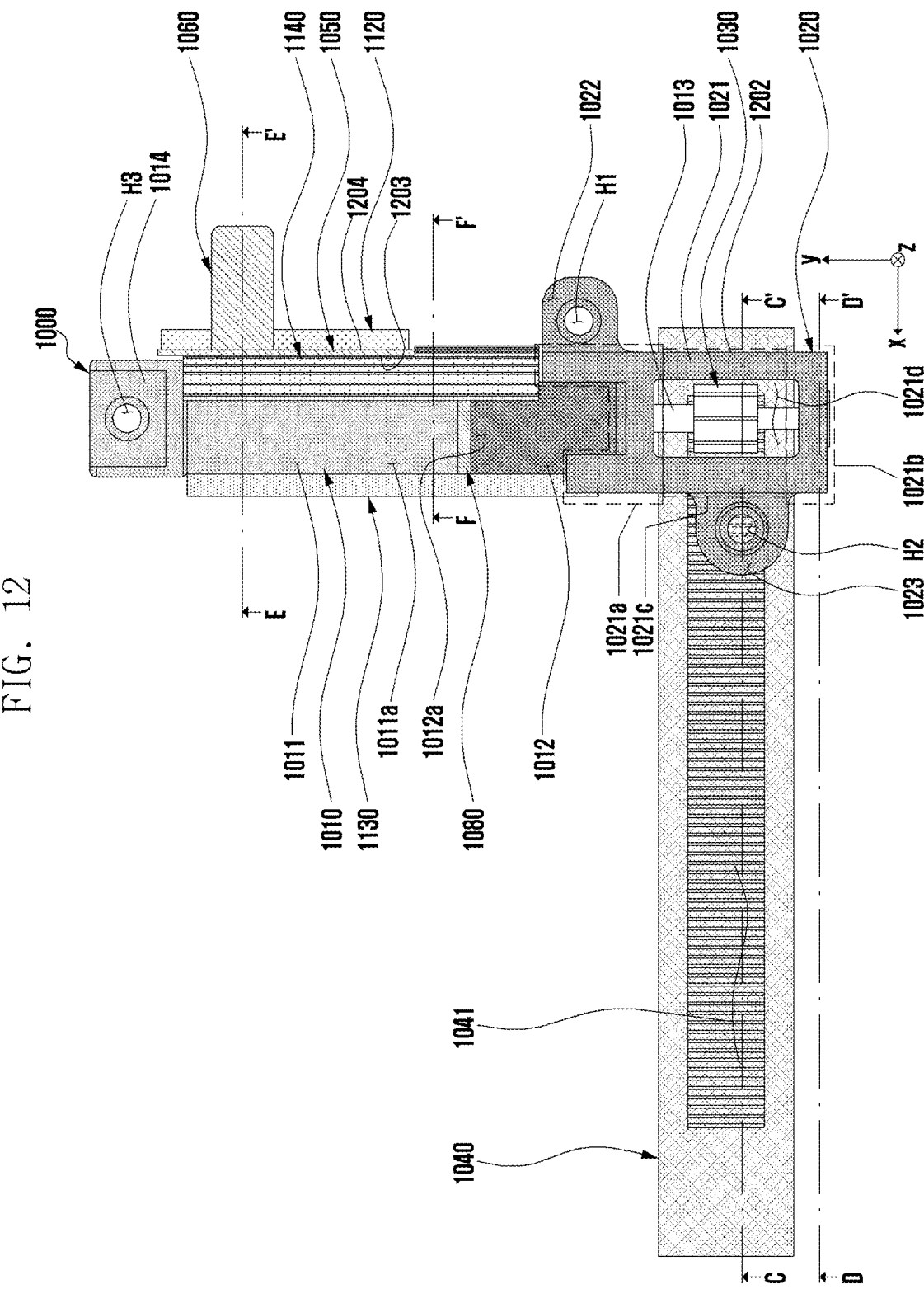
FIG. 12 is a diagram illustrating an example sliding drive device, a second thermal conductive member, a third thermal conductive member, and a fourth thermal conductive member according to various embodiments.

FIG. 10 is a partial perspective view showing a first support member 721, a second support member 722, a sliding drive device 1000, a first thermal conductive member 1110, a second thermal conductive member 1120, a third thermal conductive member 1130, and a fourth thermal conductive member 1140, in a closed state (see FIG. 3) of an electronic device 2 according to various embodiments. FIG. 11 is a partial perspective view showing a first support member 721, a second support member 722, a sliding drive device 1000, a first thermal conductive member 1110, a second thermal conductive member 1120, a third thermal conductive member 1130, and a fourth thermal conductive member 1140, in an open state (see FIG. 5) of an electronic device 2 according to various embodiments. FIG. 12 is a diagram illustrating a sliding drive device 1000, a second thermal conductive member 1120, a third thermal conductive member 1130, and a fourth thermal conductive 1140 according to various embodiments.

Referring to FIGS. 10, 11, and 12, in an embodiment, the sliding drive device 1000 may include a motor assembly 1010, a bracket 1020, a circular gear (or a round gear) 1030, a linear gear (or a linear gear structure) 1040, a fifth printed circuit board 1050, and/or an electrical connection member (or an electrical path or an electrical path member) 1060.

According to an embodiment, the motor assembly 1010 may provide power (or a drive force) for sliding of the second support member 722 relative to the first support member 721. The motor assembly 1010 may be disposed on the second support member 722. For example, the motor assembly 1010 may be disposed in the fourth support area 7204 of the second support member 722. Since the first support member 721 is coupled to the first housing 21 (see FIG. 6) and the second support member 722 is coupled to the second housing 22 (see FIG. 6), a slide-out or slide-in of the second housing 22 may be interpreted substantially the same as a slide-out or slide-in of the second support member 722. In case that a signal is generated through the input module included in the electronic device 2, the electronic device 2 may be switched from a closed state to an open state or from an open state to a closed state, by the power provided by the motor assembly 1010. For example, in case that a signal is generated through a hardware button or a software button provided through the screen S (see FIG. 2 or 4), the electronic device 2 may be switched from a closed state to an open state or from an open state to a closed state, by the power provided by the motor assembly 1010. In case that a signal is generated from various sensors such as a pressure sensor, the electronic device 2 may be switched from a closed state to an open state or from an open state to a closed state, by the power provided by the motor assembly 1010. For example, by the power provided by the motor assembly 1010, in case that the second support member 722 slides relative to the first support member 721, the first guide rail formed by the second support member 722 and the third support member 723 (see FIG. 6 or FIG. 7) which are coupled to the second housing 22 (see FIG. 6 or FIG. 7), and the second guide rail formed by the second support member 722 and the fourth support member 724 (see FIG. 6 or FIG. 7) which are coupled to the second housing 22, may be moved in the sliding direction thereof. In case that the first guide rail and the second guide rail are moved in the sliding direction, a relative position change between the first guide rail and one side part of the display support structure (see FIG. 6 or FIG. 7), which is positioned on the first guide rail, and a relative position change between the second guide rail and one side part of the display support structure 710, which is positioned on the second guide rail, may occur. Since the flexible display 30 is coupled to the first support member 721 and the display support structure, a relative position change between the first support member 721 and the second support member 722, a relative position change between the first guide rail and one side part of the display support structure 710, and a relative position change between the second guide rail and the other side part of the display support structure 710, may act as a force for moving a portion of the display support structure 710, in which the second area ② of the flexible display 30 is disposed. In an embodiment, the motor assembly 1010 may include a motor 1011 and a gear structure 1012 drivingly connected to the motor 1011. The gear structure 1012 may drivingly connect the motor 1011 and the circular gear 1030, between the motor 1011 and the circular gear 1030. For example, the gear structure 1012 may be connected to a first rotation shaft (or a first shaft or an input shaft) (not shown) of the motor 1011, and may include a second rotation shaft (or a second shaft or an output shaft) 1013 connected to the circular gear 1030. The first rotation shaft and the second rotation shaft 1013 may be substantially parallel to a direction (e.g., the y-axis direction) orthogonal to the slide-out direction of the second housing 22 (see FIG. 6) and orthogonal to the direction in which the screen S (see FIG. 2 or 4) is oriented. The rotation center line of the first rotation shaft and the rotation center line of the second rotation shaft 1013 may substantially coincide with each other. In various embodiments, the rotation center line of the first rotation shaft and the rotation center line of the second rotation shaft 1013 may be parallel to each other while being spaced apart from each other. In various embodiments, the first rotation shaft and the second rotation shaft 1013 may not be parallel to each other, and corresponding thereto, the motor assembly 1010 may be modified and positioned differently from the illustrated example. For example, the first rotation shaft and the second rotation shaft 1013 may be orthogonal to (or intersect) each other, and the gear structure 1012 may be implemented to transfer power or motion from the first rotation shaft to the second rotation shaft 1013 using a conical gear (e.g., a bevel gear). In an embodiment, the gear structure 1012 may include reduction gears. For example, the gear structure 1012 may be configured such that the second rotation shaft 1013 rotates at a slower rotational speed or lower revolutions per minute than the first rotation shaft. The gear structure 1012 may reduce the speed of the first rotation shaft to increase torque of the second rotation shaft 1013. The gear structure 1012 (e.g., a reduction gear) may increase torque of the second rotation shaft 1013 while reducing the speed thereof compared to the first rotation shaft, and thus may contribute to stable sliding of the second support member 722. The power for sliding the second support member 722 relative to the first support member 721 may be output from the second rotation shaft 1013, and hereinafter, the second rotation shaft 1013 may be defined or interpreted as a rotation shaft, a drive shaft, or a power transmission shaft of the motor assembly 1010. In various embodiments, the motor 1011 may be implemented in an integral form including the gear structure 1012. In various embodiments, the gear structure 1012 may be omitted, and in this case, the first rotation shaft of the motor 1011 may be connected to the circular gear 1030.

For example, the circular gear 1030 connected to the second rotation shaft 1013 may include a rotation body having a circular cylinder or a disc shape, and multiple gear teeth formed along the circumference of the rotation body. The linear gear 1040 may be a gear structure in which the multiple gear teeth are linearly arranged in the slide-out direction (e.g., the +x-axis direction) of the second support member 722. For example, the linear gear 1040 may be a plate shape including one surface including the multiple gear teeth, and the other surface positioned at the side opposite to the one surface. The linear gear 1040 may be disposed on the first support member 721. For example, the linear gear 1040 may be disposed in the second support area 7202 of the first support member 721 by using various methods such as bonding or screw fastening. The circular gear 1030 and the linear gear 1040 may be in an engaged state with each other. The circular gear 1030 may perform rotational motion by the second rotation shaft 1013, and the linear gear 1040 engaged with the circular gear 1030 may perform linear motion. The rotational motion of the circular gear 1030 is converted into the linear motion of the linear gear 1040, and thus the second support member 722 coupled to the linear gear 1040 may slide relative to the first support member 721 coupled to the motor assembly 1010. When seen from above the fourth support area 7204 of the second support member 722 (e.g., when seen in the +z-axis direction), the area, in which the second support member 722 covers the first support member 721 and the linear gear 1040 disposed on the first support member 721, may decrease in case that the second support member 722 slides out and increase in case that the second support member 722 slides in. In various embodiments, the circular gear 1030 may be referred to as "a pinion" or "a pinion gear", and the linear gear 1040 may be referred to as "a rack" or "a rack gear". The circular gear 1030 and the linear gear 1040 may be formed of a material (e.g., metal or engineering plastic) which has stiffness or proof stress to prevent and/or reduce substantial deformation thereof against the force acting on sliding of the second support member 722.

According to various embodiments, the first support member 721 may be implemented in an integral form including the linear gear 1040. Multiple gear teeth 1041, which are linearly arranged in the slide-out direction (e.g., the +x-axis direction) of the second support member 722, may be formed in a portion of the second support area 7202 of the first support member 721, which corresponds to the circular gear 1030.

According to an embodiment, in order to reduce motion transfer loss or power transmission loss, a lubricant (e.g., grease) may be placed between the circular gear 1030 and the linear gear 1040 so as to secure a smooth movement between the circular gear 1030 and the linear gear 1040 and/or durability thereof. In various embodiments, the circular gear 1030 and/or linear gear 1040 may be coated with a lubricating coating (e.g., a coating using various lubricating materials such as a Teflon coating) to reduce motion friction.

According to various embodiments, the circular gear 1030 may be defined or interpreted as an element included in the gear structure 1012.

According to an embodiment, the motor assembly 1010 may be disposed on (or connected to) the second support member 722 using the bracket 1020. The bracket 1020 may contribute so that the motor assembly 1010 is stably positioned in the second support member 722. The bracket 1020 may contribute to the durability of the motor assembly 1010. In an embodiment, the bracket 1020 may be coupled to the gear structure 1012 of the motor assembly 1010, and may be coupled to the second support member 722 by screw fastening (or bolt fastening).

According to an embodiment, the bracket 1020 may include a first portion 1021, a second portion 1022, and/or a third portion 1023. The first portion 1021 may be coupled to the gear structure 1012 of the motor assembly 1010, and may rotatably support the second rotation shaft 1013 of the gear structure 1012. The gear structure 1012 may include one or more gears (not shown) drivingly connected to the first rotation shaft of the motor 1011, and a gear structure housing 1012a in which the one or more gears are accommodated. The second rotation shaft 1013 of the gear structure 1012 may be connected to the one or more gears accommodated in the gear structure housing 1012a, and may extend to the outside of the gear structure housing 1012a. The first portion 1021 of the bracket 1020 may include a first structure part 1021a which allows the gear structure housing 1012a to be stably positioned in the bracket 1020 without shaking. For example, the first structure part 1021a may have a shape which allows the gear structure housing 1012a to be fitted thereinto. In case that the second rotation shaft 1013 is rotated such that power is transmitted to the circular gear 1030 engaged with the linear gear 1040 coupled to the first support member 721, the first structure part 1021a may support the gear structure housing 1012a to prevent and/or reduce the gear structure housing 1012a from rotating in the direction opposite to that of the second rotation shaft 1013 due to action and reaction. In various embodiments, an adhesive material may be placed between the first structure part 1021a and the gear structure housing 1012a. In various embodiments, the first structure part 1021a and the gear structure housing 1012a may be coupled by screw fastening. The first portion 1021 of the bracket 1020 may include a second structure part 1021b for rotatably supporting the end of the second rotation shaft 1013. For example, the end of the second rotation shaft 1013 may be positioned in a through-hole formed through the second structure part 1021b. In order to reduce the frictional force between the end of the second rotation shaft 1013 and the surface of the through-hole included in the second structure part 1021b, a lubricant (e.g., grease) may be interposed between the end of the second rotation shaft 1013 and the surface of the through-hole included in the second structure part 1021b. In various embodiments, the end of the second rotation shaft 1013 and/or the surface of the through-hole included in the second structure part 1021b may be coated with a lubricating coating (e.g., a coating using various lubricating materials such as a Teflon coating). In various embodiments, a rotation support member 1070 such as a bearing may be interposed between the end of the second rotation shaft 1013 and the surface of the through-hole included in the second structure portion 1021b. The first structure part 1021a and the second structure part 1021b may be positioned to be spaced apart from each other in the direction (e.g., the y-axis direction) in which the second rotation shaft 1013 extends, and the first portion 1021 of the bracket 1020 may include a third structure part 1021c for connecting the first structure part 1021a and the second structure part 1021b. The circular gear 1030 may be positioned on the second rotation shaft 1013 to correspond to between the first structure part 1021a and the second structure part 1021b. The first portion 1021 of the bracket 1020 may have a space (e.g., hollow part) 1021d formed by the first structure part 1021a, the second structure part 1021b, and the third structure part 1021c, and the circular gear 1030 positioned on the second rotation shaft 1013 may be positioned in the space 1021d. The second portion 1022 of the bracket 1020 may extend from the first portion 1021, and may be coupled to the second support member 722 by screw fastening. For example, the second portion 1022 may include a first screw hole H1 corresponding to a first screw B1. The third portion 1023 of the bracket 1020 may extend from the first portion 1021, and may be coupled to the second support member 722 by screw fastening. For example, the third portion 1023 may include a second screw hole H2 corresponding to a second screw B2. The second support member 722 may include a first screw fastening part (not shown) formed to correspond to the second portion 1022 of the bracket 1020. The second support member 722 may include a second screw fastening part (not shown) formed to correspond to the third portion 1023 of the bracket 1020. For example, the first screw fastening part (e.g., a first boss) and the second screw fastening part (e.g., a second boss) may include a hole structure including female threads capable of being engaged with male threads of a screw. When seen from above the fourth support area 7204 included in the second support member 722 (e.g., when seen in the +z-axis direction), with reference to the first portion 1021, the second portion 1022 may extend from one side of the first portion 1021, and the third portion 1023 may extend from the other side of the first portion 1021. The first portion 1021 coupled to the gear structure 1012 may be supported by the second portion 1022 and the third portion 1023 coupled to the second support member 722. In various embodiments, the number or position of portions for screw fastening with the second support member 722 is not limited to the illustrated example, and may be various.

According to an embodiment, the bracket 1020 may be implemented as an integral metal structure including the first portion 1021, the second portion 1022, and/or the third portion 1023. For example, the bracket 1020 may include titanium, an amorphous alloy, or stainless steel. For another example, the bracket 1020 may include magnesium, a magnesium alloy, aluminum, an aluminum alloy, a zinc alloy, or a copper alloy. The bracket 1020 may include various other metal materials. The bracket 1020 is not limited to the illustrated example, and may be modified into various other shapes capable of stably or firmly connecting the motor assembly 1010 and the second support member 722. The bracket 1020 may be an element for stably positioning the motor assembly 1010 on the second support member 722, and be referred to as various other terms such as "a connection structure", "a connection member", "a motor assembly support member", "a motor assembly support structure", "a motor assembly bracket", or "a frame".

According to an embodiment, the motor 1011 may include a motor housing 1011a in which elements (e.g., a stator and a rotor) for rotation of the first rotation shaft are accommodated. For example, the motor housing 1011a may have a hollow cylinder shape including an outer circumferential surface having substantially the same diameter as the gear structure housing 1012a of the gear structure 1012. The motor housing 1011a or the gear structure housing 1012a is not limited to the hollow cylinder shape according to the illustrated example, and may be various.

According to an embodiment, the motor assembly 1010 may include a connection member (or a connection structure or a bracket) 1080 between the motor 1011 and the gear structure 1012. The motor 1011 and the gear structure 1012 may be coupled using the connection member 1080. For example, the connection member 1080 may include a structure into which the motor 1011 and the gear structure 1012 are fitted, or a structure for supporting bonding or screw fastening with the motor 1011 and gear structure 1012. The connection member 1080 may have various other structures for connecting the motor 1011 and the gear structure 1012. In various embodiments, the motor assembly 1010 may be implemented such that the connection member 1080 is not exposed to the outside, differently from the illustrated example.

According to an embodiment, the motor assembly 1010 may include a fixation member 1014 connected to the motor 1011. The fixation member 1014 may be coupled to the second support member 722 by screw fastening. For example, the fixation member 1014 may include a third screw hole H3 corresponding to a third screw B3. The second support member 722 may include a third screw fastening part (e.g., a third boss) (not shown) formed to correspond to the fixation member 1014. In an embodiment, the motor housing 1011a may be positioned between the fixation member 1014 and the gear structure housing 1012a, in the direction (e.g., the y-axis direction) in which a rotation shaft (e.g., the second rotation shaft 1013) of the motor assembly 1010 extends. Since the motor assembly 1010 is positioned on the second support member 722 using the bracket 1020 connected to the gear structure 1012 of one side thereof, and the fixation member 1014 connected to the motor 1011 of the other side thereof, a stable and firm coupling structure between the motor assembly 1010 and the second support member 722 may be formed. In various embodiments, the motor housing 1011a may be implemented in an integral form including the fixation member 1014.

According to an embodiment, the fifth printed circuit board 1050 may be electrically connected to a coil included in a stator (or coil assembly) positioned in an inner space of the motor housing 1011a of the motor 1011. Although not illustrated in FIGS. 10 and 11, the fifth printed circuit board 1050 may be electrically connected to another printed circuit board (e.g., the fourth printed circuit board 614 in FIG. 13) positioned in the second support area 7202 of the first support member 721 using the electrical connection member 1060 such as a flexible printed circuit board (FPCB). The sliding drive device 1000 may be defined or interpreted as including the fourth printed circuit board 614 in FIG. 13. The fifth printed circuit board 1050 may be formed of a flexible printed circuit board. In various embodiments, an integral flexible printed circuit board may be formed in place of the fifth printed circuit board 1050 and the electrical connection member 1060. In various embodiments, the fifth printed circuit board 1050 may be formed of a rigid printed circuit board (rigid PCB). In various embodiments, an integral RFPCB may be formed in place of the fifth printed circuit board 1050 and the electrical connection member 1060, and a portion of the RFPCB, which corresponds to the fifth printed circuit board 1050, may be rigid and portion of the RFPCB, which corresponds to the electrical connection member 1060, may be flexible.

According to an embodiment, the fifth printed circuit board 1050 may include a third surface 1203 and a fourth surface 1024 positioned at the side opposite to the third surface 1203. For example, the third surface 1203 may be oriented in the slide-out direction (e.g., the +x-axis direction) of the second support member 722.

In case that a current (or an electrical signal) is provided to the motor 1011 of the motor assembly 1010, heat may be emitted from the motor 1011. For example, a portion of the current may be converted into thermal energy and be emitted due to a resistance component included in a coil included in the stator accommodated in the motor housing 1011a. In addition to the stator, other elements (e.g., a resistance element) capable of emitting heat may be positioned in the inner space of the motor housing 1011a. The motor 1011 may be understood as being separated from a component provided in order to intentionally emit heat. The heat emitted from the motor 1011 may be substantially generated from elements positioned in the inner space of the motor housing 1011a, and hereinafter, may be defined or interpreted as "heat generated inside the motor 1011". A part of heat generated inside the motor 1011 may be moved to the motor housing 1011a, by thermal conduction (e.g., a heat transfer method in which heat flows from a high-temperature part to a low-temperature part) or convection heat transfer (e.g., energy heat transfer method between a solid surface and gas). By convection heat transfer, heat may be moved from the motor housing 1011a to air (e.g., air inside the electronic device 2) around the motor housing 1011a. A part of heat generated inside the motor 1011 may be moved to the gear structure 1012. For example, by thermal conduction, heat may be moved from the motor 1011 to the gear structure 1012 (e.g., the gear structure housing 1012a, one or more gears accommodated in the gear structure housing 1012a, or the second rotation shaft 1013). By convection heat transfer, heat may be moved from the gear structure 1012 to air around the gear structure 1012. By thermal conduction, heat may be moved from the gear structure 1012 to the bracket 1020. By convection heat transfer, heat may be moved from bracket 1020 to air around the bracket 1020. By thermal conduction, heat may be moved from the motor 1011, the gear structure 1012, and/or the bracket 1020 to the second support member 722. For example, through the area in which the motor 1011 and the second support member 722 are in physical contact with each other, heat may be moved from the motor 1011 to the second support member 722. For example, heat may be moved from the motor housing 1011a to the second support member 722 via at least one thermal conductive member interposed between the motor 1011 and the second support member 722. For example, through the area in which the gear structure 1012 and the second support member 722 are in physical contact with each other, heat may be moved from the gear structure 1012 to the second support member 722. For example, heat may be moved from the gear structure 1012 to the second support member 722 via at least one thermal conductive member interposed between the gear structure 1012 and the second support member 722. For example, through the area in which the bracket 1020 and the second support member 722 are in physical contact with each other, heat may be moved from the bracket 1020 to the second support member 722. For example, heat may be moved from the bracket 1020 to the second support member 722 via at least one thermal conductive member interposed between the bracket 1020 and the second support member 722. By thermal conduction, heat may be moved from the second support member 722 to at least one element (e.g., the second housing 22 in FIG. 6) connected to the second support member 722. By convection heat transfer, heat may be moved from the second support member 722 to air around the second support member 722.

According to an embodiment, a part of heat generated inside the motor 1011 may be moved to the first support member 721 via the second support member 722. For example, through the area in which the first support member 721 and the second support member 722 are in physical contact with each other, heat may be moved from the second support member 722 to the first support member 721. For example, heat may be moved from the second support member 722 to the first support member 721 via at least one thermal conductive member interposed between the first support member 721 and the second support member 722. By thermal conduction, heat may be moved from the first support member 721 to at least one element (e.g., the first housing 21 in FIG. 6) connected to the first support member 721. By convection heat transfer, heat may be moved from the first support member 721 to air around the first support member 721. The element such as the gear structure 1012, the bracket 1020, the first support member 721, or the second support member 722 may function as a heat spreader which disperses or diffuses heat generated inside the motor 1011 so as not to concentrate at the motor 1011. Heat generated inside the motor 1011 may be dispersed or diffused therearound through various other heat transfer paths. A heat dissipation structure for dispersing or diffusing heat generated inside the motor 1011 may prevent and/or reduce the motor 1011 from overheating, thereby reducing performance degradation or damage of the motor 1011.

According to an embodiment, the first thermal conductive member 1110 may become a heat transfer path through which heat is moved from the bracket 1020 to the first support member 721, in a closed state (see FIG. 2) of the electronic device 2. For example, the first thermal conductive member 1110 may become a path through which heat transferred from the motor 1011 to the bracket 1020 is moved. The first thermal conductive member 1110 may be disposed in the first support part ⓐ of the first support member 721, and may be positioned to be spaced apart from the bracket 1020 in case that the second support member 722 slides out. In a closed state of the electronic device 2, the bracket 1020 may become close to the first support part ⓐ, and thus may be in physical contact with the first thermal conductive member 1110 disposed on the first support part ⓐ. In a closed state of the electronic device 2, heat may be moved from the bracket 1020 to the first support part ⓐ and dispersed or diffused to the first support member 721 via the first thermal conductive member 1110. In an embodiment, the first support part ⓐ may become an interference structure which prevents and/or reduces the second support member 722 from moving relative to the first support member 721 in the slide-in direction any longer. For example, the first support part ⓐ may have a height protruding from the second support area 7202 of the first support member 721 in the direction in which the second flat-surface part R1 (see FIG. 3 or 4) of the electronic device 2 is oriented. For example, the first support part ⓐ may have a width extending in a direction (e.g., the y-axis direction) orthogonal to the sliding direction of the second support member 722 and orthogonal to the direction in which the screen S (see FIG. 2 or 4) is oriented.

According to an embodiment, the second thermal conductive member 1120 may become a heat transfer path through which heat is moved from the motor 1011 to the second support member 722. The second thermal conductive member 1120 may be positioned between the fourth surface 1204 of the fifth printed circuit board 1050 and the second support part ⓑ of the second support member 722. Heat may be moved from the motor 1011 to the second support part ⓑ and dispersed or diffused to the second support member 722 via the second thermal conductive member 1120.

According to an embodiment, the third thermal conductive member 1130 may become a heat transfer path through which heat is moved from the motor housing 1011a of the motor 1011 to the gear structure housing 1012a of the gear structure 1012. The third thermal conductive member 1130 may become a heat transfer path through which heat is moved from the motor housing 1011a to the second support member 722. The third thermal conductive member 1130 may become a heat transfer path through which heat is moved from the gear structure housing 1012a to the second support member 722. For example, a first portion of the third thermal conductive member 1130 may be positioned between the motor housing 1011a and the third support part ⓒ of the second support member 722, and thus heat is moved from the motor housing 1011a to the third support part ⓒ via the third thermal conductive member 1130 and then dispersed or diffused to the second support member 722. For example, a second portion of the third thermal conductive member 1130 may be positioned between the gear structure housing 1012a and the third support area ⓒ, and thus heat is moved from the gear structure housing 1012a to the third support part ⓒ via a third thermal conductive member 1130 and then dispersed or diffused by the second support member 722. There may be a thermal conduction between the first portion and the second portion of the third thermal conductive member 1130. The first portion of the third thermal conductive member 1130 may be in contact with the motor housing 1011a, the second portion of the third thermal conductive member 1130 may be in contact with the gear structure housing 1012a, and thus a heat transfer between the motor 1011 and the gear structure 1012 may be performed through the third thermal conductive member 1130. The first portion of the third thermal conductive member 1130 may contribute so that heat is diffused or dispersed in the motor 1011. The second portion of the third thermal conductive member 1130 may contribute so that heat is diffused or dispersed in the gear structure 1012.

According to an embodiment, the fourth thermal conductive member 1140 may become a heat transfer path through which heat is moved from the motor assembly 1010 to air (e.g., internal air of the electronic device 2) around the motor assembly 1010. A first portion of the fourth thermal conductive member 1140 may be positioned in the opening formed through the motor housing 1011a of the motor 1011, and thus may receive a part of heat generated inside the motor 1011. A second portion of the fourth thermal conductive member 1140 may be positioned in the motor housing 1011a, and thus may receive heat from the motor housing 1011a through a thermal conduction. A third portion of the fourth thermal conductive member 1140 may be positioned in the gear structure housing 1012a of the gear structure 1012, so that there is thermal conduction between the gear structure housing 1012a and the third portion. There may be thermal conduction between the first portion and the second portion of the fourth thermal conductive member 1140, and thermal conduction between the second portion and the third portion of the fourth thermal conductive member 1140. The first portion and the second portion of the fourth thermal conductive member 1140 may be positioned to correspond to the motor 1011, the third portion of the fourth thermal conductive member 1140 may be positioned to correspond to the gear structure 1012, and thus heat transfer between the motor 1011 and the gear structure 1012 may be performed through the fourth thermal conductive member 1140. The first portion and the second portion of the fourth thermal conductive member 1140 may contribute so that heat is dispersed or diffused in the motor 1011. The third portion of the third thermal conductive member 1140 may contribute so that heat is diffused or dispersed in the gear structure 1012. In an embodiment, the fourth thermal conductive member 1140 may be formed of a heat dissipation structure including multiple dissipation fins (cooling fins, or radiation fins). For example, the fourth thermal conductive member 1140 may be a heat sink. By convection heat transfer, heat may be moved from the fourth thermal conductive member 1140 to air (e.g., internal air of the electronic device 2) around the fourth thermal conductive member 1140.

Figure 13:
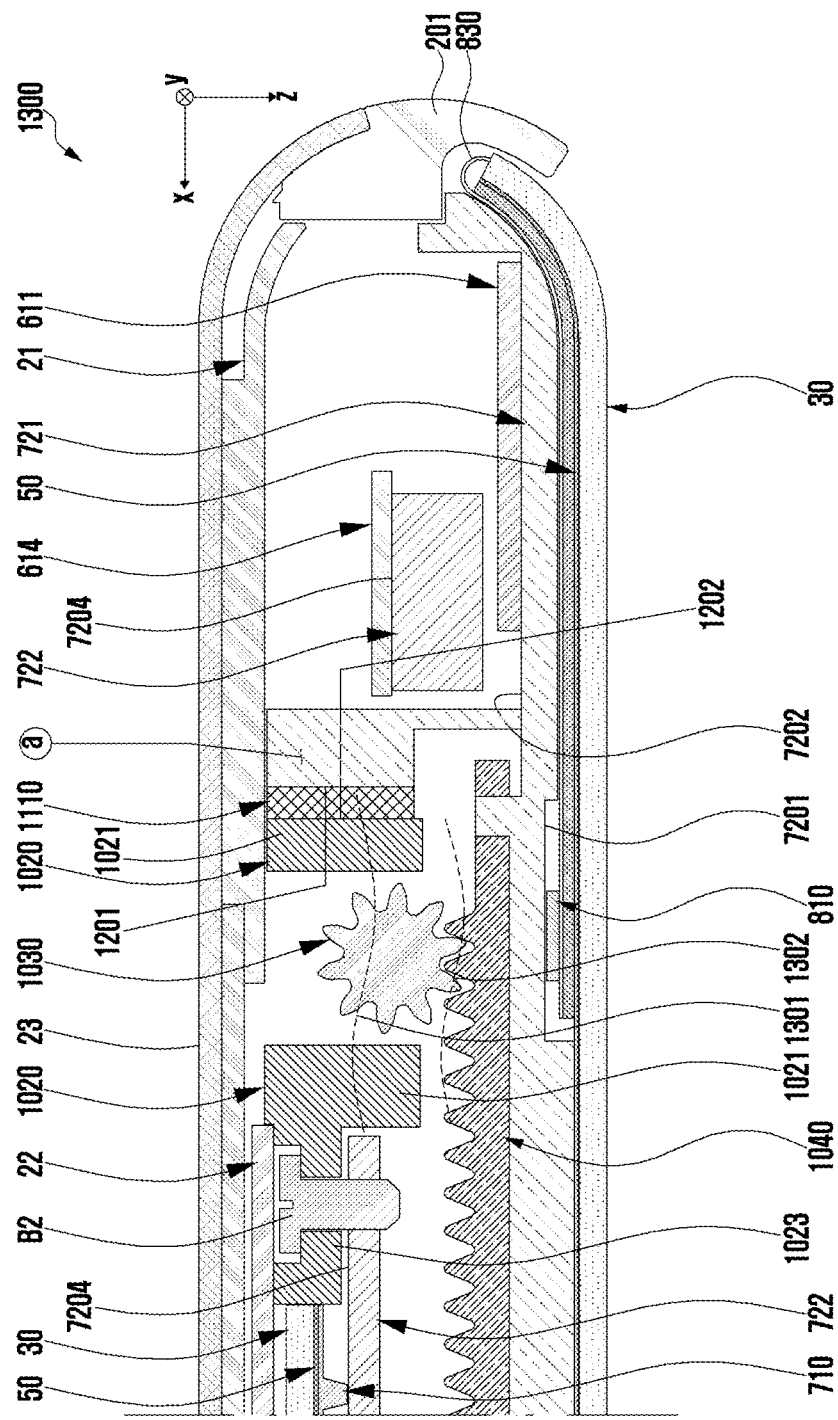
FIG. 13 is a cross-sectional view of an electronic device corresponding taken along line C-C' in FIG. 12 according to various embodiments.
Figure 14:
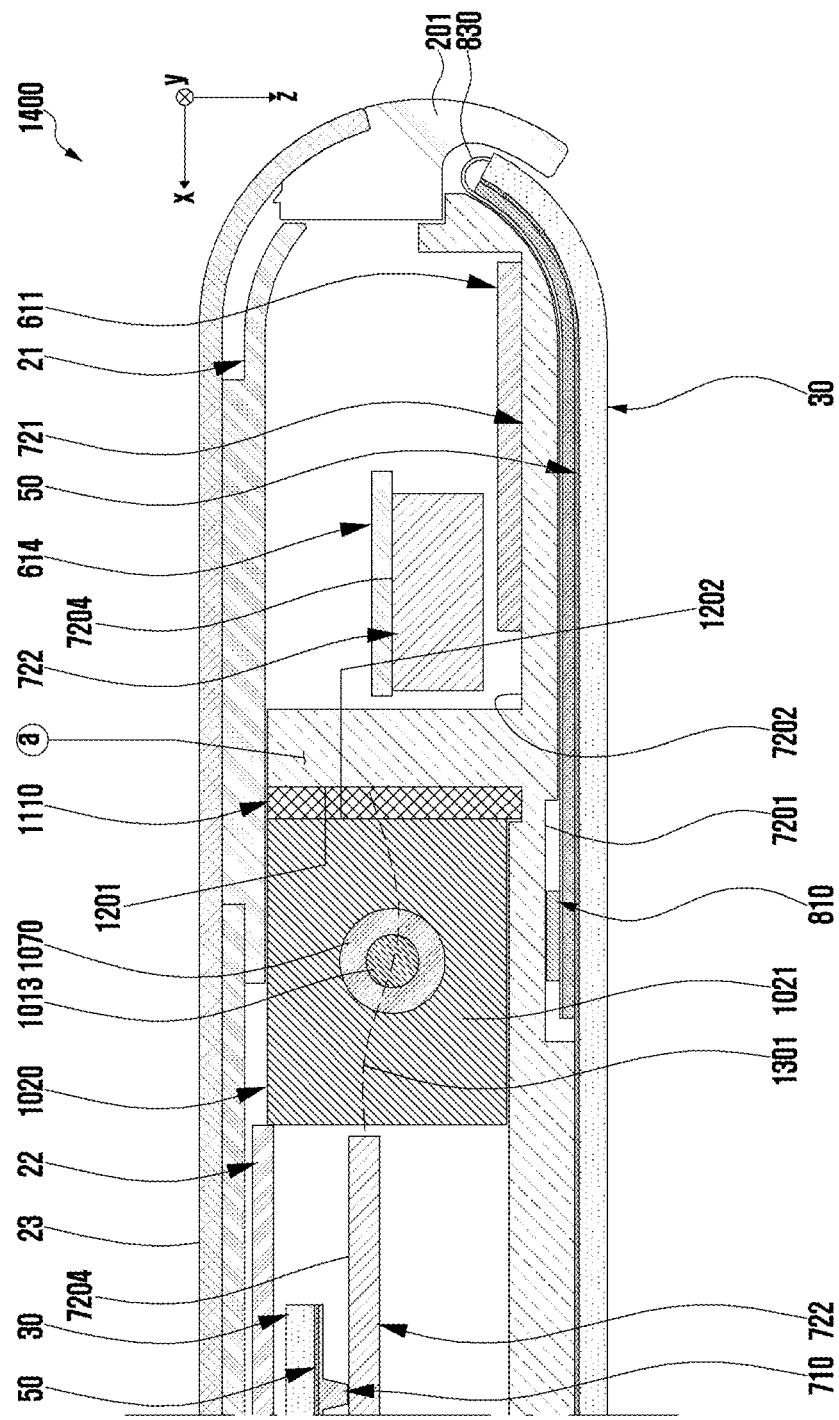
FIG. 14 is a cross-sectional view of an electronic device taken along line D-D' in FIG. 12 according to various embodiments.

FIG. 13 is a cross-sectional view 1300 of an electronic device 2 take along line C-C' in FIG. 12 according to various embodiments. FIG. 14 is a cross-sectional view 1400 of an electronic device 2 taken along line D-D' in FIG. 12 according to various embodiments.

Referring to FIGS. 10, 11, 12, 13, and 14, in an embodiment, the first support member 721 may include the first support part (a) positioned to correspond to the bracket 1020. For example, the first support part (a) may be a shape having a height protruding from the second support area 7202 of the first support member 721. The bracket 1020 may include a second surface 1202 substantially facing the first surface 1201 of the first support part (a). In an embodiment, the first surface 1201 of the first support part (a) may be a flat surface substantially oriented in the slide-out direction of the second support member 722. In an embodiment, the first surface 1201 of the first support part (a) and the second surface 1202 of the bracket 1020 may be flat surfaces which are substantially parallel to each other. The spaced distance between the first surface 1201 of the first support part (a) and the second surface 1202 of the bracket 1020 in the sliding direction (e.g., the x-axis direction) of the second support member 722 may increase in case that the second support member 722 slides out and may decrease in case that the second support member 722 slides in.

According to an embodiment, the third portion 1023 of the bracket 1020 may be disposed in the fourth support area 7204 of the second support member 722 using the second screw B2. The second portion 1022 (see FIG. 12) of the bracket 1020 may be disposed in the fourth support area 7204 of the second support member 722 using the first screw B1 (see FIGS. 10 and 11). The first portion 1021 of the bracket 1020 may be connected to the second portion 1022 and the third portion 1023, and thus may be supported by the second portion 1022 and the third portion 1023, which are coupled to the second support member 722, to be positioned relative to the second support member 722. In an embodiment, the first portion 1021 may be positioned in an opening 1301 (e.g., a notch) formed through the second support member 722, so as to contribute to the slimness of an assembly to which the bracket 1020 and the second support member 722 are coupled.

According to an embodiment, the first portion 1021 of the bracket 1020 may include a dented shape space 1302 so as not to interfere with a linear movement of the linear gear 1040 in case that the second support member 722 coupled to the linear gear 1040 slides relative to the first support member 721 coupled to the motor assembly 1010.

According to an embodiment, the first thermal conductive member 1110 may be disposed on the first surface 1201 of the first support part (a) included in the first support member 721. In case that the electronic device 2 is switched from an open state (see FIG. 4) to a closed state (see FIG. 2), the second surface 1202 of the bracket 1020 may come into contact with the first thermal conductive member 1110. In case that the electronic device 2 is switched from a closed state to an open state, the second surface 1202 of the bracket 1020 may be positioned to be spaced apart from the first thermal conductive member 1110. In a closed state of the electronic device 2, heat emitted from the motor assembly 1010 may be moved to the first support member 721 via the bracket 1020 and the first thermal conductive member 1110 by thermal conduction, and thus may be dispersed or diffused. For example, the first thermal conductive member 1110 may include various materials capable of securing heat transfer performance (or thermal conductivity) between the bracket 1020 and the first support part (a) as a thermal interface material (TIM).

According to an embodiment, the first support part (a) of the first support member 721 may become an interference structure which prevents and/or reduces the second support member 722 from moving relative to the first support member 721 in the slide-in direction any longer. In case that the second surface 1202 of the bracket 1020 comes into contact with the first thermal conductive member 1110 disposed in the first support part (a) of the first support member 721, the second support member 722 may be difficult to move relative to the first support member 721 in the slide-in direction any longer. The first support part (a) may limit the distance at which the second support member 722 slides relative to the first support member 721, and thus may contribute so that the second support member 722 or at least one element positioned thereon does not interfere or collide with the first support member 721 or at least one element positioned thereon. In various embodiments, the first support part (a) may be referred to as other terms such as "a stopper".

According to an embodiment, the first thermal conductive member 1110 may have flexibility or elasticity. For example, in a closed state (see FIG. 2) of the electronic device 2, the first thermal conductive member 1110 may be resiliently positioned between the bracket 1020 and the first support part (a) of the first support member 721. In a closed state of the electronic device 2, the first thermal conductive member 1110, which is resiliently positioned between the bracket 1020 and the first support part (a), may reduce the occurrence of a gap (e.g., an air gap) between the first thermal conductive member 1110 and the bracket 1020, and thus may contribute to securing the area (e.g., the boundary surface for heat transfer between the two media) in which the first thermal conductive member 1110 and the bracket 1020 are in physical contact with each other.

According to an embodiment, the first thermal conductive member 1110 may mitigate a collision (or stress effect) between the bracket 1020 and the first support part (a) of the first support member 721. In various embodiments, the first thermal conductive member 1110 may reduce vibration or noise which may occur in the electronic device 2 due to the operation of the sliding drive device 1000 (see FIG. 12). The first thermal conductive member 1110 may include a material capable of reducing vibration or noise while securing heat transfer performance between the bracket 1020 and the first support part (a).

According to an embodiment, the first thermal conductive member 1110 may be disposed in the first support part (a) of the first support member 721 using an adhesive material. For example, the adhesive material may be a liquid form material or a paste form material capable of reducing the occurrence of an air gap or an air bubble (e.g., a bubble) in case that the first thermal conductive member 1110 is disposed in the first support part (a). For another example, the adhesive material may be an adhesive sheet. The adhesive material may include a thermal conduction material capable of ensuring heat transfer performance between the first thermal conductive member 1110 and the first support part (a). In various embodiments, the first thermal conductive member 1110 may be disposed in the first support part (a) using various other methods such as screw fastening.

According to various embodiments, the first thermal conductive member 1110 may be disposed on the bracket 1020. In case that the electronic device 2 is switched from an open state (see FIG. 4) to a closed state (see FIG. 2), the first support part (a) of the first support member 721 may come into contact with the first thermal conductive member 1110. In case that the electronic device 2 is switched from a closed state to an open state, the first support part (a) may be positioned to be spaced apart from the first thermal conductive member 1110. In an embodiment, the first thermal conductive member 1110 may be disposed on the second surface 1202 of the bracket 1020 using the adhesive material. For example, the adhesive material may be a liquid form material or a paste form material capable of reducing the occurrence of an air gap or an air bubble in case that the first thermal conductive member 1110 is disposed on the second surface 1202 of the bracket 1020. For another example, the adhesive material may be an adhesive sheet. The adhesive material may include a thermal conduction material capable of ensuring heat transfer performance between the first thermal conductive member 1110 and the bracket 1020. In various embodiments, the first thermal conductive member 1110 may be disposed on the second surface 1202 of the bracket 1020 using various other methods such as screw fastening.

According to various embodiments, the first surface 1201 of first support part (a) included in first support member 721, or the second surface 1202 of the bracket 1020 is not limited to the illustrated example, and may be modified into various different shapes such as an inclined surface, a curved surface, a bent surface, or a concave-convex surface. For example, in a closed state of the electronic device 2, the first surface 1201 and the second surface 1202 may be implemented in a form capable of reducing the influence of stress on the first thermal conductive member 1110 while securing heat transfer performance between the first support part (a) and the bracket 1020.

According to an embodiment, the electronic device 2 may include the fourth printed circuit board 614 disposed in the fourth support area 7024 of the second support member 722. The fourth printed circuit board 614 may be electrically connected to the fifth printed circuit board 1050 (see FIG. 10, 11, or 12) through the electrical connection member 1060 (see FIG. 10, 11, or 12). The fourth printed circuit board 1050 may be formed of a rigid printed circuit board (rigid PCB). In various embodiments, the fourth printed circuit board 614 may be formed of a flexible printed circuit board.

Figure 15:
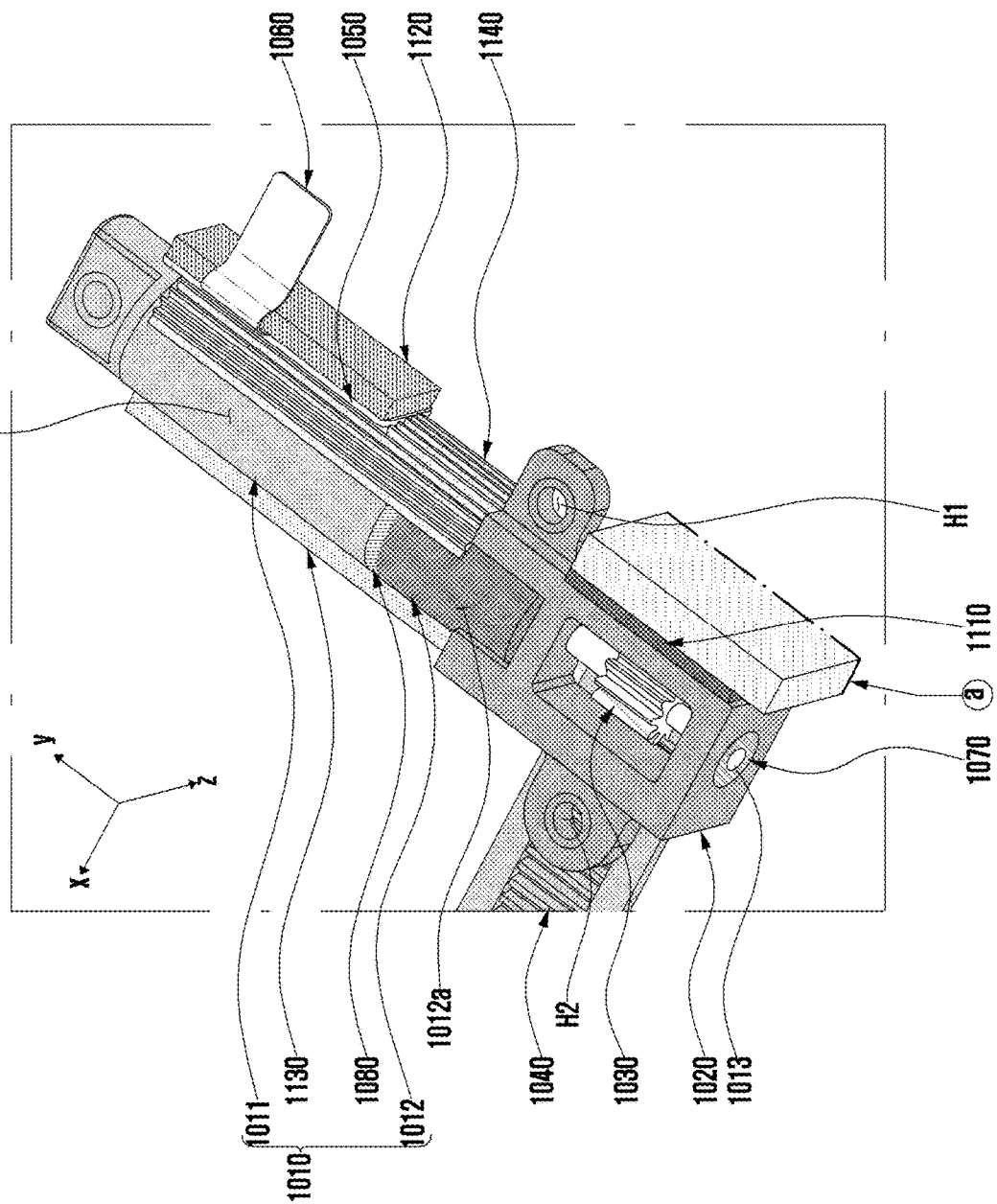
FIG. 15 is a partial perspective view showing a motor, a gear structure, a connection member, a bracket, a circular gear, a linear gear, a fifth printed circuit board, a first thermal conductive member, a second thermal conductive member, a third thermal conductive member, a fourth thermal conductive member, and a first support part according to various embodiments.
Figure 16:
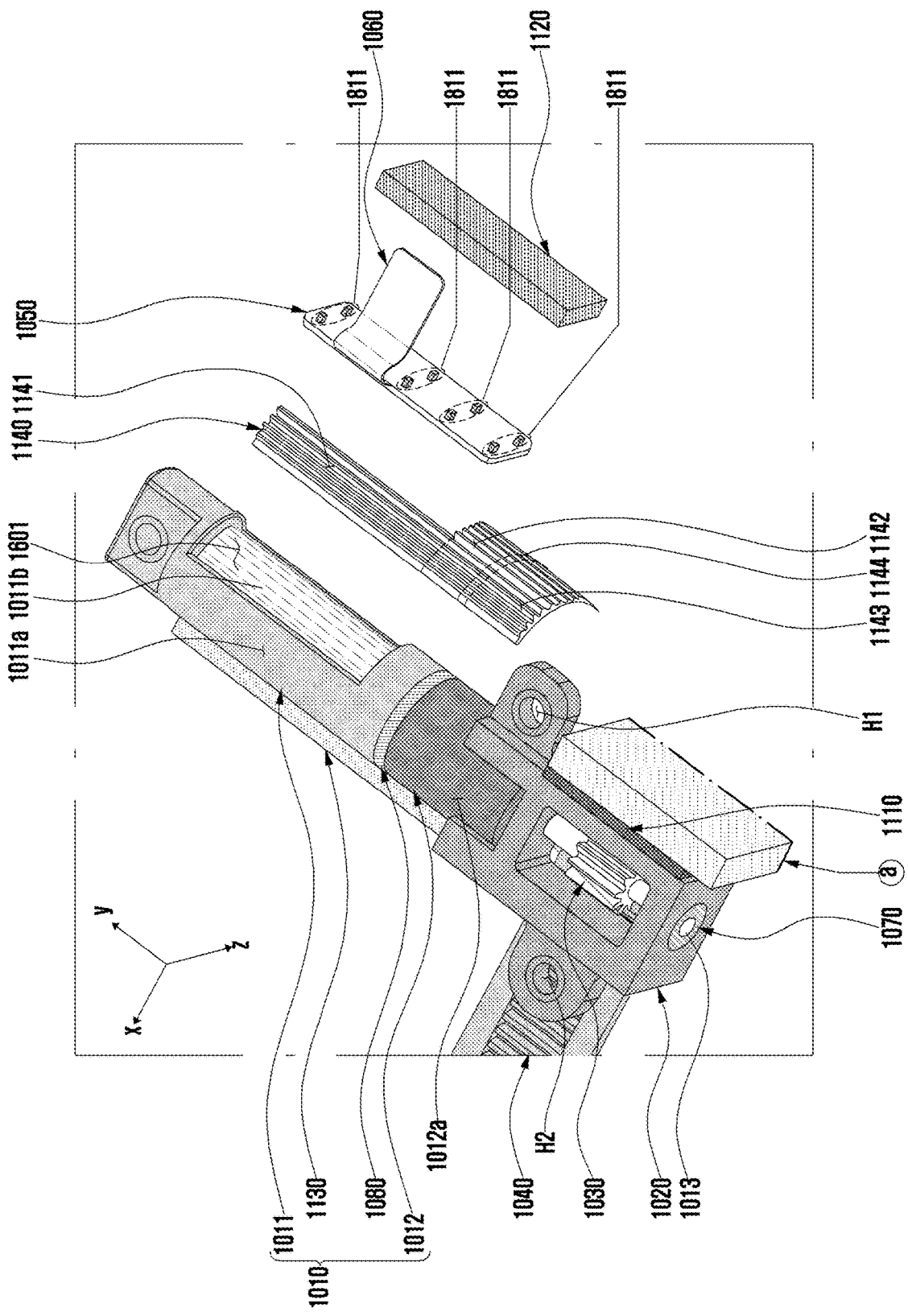
FIG. 16 is an exploded perspective view showing a fifth printed circuit board, an electrical connection member, a second thermal conductive member, and a fourth thermal conductive member, in relation to FIG. 15, according to various embodiments.
Figure 17:
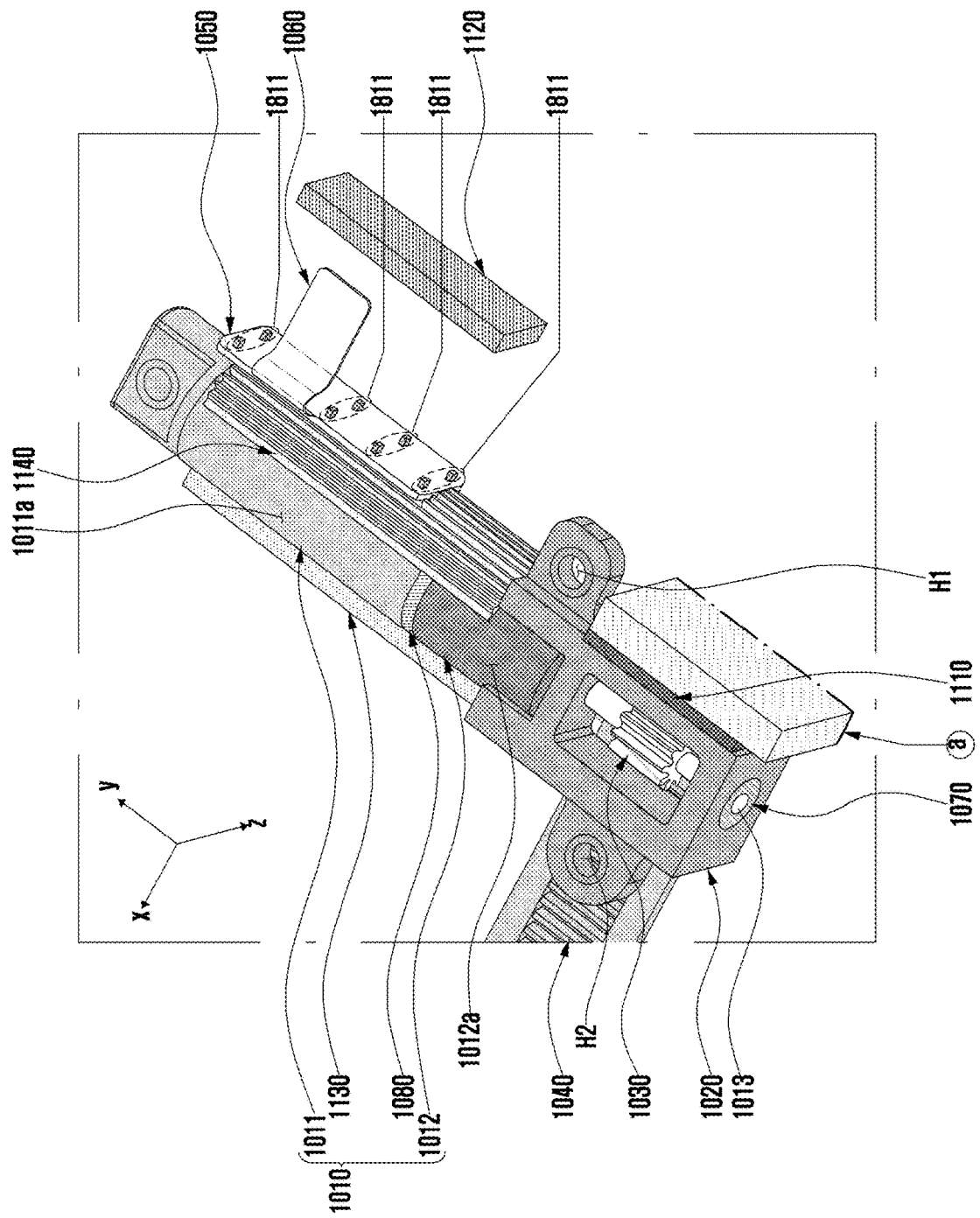
FIG. 17 is an exploded perspective view showing a state in which a second thermal conductive member is separated, in relation to FIG. 15, according to various embodiments.
Figure 18:
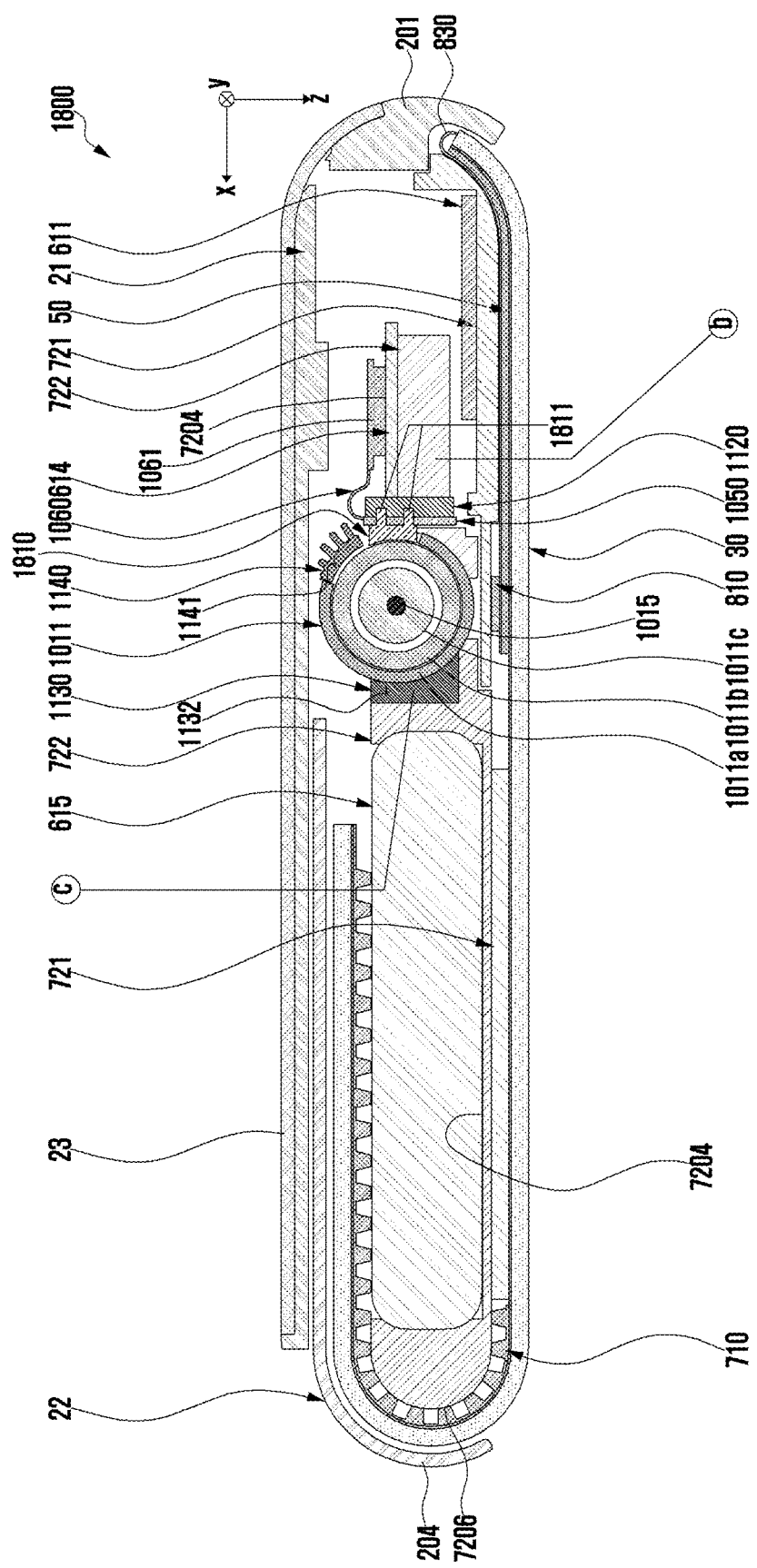
FIG. 18 is a cross-sectional view of an electronic device taken along line E-E' in FIG. 12 according to various embodiments.
Figure 19:
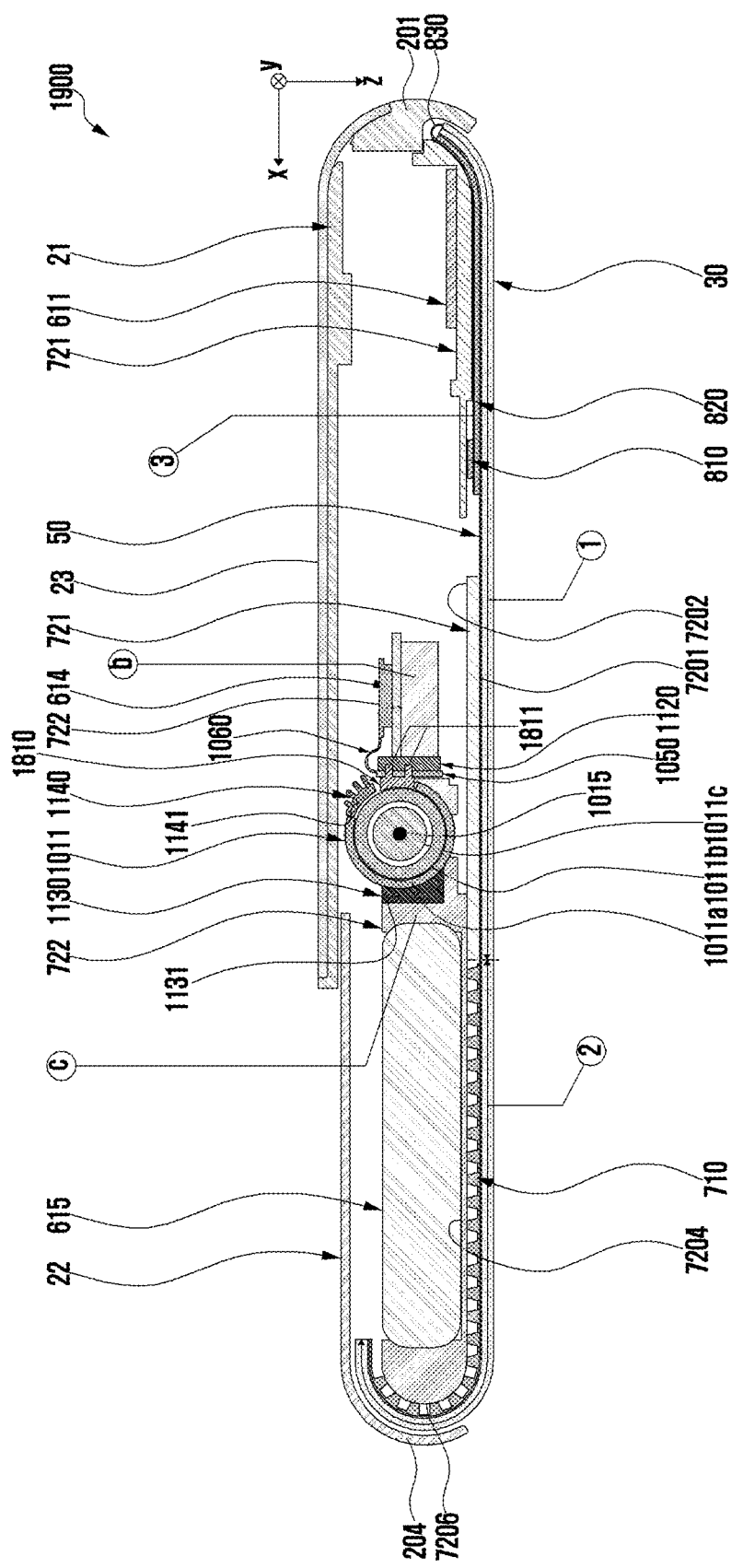
FIG. 19 is a cross-sectional view of an electronic device taken along line E-E' in FIG. 12 according to various embodiments.
Figure 20:
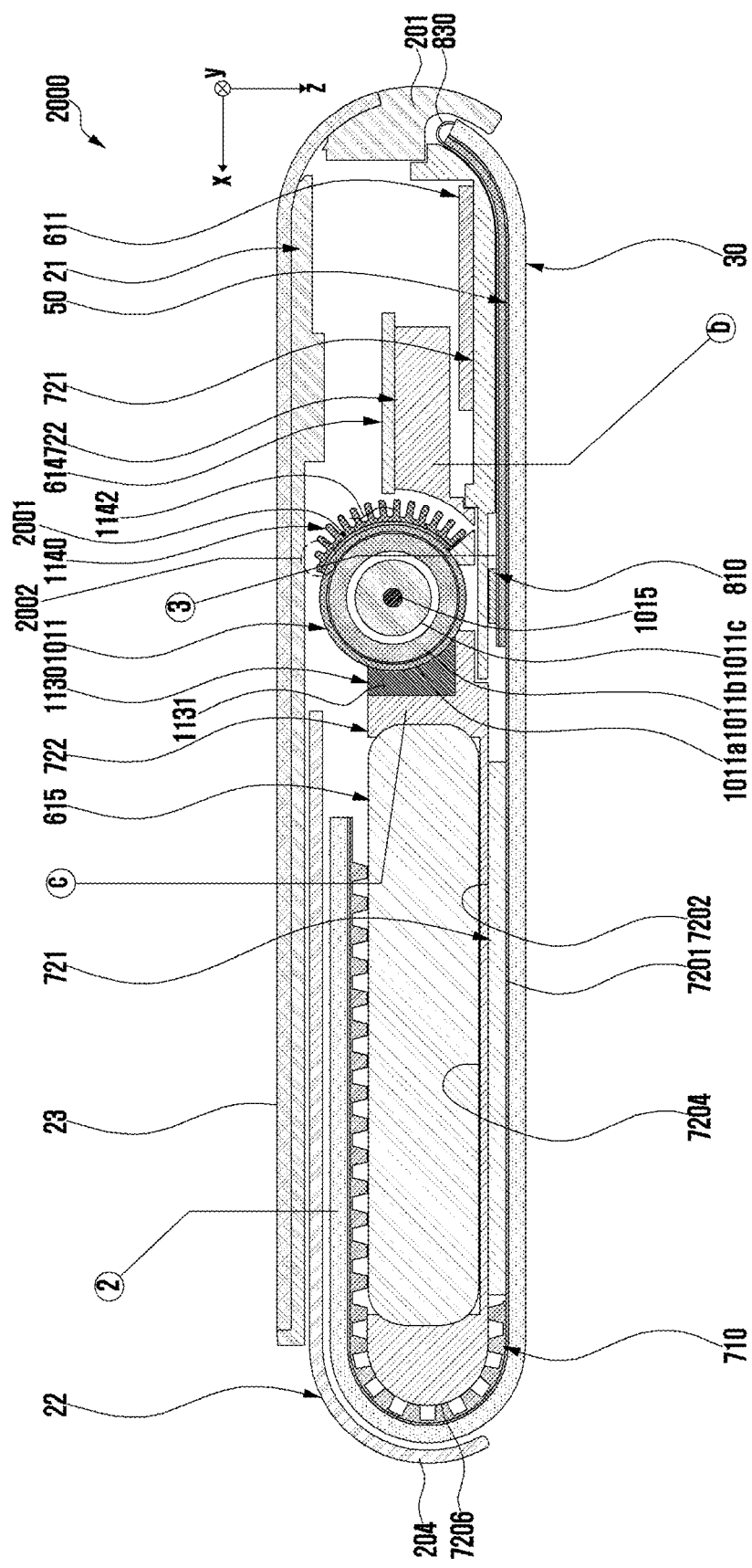
FIG. 20 is a cross-sectional view of an electronic device taken along line F-F' in FIG. 12 according to various embodiments.

FIG. 15 is a partial perspective view showing a motor 1011, a gear structure 1012, a connection member 1080, a bracket 1020, a circular gear 1030, a linear gear 1040, a fifth printed circuit board 1050, a first thermal conductive member 1110, a second thermal conductive member 1120, a third thermal conductive member 1130, a fourth thermal conductive member 1140, and a first support (a) according to various embodiments. FIG. 16 is an exploded perspective view showing a fifth printed circuit board 1050, an electrical connection member 1060, a second thermal conductive member 1120, and a fourth thermal conductive 1140, in relation to FIG. according to various embodiments. FIG. 17 is a perspective view showing a state in which a second thermal conductive member 1120 is separated, in relation to FIG. 15, according to various embodiments. FIG. 18 is a cross-sectional view 1800 of an electronic device 2 taken along line E-E' in FIG. 12 according to various embodiments. FIG. 19 is a cross-sectional view 1900 of an electronic device 2 taken along line E-E' in FIG. 12 according to various embodiments. FIG. 20 is a cross-sectional view 2000 of an electronic device 2 taken along line F-F' in FIG. 12 according to various embodiments.

Referring to FIGS. 15, 16, 17, 18, 19, and 20, in an embodiment, the motor 1011 may include the motor housing 1011a, a stator 1011b, and a rotor 1011c. The motor housing 1011a may form at least a part of the exterior of the motor 1011, and may include a space in which elements such as the stator 1011b and the rotor 1011c are accommodated. In various embodiments, the motor housing 1011a may be referred to as other terms such as "a cover" or "a case". The stator 1011b may be a coil assembly including a coil, and may form a rotation magnetic field in case that a current is supplied to the coil. The rotor 1011c may be surrounded by the stator 1011b. For example, the rotor 1011c may be fixed to the inner surface of the motor housing 1011a. In various embodiments, the rotor 1011c may have a portion extending from the inside of the motor housing 1011a, and be implemented in a form in which a coil is wound around the portion. The rotor 1011c including a magnetic material (e.g., a permanent magnet) may rotate in response to the rotation magnetic field formed in the stator 1011b. A first rotation shaft 1015 of the motor 1011*c* may extend from the rotor 1011*c* or be connected to the rotor 1011*c*. The first rotation shaft 1015 may rotate with reference to a rotation center line substantially parallel to a direction (e.g., the y-axis direction) orthogonal to the slide-out direction of the second housing 22 and orthogonal to the direction in which the screen S (see FIG. 2 or 4) is oriented. In various embodiments, the first rotation shaft 1015 may be defined or interpreted as a part of the rotor 1011*c*. The first rotation shaft 1015 may be connected to the gear structure 1012. Power may be transmitted from the motor 1011 to the gear structure 1012 through the first rotation shaft 1015.

According to an embodiment, the motor 1011 may be a step motor. The motor 1011 may be implemented in various other types, and the configuration thereof is not limited.

According to an embodiment, the electronic device 2 (see FIG. 2) may include a motor drive circuit (e.g., a motor controller or a motor driver) electrically connected to the motor 1011. The motor drive circuit may control the motor 1011, based on the control signal received from a processor (e.g., the processor 120 in FIG. 1), and thus, the rotation direction, rotation angle, rotation amount, rotation speed, rotation acceleration, or rotation angular velocity of the second rotation shaft 1013 drivingly connected to the motor 1011 may be adjusted. In an embodiment, the motor drive circuit may include a motor encoder for detecting a drive state of the motor 1011. For example, the motor encoder may include a disc plate coupled to the rotation shaft of the motor 1011, and a detector capable of detecting the rotation direction, rotation angle, rotation amount, rotation speed, rotation acceleration, or rotation angular velocity of the rotation shaft through electronically recognizable scales and marks formed on the disc. The processor may control the motor drive circuit, based on instructions related to the slide-out or slide-in of the second housing 22 (or the second support member 722), which is stored in a memory (e.g., the memory 130 in FIG. 1).

In case that the electronic device 2 is switched from a closed state (see FIG. 2) to an open state (see FIG. 4) or from an open state to a closed state, in case that the sliding speed (or the movement speed) of the second support member 722 is not equal to zero at the time point at which the state switching is completed, there may occur a collision phenomenon in which the first support member 721 and the second support member 722, which relatively move, interact strongly for a relatively short time. The collision phenomenon may make it difficult to provide a smooth sliding motion to a user, and the impact caused by the collision may cause damage of elements (or drive elements) included in the sliding drive device 1000. In an embodiment, the electronic device 2 may control the motor drive circuit so as to control the rotation speed of the second rotation shaft 1013, and thus reduce the collision phenomenon. For example, in case that the electronic device 2 is switched from a closed state to an open state or from an open state to a closed state, the rotation speed of the second rotation shaft 1013 may be controlled such that the second support member 722 stops at the time point at which the state switching is completed while the movement speed thereof is reduced.

According to an embodiment, the second support member 722 may include a seat structure which allows the motor housing 1011*a* of the motor 1011 and/or the gear structure housing 1012*a* of the gear structure 1012 to be stably positioned thereon. The seat structure may include a recess structure or an insert-fitting structure which enables the motor housing 1011*a* and/or the gear structure housing 1012*a* to be stably positioned in the second support member 722 without shaking.

According to an embodiment, the fifth printed circuit board 1050 may be electrically connected to the fourth printed circuit board 614 disposed on the second support member 722 using the electrical connection member 1060 such as a flexible printed circuit board. For example, one end of the electrical connection member 1060 may be electrically connected to the fifth printed circuit board 1050, and the other end of the electrical connection member 1060 may include a connector 1061 used for electrical connection with the fourth printed circuit board 614. The fourth printed circuit board 614 may be electrically connected to the first printed circuit board 611 disposed on the first support member 721 using an electrical path (not shown) such as a flexible printed circuit board. The electrical path for electrically connecting the first printed circuit board 611 disposed on the first support member 721 and the fourth printed circuit board 614 disposed on the second support member 722 may be bent in a form corresponding to the slide-out or the slide-in of the second support member 722.

According to an embodiment, the motor 1011 may include a conductive terminal structure (or a metal structure) 1810 positioned to correspond to an opening 1601 formed through the motor housing 1011*a*. The conductive terminal structure 1810 may be positioned to face the stator 1011*b* of the motor 1011. The motor 1011 may include a seat structure which allows the conductive terminal structure 1810 to be stably positioned in the motor 1011. For example, the seat structure may include a recess structure or an insert-fitting structure which is connected to the motor housing 1011*a* or extends to the motor housing 1011*a* and allows the conductive terminal structure 1810 to be stably positioned thereon. For another example, the seat structure may include a recess structure or an insert-fitting structure which is connected to the stator 1011*b* or extends from the stator 1011*b* and allows the conductive terminal structure 1810 to be stably positioned thereon. The conductive terminal structure 1810 may be positioned in the motor 1011 in various ways such as bonding including an adhesive material or screw fastening. The conductive terminal structure 1810 may be electrically connected to the coil included in the stator 1011*b* and the fifth printed circuit board 1050. A power management circuit (e.g., the power management module 188 in FIG. 1) positioned on the first printed circuit board 611 may provide a current to the fourth printed circuit board 614 under the control of a processor (e.g., the processor 120 In FIG. 1), and the current may be provided to the coil of the stator 1011*b* via the electrical connection member 1060, the fifth printed circuit board 1050, and the conductive terminal structure 1810.

According to an embodiment, the conductive terminal structure 1810 may include multiple inserts 1811 positioned through multiple openings formed through the fifth printed circuit board 1050. The multiple inserts 1811 may be inserted into multiple recesses formed on the second thermal conductive member 1120. A part of heat generated when the motor 90 is driven by the electromagnetic interaction between the stator 1011*b* and the rotor 1011*c* may move to the conductive terminal structure 1810 by thermal conduction or convection heat transfer. A part of heat generated when the motor 90 is driven may be moved to the second thermal conductive member 1120 via the conductive terminal structure 1810. A part of heat generated when the motor 90 is driven may be moved to the second thermal conductive member 1120 via the fifth printed circuit board 1050. There may be a heat movement from the conductive terminal structure 1810 to the fifth printed circuit board 1050. A part of heat generated when the motor 90 is driven may be moved to the second support part ⓑ of the second support member 722 via the second thermal conductive member 1120 and the fifth printed circuit board 1050, and may be dispersed or diffused to the second support member 722.

According to various embodiments, a thermal conduction material of a liquid phase or a paste form may be interposed between the conductive terminal structure 1810 and the stator 1011b of the motor 1011, so that heat transfer performance is improved.

According to various embodiments, a thermal conduction material of a liquid phase or a paste form may be placed between the multiple inserts 1811 of the conductive terminal structure 1810 and the second thermal conductive member 1120, so that heat transfer performance is improved. In various embodiments, a thermal conductive adhesive material may be placed between the multiple inserts 1811 of the conductive terminal structure 1810 and the second thermal conductive member 1120.

According to an embodiment, the second thermal conductive member 1120 may have flexibility or elasticity. For example, the second thermal conductive member 1120 may be resiliently positioned between the fifth printed circuit board 1050 and the second support part ⓑ of the second support member 722. The second thermal conductive member 1120, which is resiliently positioned between the fifth printed circuit board 1050 and the second support part ⓐ, may reduce an air gap between the second support part ⓑ and the second thermal conductive member 1120, and thus may contribute to securing the area (e.g., the boundary surface for heat transfer between two media) in which the second thermal conductive member 1120 and the second support part ⓑ are in physical contact with each other. The multiple recesses of the second thermal conductive member 1120 may be in elastic contact with the multiple inserts 1811 of the conductive terminal structure 1810 to contribute to securing heat transfer performance thereof.

According to various embodiments, a thermal conduction material of a liquid phase or a paste form, which can reduce the occurrence of an air gap or an air bubble, may be interposed between the second thermal conductive member 1120 and the second support part ⓑ of the second support member 722, so that heat transfer performance is improved.

According to an embodiment, the second thermal conductive member 1120 may be disposed in the second support part ⓑ of the second support member 722 using an adhesive material. For example, the adhesive material may be a liquid form material or a paste form material capable of reducing the occurrence of an air gap or an air bubble in case that the second thermal conductive member 1120 is disposed in the second support part ⓑ. For another example, the adhesive material may be an adhesive sheet. The adhesive material may include a thermal conduction material capable of ensuring heat transfer performance between the second thermal conductive member 1120 and the second support part ⓑ. In various embodiments, the second thermal conductive member 1120 may be coupled to the fifth printed circuit board 1050 or the second support part ⓑ using various other methods such as screw fastening.

According to various embodiments, an adhesive material may be placed between the second thermal conductive member 1120 and the fifth printed circuit board 1050. For example, the fifth printed circuit board 1050 may be disposed on the second thermal conductive member 1120 disposed in the second support part ⓑ of the second support member 722 using an adhesive material.

According to an embodiment, the second thermal conductive member 1120 may reduce vibration or noise which may occur in the electronic device 2 due to an operation of the sliding drive device 1000 (see FIG. 12). The second thermal conductive member 1120 may include a material capable of reducing vibration or noise while securing heat transfer performance between the motor assembly 1010 and the second support part ⓑ of the second support member 722.

According to an embodiment, the fourth thermal conductive member 1140 including multiple heat dissipation fins may include a first portion 1141, a second portion 1142, and/or a third portion 1143. The first portion 1141 may be positioned to correspond to the opening 1601 formed through the motor housing 1011a of the motor 1011. In an embodiment, a part of the area of the stator 1011b, which corresponds to the opening 1601 of the motor housing 1011a, may face the first portion 1141 of the fourth thermal conductive member 1140, and the other a part thereof may face the conductive terminal structure 1810. A part of heat generated inside the motor 1011 may be moved to the first portion 1141 by thermal conduction or convection heat transfer. The second portion 1142 may be disposed in the motor housing 1011a of the motor 1011, and may receive heat from the motor housing 1011a by thermal conduction. The third portion 1143 may be disposed in the gear structure housing 1012a of the gear structure 1012, and thus there may be thermal conduction between the gear structure housing 1012a and the third portion 1143. There may be thermal conduction between the first portion 1141 and the second portion 1142 and thermal conduction between the second portion 1142 and the third portion 1143. By convection heat transfer, heat may be moved from the fourth thermal conductive member 1140 to air (e.g., internal air of the electronic device 2) around the fourth thermal conductive member 1140. The fourth thermal conductive member 1140 may be a heat sink including multiple heat dissipation fins and may contribute to securing convection heat transfer performance In an embodiment, the fourth thermal conductive member 1140 may be formed of an integral metal structure and may be substantially rigid.

According to various embodiments, a thermal conduction material of a liquid phase or a paste form may be placed between the first portion 1141 of the fourth thermal conductive member 1140 and the stator 1011b of the motor 1011, so that heat transfer performance thereof is improved.

According to an embodiment, a flexible member (hereinafter, referred to as "a first flexible thermal conduction member") 2001 of the thermal conduction material may be placed between the second portion 1142 of the fourth thermal conductive member 1140 and the motor housing 1011a of the motor 1011. For example, the first flexible thermal conduction member 2001 may include a TIM sheet. In case that the second portion 1142 is coupled to the motor housing 1011a, the first flexible thermal conduction member 2001 may be resiliently positioned between the second portion 1142 and the motor housing 1011a. The first flexible thermal conduction member 2001, which is resiliently positioned between the second portion 1142 and the motor housing 1011a, may contribute to securing heat transfer performance between the second portion 1142 and the motor housing 1011a. The first flexible thermal conduction member 2001 may contribute to securing the area (e.g., the boundary surface for heat transfer between the first flexible thermal conduction member 2001 and the second portion 1142) in which the first flexible thermal conduction member 2001 and the second portion 1142 are in physical contact with each other. The first flexible thermal conduction member 2001 may contribute to securing the area (e.g., the boundary surface for heat transfer between the first flexible thermal conduction member 2001 and the motor housing 1011a) in which the first flexible thermal conduction member 2001 and the motor housing 1011a are in physical contact with each other.

According to an embodiment, the second portion 1142 of the fourth thermal conductive member 1140 may be coupled to the motor housing 1011a of the motor 1011 by welding. In various embodiments, the second portion 1142 may be coupled to the motor housing 1011a by screw fastening. In various embodiments, a thermal conduction material of a liquid phase or a paste form may be placed between the second portion 1142 and the motor housing 1011a in place of the first flexible thermal conduction member 2001. The thermal conduction material of a liquid phase or a paste form may reduce an air gap between the second portion 1142 and the motor housing 1011a, and thus may contribute to securing heat transfer performance.

According to various embodiments, an adhesive material may be placed between the second portion 1142 of the fourth thermal conductive member 1140 and the motor housing 1011a of the motor 1011 in place of the first flexible thermal conduction member 2001. The second portion 1142 may be coupled to the motor housing 1011a using an adhesive material. For example, the adhesive material may be an adhesive of a liquid form, which can reduce an air gap or an air bubble in case of the second portion 1142 and the motor housing 1011a are coupled. For another example, the adhesive material may be an adhesive sheet. The adhesive material may include a thermal conduction material capable of ensuring heat transfer performance between the second portion 1142 and the motor housing 1011a.

According to various embodiments, a second flexible thermal conduction member (not shown) may be positioned between the third portion 1143 of the fourth thermal conductive member 1140 and the gear structure housing 1012a of the gear structure 1012. For example, the second flexible thermal conduction member may include a TIM sheet. In case that the third portion 1143 is coupled to the gear structure housing 1012a, the second flexible thermal conduction member may be resiliently positioned between the third portion 1143 and the gear structure housing 1012a. The second flexible thermal conduction member, which is resiliently positioned between the third portion 1143 and the gear structure housing 1012a, may contribute to securing heat transfer performance between the third portion 1143 and the gear structure housing 1012a. The second flexible thermal conduction member may contribute to securing the area (e.g., the boundary surface for heat transfer between the second flexible thermal conduction member and the third portion 1143) in which the second flexible thermal conduction member and the third portion 1143 are in physical contact with each other. The second flexible thermal conduction member may contribute to securing the area (e.g., the boundary surface for heat transfer between the second flexible thermal conduction member and the gear structure housing 1012a) in which the second flexible thermal conduction member and the gear structure housing 1012a are in physical contact with each other. In an embodiment, the first flexible thermal conduction member 2001 and the second flexible thermal conduction member may be connected to each other, and there may be thermal conduction between the first flexible thermal conduction member 2001 and the second flexible thermal conduction member. In an embodiment, the first flexible thermal conduction member 2001 and the second flexible thermal conduction member may be formed as an integral flexible thermal conduction member. In various embodiments, the first flexible thermal conduction member 2001 and the second flexible thermal conduction member may include materials different from each other.

According to an embodiment, the third portion 1143 of the fourth thermal conductive member 1140 may be coupled to the gear structure housing 1012a of the gear structure 1012 by welding. In various embodiments, the third portion 1143 may be coupled to the gear structure housing 1012a by screw fastening. In various embodiments, a thermal conduction material of a liquid phase or a paste form may be placed between the third portion 1143 and the gear structure housing 1012a in place of the second flexible thermal conduction member. The thermal conduction material of a liquid phase or a paste form may reduce an air gap between the third portion 1143 and the gear structure housing 1012a, and thus may contribute to securing heat transfer performance.

According to various embodiments, an adhesive material may be placed between the third portion 1143 of the fourth thermal conductive member 1140 and the gear structure housing 1012a of the gear structure 1012 in place of the second flexible thermal conduction member. The third portion 1143 may be coupled to the gear structure housing 1012a using the adhesive material. For example, the adhesive material may be an adhesive of a liquid form, which can reduce an air gap or an air bubble in case of the third portion 1143 and the gear structure housing 1012a are coupled. For another example, the adhesive material may be an adhesive sheet. The adhesive material may include a thermal conduction material capable of ensuring heat transfer performance between the third portion 1143 and the gear structure housing 1012a.

According to various embodiments, heat may be moved from the motor 1011 to the gear structure 1012 via the connection member 1080. A fourth portion 1144 of the fourth thermal conductive member 1140, which is between the second portion 1142 and third portion 1143, may face the connection member 1080. There may be thermal conduction between the connection member 1080 and the fourth portion 1144 of the fourth thermal conductive member 1140. In various embodiments, a thermal conduction material of a liquid phase or a paste form may be placed between the connection member 1080 and the fourth portion 1144 of the fourth thermal conductive member 1140, and thus may contribute to securing heat transfer performance According to an embodiment, in the state change (e.g., the switching between the closed state in FIG. 2 and the open state in FIG. 4) of the electronic device 2, the fourth thermal conductive member 1140 may be formed so as not to interfere with elements (e.g., the first housing 21, the first support member 721, or at least one element positioned in first housing 21 or first support member 721) therearound. For example, reference numeral "2002" in FIG. 20 may indicate a portion of the fourth thermal conductive member 1140, which is positioned closest to the first plate 211 (see FIG. 6 or FIG. 7) of the first housing 21, and at least one heat dissipation fin included therein may be formed shorter than a heat dissipation fin of other portions and thus may not interfere with the first plate 211 in a state change of the electronic device 2.

According to an embodiment, the fourth thermal conductive member 1140 may reduce vibration or noise which may occur in the electronic device 2 due to an operation of the sliding drive device 1000 (see FIG. 12).

According to an embodiment, the third thermal conductive member 1130 may include a first portion 1131 and a second portion 1132. For example, the first portion 1131 may be positioned between the motor housing 1011a of the motor 1011 and the third support part ⓒ of the second support member 722, and thus heat may be moved from the motor housing 1011a to the third support part ⓒ via the third thermal conductive member 1130 and then dispersed or diffused to the second support member 722. The second portion 1132 may be positioned between the gear structure housing 1012a of the gear structure 1012 and the third support part ⓒ of the second support member 722, and thus heat may be moved from the gear structure housing 1012a to the third support part ⓒ via the third thermal conductive member 1130 and then dispersed or diffused to the second support member 722. There may be thermal conduction between the first portion 1131 and the second portion 1132. A third portion (not shown) of the third thermal conductive member 1130, which is between the first portion 1131 and the second portion 1132, may face the connection member 1080. There may be thermal conduction between the connection member 1080 and the third portion. In an embodiment, a thermal conduction material of a liquid phase or a paste form may be interposed between the motor housing 1011a and the first portion 1131, between the gear structure housing 1012a and the second portion 1132, and/or between the connection member 1080 and the third portion, and thus may contribute to securing heat transfer performance.

According to an embodiment, the third thermal conductive member 1130 may have flexibility or elasticity. The third thermal conductive member 1130 may be resiliently positioned between the motor assembly 1010 and the third support part of the second support member 722. The third thermal conductive member 1130, which is resiliently positioned between the motor assembly 1010 and the third support part 0, may reduce the occurrence of an air gap between the motor assembly 1010 and the third thermal conductive member 1130, and thus may contribute to securing the area (e.g., the boundary surface for heat transfer between two media) in which the motor assembly 1010 and the third thermal conductive member 1130 are in physical contact with each other. The third thermal conductive member 1130, which is resiliently positioned between the motor assembly 1010 and the third support part ⓒ, may reduce the occurrence of an air gap between the third support part ⓒ and the third thermal conductive member 1130, and thus may contribute to securing the area (e.g., the boundary surface for heat transfer between two media) in which the third support part ⓒ and the third thermal conductive member 1130 are in physical contact with each other.

According to an embodiment, the third thermal conductive member 1130 may be disposed in the third support part ⓒ of the second support member 722 using an adhesive material. For example, the adhesive material may be a liquid form material or a paste form material capable of reducing the occurrence of an air gap or an air bubble in case that the third thermal conductive member 1130 is disposed in the third support part ⓒ. For another example, the adhesive material may be an adhesive sheet. The adhesive material may include a thermal conduction material capable of ensuring heat transfer performance between the third thermal conductive member 1130 and the third support part ⓒ. In various embodiments, the third thermal conductive member 1130 may be disposed in the third support part @using various other methods such as screw fastening.

According to various embodiments, the third thermal conductive member 1130 may be disposed in the motor assembly 1010 using an adhesive material. For example, the adhesive material may be a liquid form material or a paste form material capable of reducing the occurrence of an air gap or an air bubble in case that the third thermal conductive member 1130 is disposed in the motor assembly 1010. For another example, the adhesive material may be an adhesive sheet. The adhesive material may include a thermal conduction material capable of ensuring heat transfer performance between the third thermal conductive member 1130 and the motor assembly 1010. In various embodiments, the third thermal conductive member 1130 may be disposed in the motor assembly 1010 using various other methods such as screw fastening.

According to an embodiment, the third thermal conductive member 130 may reduce vibration or noise which may occur due to the operation of the sliding drive device 1000 (see FIG. 12) in the electronic device 2. The third thermal conductive member 1130 may include a material capable of reducing vibration or noise while securing heat transfer performance between the motor assembly 1010 and the third support part ⓒ of the second support member 722.

According to an embodiment, the third support part ⓒ of the second support member 722 may be a partitioning wall (e.g., a partition or a partition wall) between the battery 615 and the motor assembly 1010. For example, the third support part ⓒ may divide a first mounting area and a second mounting area of the fourth support area 7204 of the second support member 722, wherein the battery 615 is positioned in the first mounting area, and the motor assembly 1010 is positioned in the second mounting area. The third support part ⓒ may have a form having a height protruding with respect to the fourth support area 7204, between the first mounting area and the second mounting area.

Figure 21:
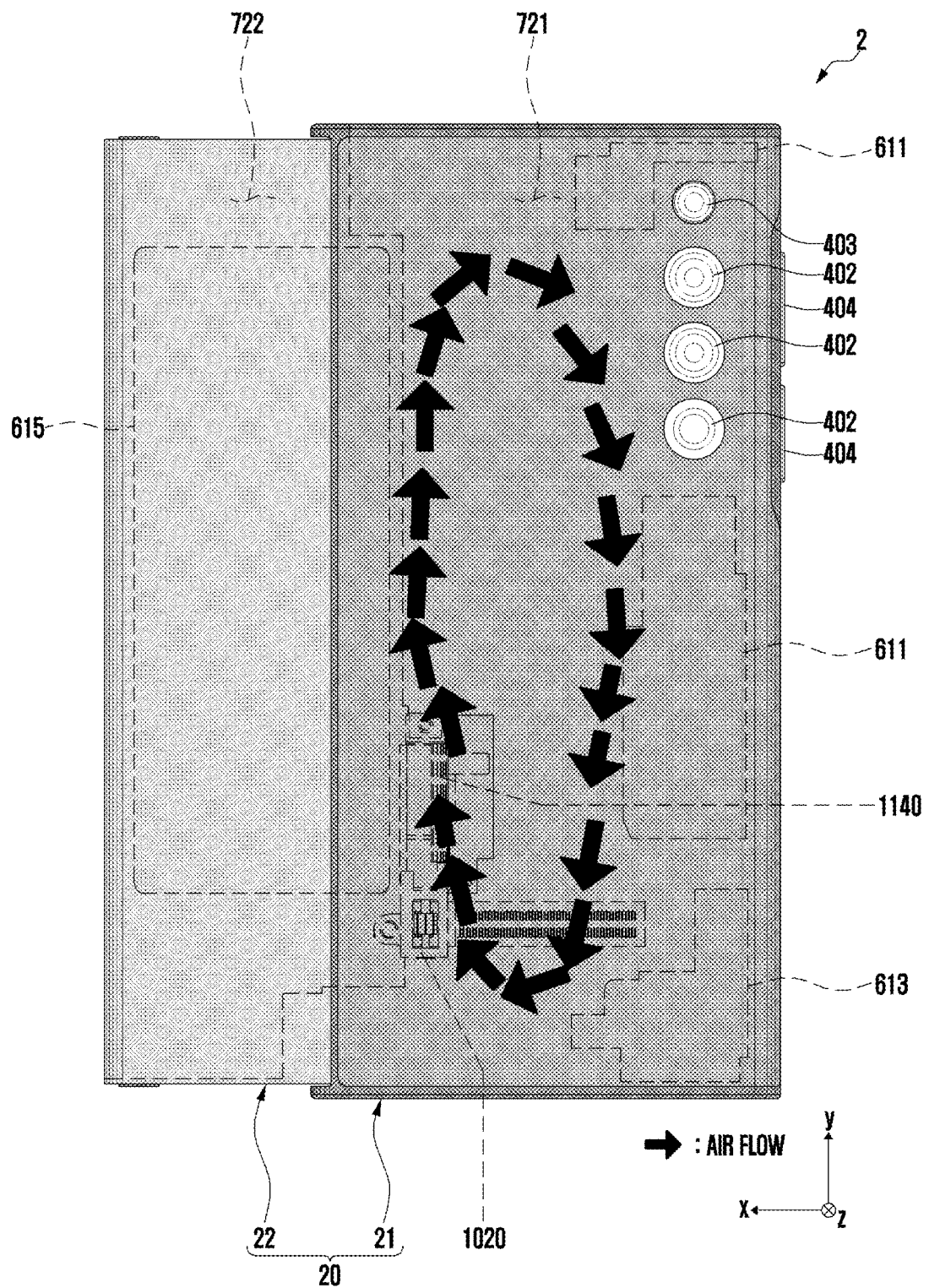
FIG. 21 is a diagram illustrating an air flow in an inner space of an electronic device based on the electronic device being switched from a closed state to an open state according to various embodiments.
Figure 22:
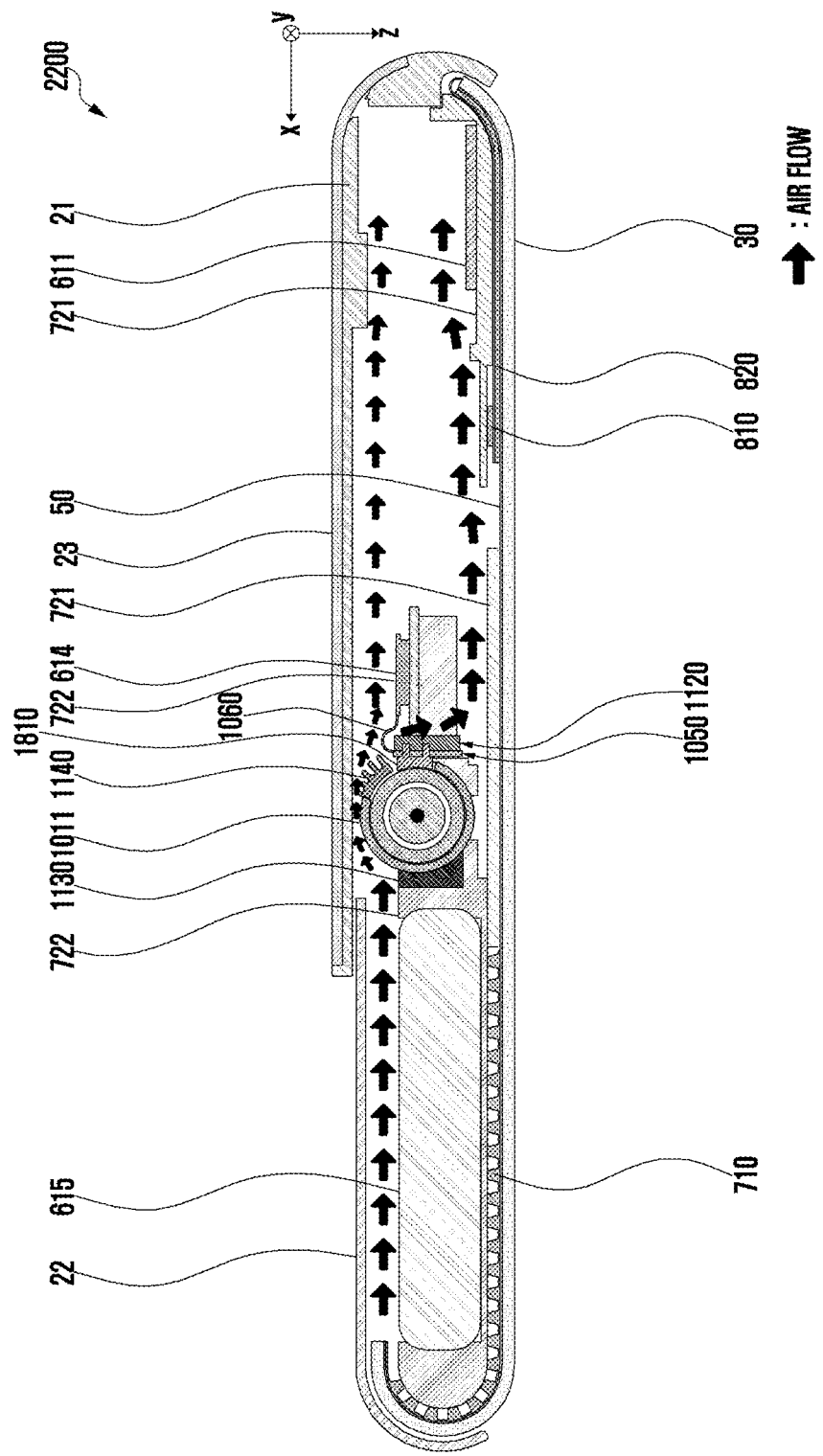
FIG. 22 is a cross-sectional view of an electronic device showing an air flow in an inner space of the electronic device based on the electronic device being switched from a closed state to an open state according to various embodiments.

FIG. 21 is a diagram illustrating example air flow in an inner space of an electronic device 2 in case that the electronic device 2 is switched from a closed state (see FIG. 2) to an open state (see FIG. 4) according to various embodiments. FIG. 22 is a cross-sectional view 2200 of an electronic device 2 illustrating example air flow in an inner space of the electronic device 2 in case that the electronic device 2 is switched from a closed state to an open state according to various embodiments.

Referring to FIGS. 21 and 22, in case that the electronic device 2 is switched from a closed state to an open state, a second structure including the second housing 22, the second support member 722, and elements positioned in the second housing 22 or the second support member 722 may be moved in position relative to a first structure including the first housing 21, the first support member 721, and elements positioned in the first housing 21 or the first support member 721. The position movement of the second structure relative to the first structure may cause a pressure difference between the inside of the electronic device 2 and the outside of the electronic device 2 and thus may cause outside air to enter the inner space of the electronic device 2 and then flow, as a forced convection phenomenon using a fan. Heat generated from the motor assembly 1010 may be dispersed or diffused in the inner space of the electronic device 2 by the air flow. Even in case that the electronic device 2 is switched from an open state to a closed state, an air flow may occur in the inner space of the electronic device 2, and thus heat generated from the motor assembly 1010 may be dispersed or diffused in the inner space of the electronic device 2 by the air flow. The air flow may contribute to convection heat transfer performance of the fourth thermal conductive member 1140 including multiple heat dissipation fins. The position or the shape of the fourth thermal conductive member 1140, or the shape of multiple heat dissipation fins included in the fourth thermal conductive member 1140 may be implemented to secure convection heat transfer performance, in consideration of the air flow.

Figure 23:
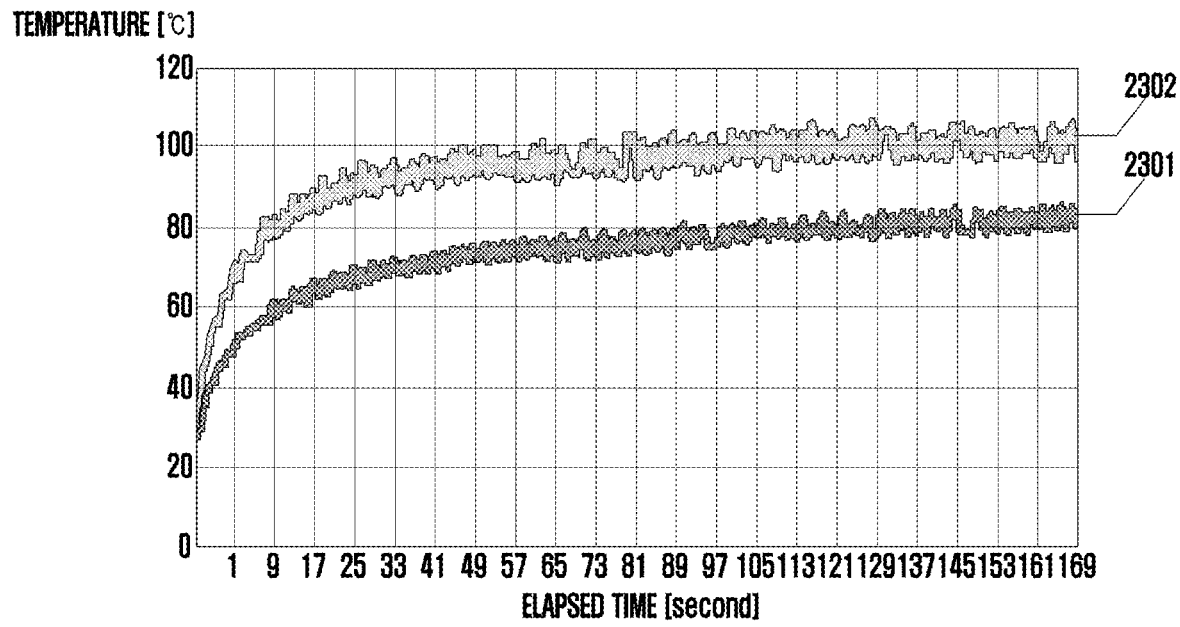
FIG. 23 is a graph showing a temperature measured inside a motor based on the motor being driven in an electronic device, and a temperature measured inside a motor based on the motor being driven in an electronic device according to a comparative example.
Figure 24:
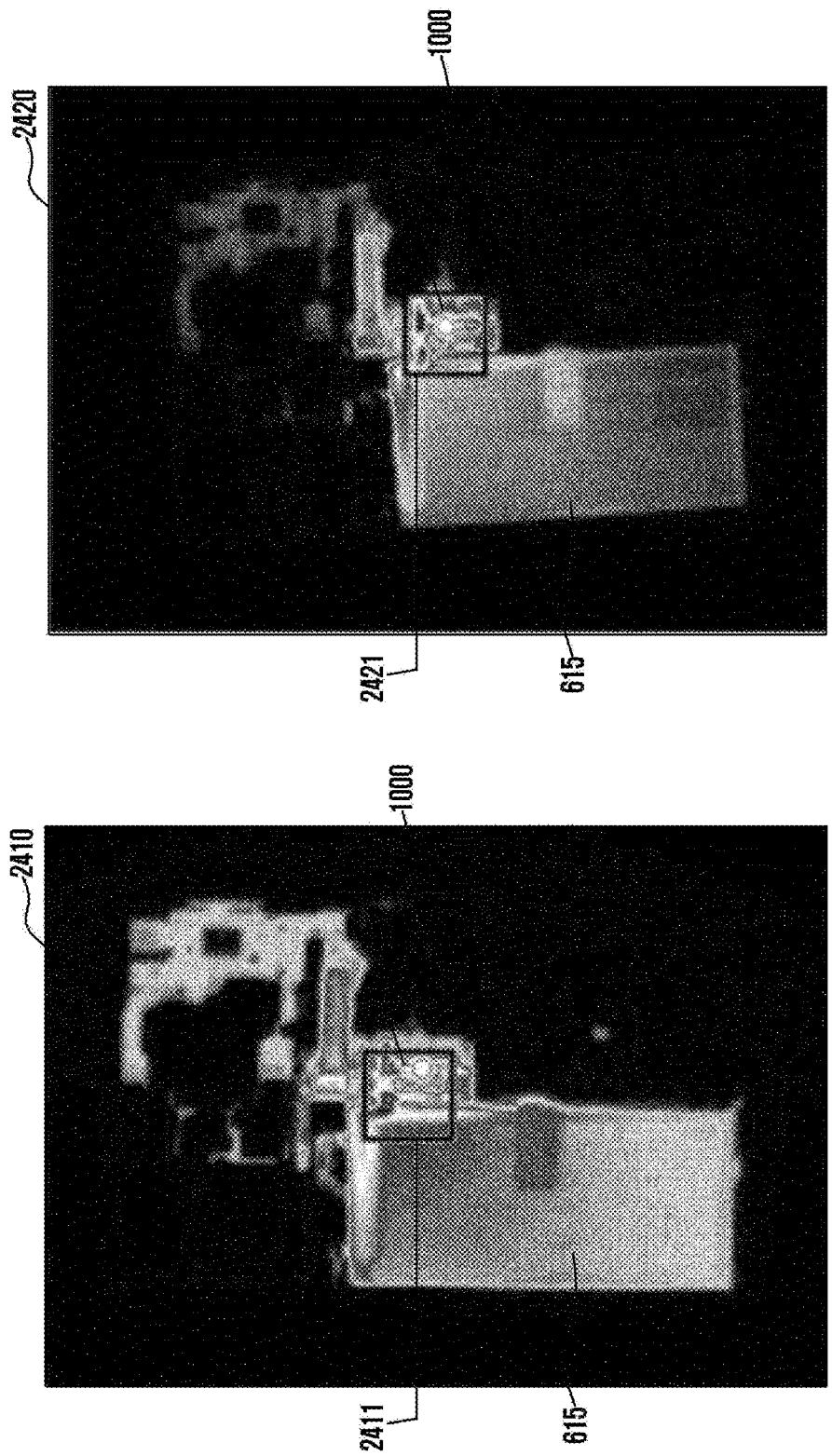
FIG. 24 is a heat map based on a motor being driven in an electronic device, and a heat map based on a motor is driven in an electronic device according to a comparative example.

For example, FIG. 23 is a graph showing a temperature (see reference numeral "2301") measured inside a motor 1011 in case that the motor 1011 is driven in an electronic device 2 according to an embodiment, and a temperature (see reference numeral "2302") measured inside a motor 1011 in case that the motor 1011 is driven in an electronic device according to a comparative example. For example, FIG. 24 is a heat map (see reference numeral "2410") in case that a motor 1011 is driven in an electronic device 2 according to an embodiment, and a heat map (see reference numeral "2420") in case that a motor 1011 is driven in an electronic device according to a comparative example. For example, FIG. 25 is a heat map (see reference numeral "2510") showing a surface temperature (e.g., the surface temperature of the motor housing 1011a in FIG. 12) of a motor 1011 in case that the motor 1011 is driven in an electronic device 2 according to an embodiment, and a heat map (see reference numeral "2510") showing a surface temperature of a motor 1011 in case that the motor 1011 is driven in an electronic device according to a comparative example.

An electronic device according to a comparative example may not include the first thermal conductive member 1110, the second thermal conductive member 1120, the third thermal conductive member 1130, and the fourth thermal conductive member 1140, compared to the electronic device 2 according to an embodiment. The electronic device according to the comparative example is merely presented for comparison with an embodiment of the disclosure, and should be interpreted as having no priority status to the disclosure.

The electronic device 2 according to an embodiment may disperse or diffuse heat generated inside the motor 1011 so as to prevent and/or reduce same from being concentrated in the motor 1011, using the first thermal conductive member 1110, the second thermal conductive member 1120, the third thermal conductive member 1130, and the fourth thermal conductive member 1140, and thus may prevent and/or reduce overheating of the motor 1011 to reduce performance degradation or damage of the motor 1011, compared to the electronic device according to the comparative example. Referring to FIG. 23, the electronic device 2 according to an embodiment may reduce the temperature of the motor 1011 by about 21 degrees, compared to the electronic device according to the comparative example. The electronic device 2 according to an embodiment may lower the saturation temperature (e.g., the temperature at which the heating value and the emission value are substantially the same) of the coil included in the motor 1011 to reduce performance degradation or damage of the motor 1011, compared to the electronic device according to the comparative example. Referring to the portions of the sliding drive device 1000, which are indicated by reference numerals "2411" and "2421" in FIG. 24, the electronic device 2 according to an embodiment may be configured such that heat is not concentrated in the motor 1011, and thus may have improved heat dissipation performance, compared to the electronic device according to the comparative example.

Figure 25:
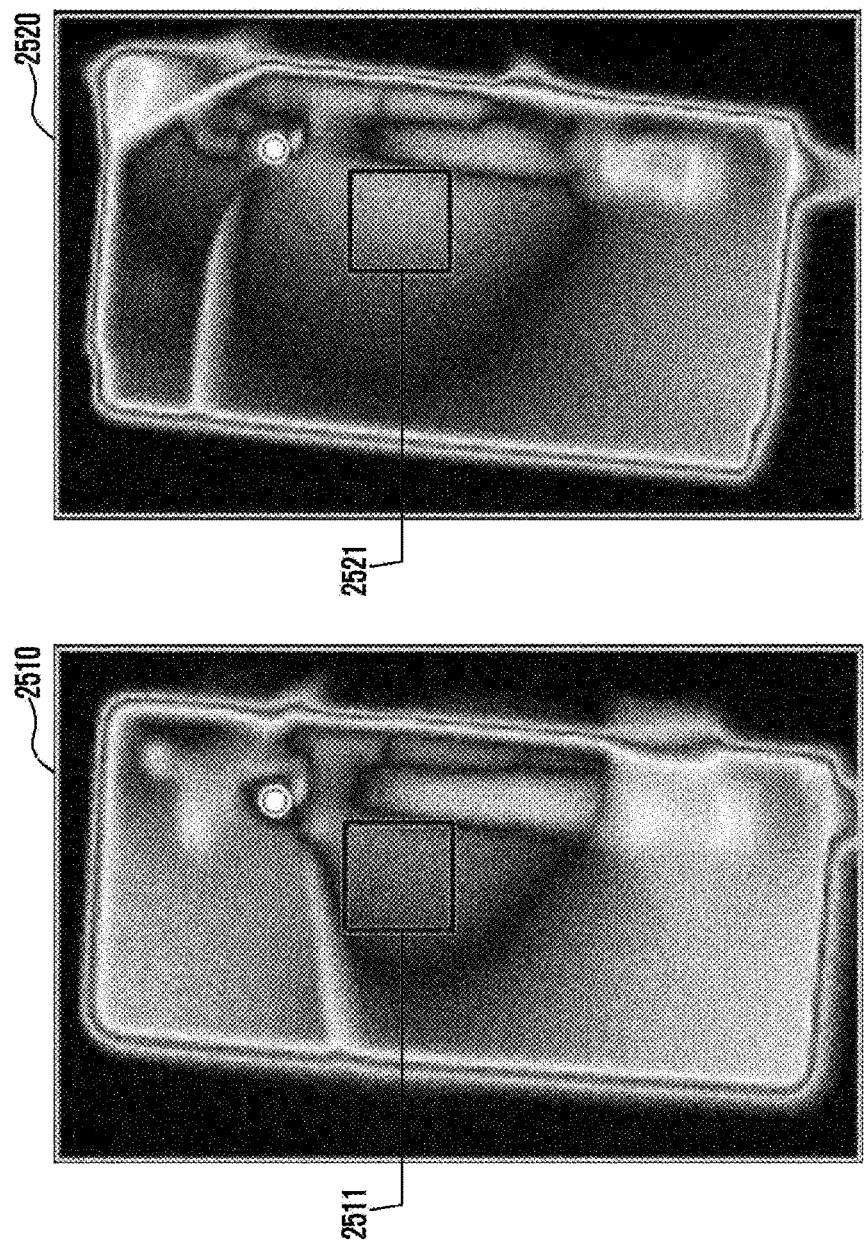
FIG. 25 is a heat map showing a surface temperature of a motor based on the motor being driven in an electronic device, and a heat map showing a surface temperature of a motor based on the motor being driven in an electronic device according to a comparative example.

Referring to FIG. 25, the electronic device 2 according to an embodiment may disperse or diffuse heat generated inside the motor 1011 so as to prevent and/or reduce same from being concentrated in the motor 1011, using the first thermal conductive member 1110, the second thermal conductive member 1120, the third thermal conductive member 1130, and the fourth thermal conductive member 1140, and thus may lower the surface temperature of the motor 1011, compared to the electronic device according to the comparative example. In case of the temperatures measured at the portions of the surface of the motor 1011, which are indicated by the reference numerals "2511" and "2521", the electronic device 2 according to an embodiment has a temperature of about 37.2 degrees ° C., and the electronic device according to the comparative example has a temperature of about 42.8 degrees.

The electronic device 2 according to an embodiment may reduce vibration or noise which may occur in the electronic device 2 due to the sliding motion of the sliding drive device 1000 (see FIG. 12), due to the first thermal conductive member 1110, the second thermal conductive member 1120, the third thermal conductive member 1130, and/or the fourth thermal conductive member 1140, compared to the electronic device according to the comparative example. For example, in a sliding motion of the sliding drive device 1000, in case of the electronic device according to the comparative example, a noise of about 55 dB has been generated, and in case of the electronic device 2 according to an embodiment, noise of about 52 dB,Πch is reduced compared with the electronic device of the comparative example, has been generated.

According to an example embodiment of the disclosure, an electronic device (e.g., the electronic device 2 in FIG. 2) may include: a first housing (e.g., the first housing 21 in FIG. 6), and a second housing (e.g., the second housing 22 in FIG. 6) slidable relative to the first housing. The electronic device may include a first support (e.g., the first support member 721 in FIG. 6) positioned in the first housing. The electronic device may include a second support (e.g., the second support member 722 in FIG. 6) positioned in the second housing. The electronic device may include a flexible display (e.g., the flexible display 30 in FIG. 6). The flexible display may include a first area (e.g., the first area ① in FIG. 6) and a second area (e.g., the second area ② in FIG. 6). The first area may be disposed in the first support and may be visible to the outside of the electronic device. The second area may be configured to extend from the first area. The second area may be configured to, during sliding thereof, be withdrawn from an inner space of the electronic device or inserted into the inner space of the electronic device while being supported by the second support. The electronic device may include a motor assembly (e.g., the motor assembly 1010 in FIG. 10) including a motor connected to the second support member using a bracket (e.g., the bracket 1020 in FIG. 10) disposed on the second support. The motor assembly may be configured to provide a drive force for the sliding. The electronic device may include a first thermal conductive member (e.g., the first thermal conductive member 1110 in FIG. 10) including a conductive material disposed on the first support. Based on the second area being inserted in the inner space of the electronic device, the bracket may be configured to be in contact with the first thermal conductive member.

According to an example embodiment of the disclosure, the first support (e.g., the first support member 721 in FIG. 13) may include a first surface (e.g., the first surface 1201 in FIG. 13) on which the first thermal conductive member (e.g., the first thermal conductive member 1110 in FIG. 13) is disposed. The bracket (e.g., the bracket 1020 in FIG. 13) may include a second surface (e.g., the second surface 1202 in FIG. 13) facing the first surface. A spaced distance between the first surface and the second surface may be changed based on the sliding. based on the second area being inserted in the inner space of the electronic device, the second surface may be configured to be in contact with the first thermal conductive member.

According to an example embodiment of the disclosure, the bracket (e.g., the bracket 1020 in FIG. 13) may be configured to be contacted by the first thermal conductive member (e.g., the first thermal conductive member 1110 in FIG. 13) disposed on the first support (e.g., the first support member 721 in FIG. 13) to limit sliding of the second support (e.g., the second support member 722 in FIG. 13) relative to the first support.

According to an example embodiment of the disclosure, the first thermal conductive member (e.g., the first thermal conductive member 1110 in FIG. 10) may include a flexible material.

According to an example embodiment of the disclosure, the electronic device may further include a circular gear (e.g., the circular gear 1030 in FIG. 12) connected to a rotation shaft (e.g., the second rotation shaft 1013 in FIG. 12) of the motor assembly (e.g., the motor assembly 1010 in FIG. 12). The electronic device may further include a linear gear (e.g., the linear gear 1040 in FIG. 12). The linear gear may be disposed on the first support (e.g., the first support member 721 in FIG. 10) and be engaged with the circular gear. Rotational motion of the circular gear may be converted into linear motion of the linear gear so that sliding of the second housing (e.g., the second housing 22 in FIG. 6) occurs.

According to an example embodiment of the disclosure, the motor assembly (e.g., the motor assembly 1010 in FIG. 12) may include a motor (e.g., the motor 1011 in FIG. 12), and a gear structure (e.g., the gear structure 1012 in FIG. 12) configured to connect the motor and the rotation shaft (e.g., the second rotation shaft 1013 in FIG. 12).

According to an example embodiment of the disclosure, the rotation shaft (e.g., the second rotation shaft 1013 in FIG. 12) of the motor assembly (e.g., the motor assembly 1010 in FIG. 12) may be rotatably supported by the bracket (e.g., the bracket 102 in FIG. 12).

According to an example embodiment of the disclosure, the electronic device may further include a second thermal conductive member including a thermally conductive material (e.g., the second thermal conductive member 1120 in FIG. 10) positioned between the motor assembly (e.g., the motor assembly 1010 in FIG. 10) and the second support (e.g., the second support member 722 in FIG. 10). The motor assembly may include a motor housing (e.g., the motor housing 1011a in FIG. 12), and a stator (e.g., the stator 1011b in FIG. 18) and a rotor (e.g., the rotor 1011c in FIG. 18) positioned in an inner space of the motor housing. The second thermal conductive member may be positioned to correspond to an opening (e.g., the opening 1601 in FIG. 16) formed through the motor housing.

According to an example embodiment of the disclosure, the electronic device may further include a conductive terminal (e.g., the conductive terminal structure 1810 in FIG. 18). The conductive terminal may be positioned in the opening (e.g., the opening 1601 in FIG. 16) of the motor housing (e.g., the motor housing 1011a in FIG. 16) to face the stator (e.g., the stator 1011b in FIG. 18) and electrically connected to the stator. The electronic device may further include a printed circuit board (e.g., the fifth printed circuit board 1050 in FIG. 16). The printed circuit board may be positioned between the conductive terminal and the second thermal conductive (e.g., the second thermal conductive member 1120 in FIG. 16). The printed circuit board may include multiple openings through which multiple inserts (e.g., the multiple inserts 1811 in FIG. 18) included in the conductive terminal are positioned. The printed circuit board may be electrically connected to a conductive terminal. The multiple inserts may be inserted in multiple recesses formed on the second thermal conductive member.

According to an example embodiment of the disclosure, the second thermal conductive member (e.g., the second thermal conductive member 1120 in FIG. 16) may include a flexible material.

According to an example embodiment of the disclosure, the electronic device may further include a third thermal conductive member including a thermally conductive material (e.g., the third thermal conductive member 1130 in FIG. 10) positioned between the motor assembly (e.g., the motor assembly 1010 in FIG. 10) and the second support (e.g., the second support member 722 in FIG. 10).

According to an example embodiment of the disclosure, the electronic device may further include a circular gear (e.g., the circular gear 1030 in FIG. 12) connected further include a linear gear (e.g., the linear gear 1040 in FIG. 12). The linear gear may be disposed on the first support (e.g., the first support member 721 in FIG. 10) and be engaged with the circular gear. The motor assembly may include a motor (e.g., the motor 1011 in FIG. 12), and a gear structure including a gear (e.g., the gear structure 1012 in FIG. 12) configured to connect the motor and the rotation shaft. The third thermal conductive member may include a first portion (e.g., the first portion 1131 in FIG. 19) positioned between the motor and the second support (e.g., the second support member 722 in FIG. 19). The third thermal conductive member may include a second portion (e.g., the second portion 1132 in FIG. 18) configured to extend from the first portion and positioned between the gear and the second support.

According to an example embodiment of the disclosure, the second support (e.g., the second support member 722 in FIG. 10) may include a first mounting area in which a battery (e.g., the battery 615 in FIG. 6) is positioned. The second support may include a second mounting area in which the motor assembly (e.g., the motor assembly 1010 in FIG. 10) is positioned. The second support may include a support part (e.g., the third support part ⓒ in FIG. 10) configured to divide the first mounting area and the second mounting area. Third thermal conductive member may be positioned between the support part and the motor assembly.

According to an example embodiment of the disclosure, the electronic device may further include a fourth thermal conductive member including a thermally conductive material (e.g., the fourth thermal conductive member 1140 in FIG. 10). The fourth thermal conductive member may be positioned in the motor assembly (e.g., the motor assembly 1010 in FIG. 10). The fourth thermal conductive member may include multiple heat dissipation fins. The motor assembly may include a motor housing (e.g., the motor housing 1011a in FIG. 12), and a stator (e.g., the stator 1011b in FIG. 18) and a rotor (e.g., the rotor 1011c in FIG. 18) positioned in an inner space of the motor housing. The fourth thermal conductive member may include a first portion (e.g., the first portion 1141 in FIG. 19) and a second portion (e.g., the second portion 1142 in FIG. 20). The first portion may be positioned to correspond to an opening (e.g., the opening 1601 in FIG. 16) formed through the motor housing to face the stator. The second portion may be disposed in the motor housing.

According to an example embodiment of the disclosure, the electronic device may further include a circular gear (e.g., the circular gear 1030 in FIG. 12) connected further include a linear gear (e.g., the linear gear 1040 in FIG. 12). The linear gear may be disposed on the first support (e.g., the first support member 721 in FIG. 10) and be engaged with the circular gear. The motor assembly may include a gear structure including a gear (e.g., the gear structure 1012 in FIG. 12) configured to connect the motor (e.g., the motor 1011 in FIG. 12) and the rotation shaft. The fourth thermal conductive member (e.g., the fourth thermal conductive member 1140 in FIG. 16) may further include a third portion (e.g., the third portion 1143 in FIG. 16) disposed in the gear structure.

According to an example embodiment of the disclosure, an electronic device (e.g., the electronic device 2 in FIG. 2) may include: a first housing (e.g., the first housing 21 in FIG. 6), and a second housing (e.g., the second housing 22 in FIG. 6) slidable relative to the first housing. The electronic device may include a first support (e.g., the first support member 721 in FIG. 6) positioned in the first housing. The electronic device may include a second support (e.g., the second support member 722 in FIG. 6) positioned in the second housing. The electronic device may include a flexible display (e.g., the flexible display 30 in FIG. 6). The flexible display may include a first area (e.g., the first area ① in FIG. 6) and a second area (e.g., the second area ② in FIG. 6). The first area may be disposed in the first support member and may be visible to the outside of the electronic device. The second area may be configured to extend from the first area. The second area may be configured to, during sliding, be withdrawn from an inner space of the electronic device or inserted into the inner space of the electronic device while being supported by the second support. The electronic device may include a motor assembly including a motor (e.g., the motor assembly 1010 in FIG. 10) connected to the second support using a bracket (e.g., the bracket 1020 in FIG. 10) disposed on the second support. The motor assembly may be configured to provide a drive force for the sliding. The electronic device may include a first thermal conductive member including a thermally conductive material (e.g., the first thermal conductive member 1110 in FIG. 10) disposed on the bracket. Based on the second area being inserted in the inner space of the electronic device, the first support may be configured to be in contact with the first thermal conductive member.

According to an example embodiment of the disclosure, the electronic device 35 may further include a circular gear (e.g., the circular gear 1030 in FIG. 12) connected further include a linear gear (e.g., the linear gear 1040 in FIG. 12). The linear gear may be disposed on the first support (e.g., the first support member 7210 in FIG. 10) and be engaged with the circular gear. Rotational motion of the circular gear may be converted into linear motion of the linear gear so that sliding of the second housing (e.g., the second housing 22 in FIG. 6) occurs.

According to an example embodiment of the disclosure, the motor assembly (e.g., the motor assembly 1010 in FIG. 12) may include a motor housing (e.g., the motor housing 1011a in FIG. 12), and a stator (e.g., the stator 1011b in FIG. 18) and a rotor (e.g., the rotor 1011c in FIG. 18) positioned in an inner space of the motor housing. The electronic device may further include a second thermal conductive member including a conductive material (e.g., the second thermal conductive member 1120 in FIG. 10). The second thermal conductive member may be positioned between the motor assembly and the second support (e.g., the second support member 722 in FIG. 10), and may be positioned to correspond to an opening (e.g., the opening 1601 in FIG. 16) formed through the motor housing. The electronic device may further include a conductive terminal (e.g., the conductive terminal structure 1810 in FIG. 18) positioned in the opening of the motor housing facing the stator. The conductive terminal may be electrically connected to the stator. The electronic device may further include a printed circuit board (e.g., the fifth printed circuit board 1050 in FIG. 16) positioned between the conductive terminal and the second thermal conductive member. The printed circuit board may include multiple openings through which multiple inserts (e.g., the multiple inserts 1811 in FIG. 18) included in the conductive terminal are positioned. The printed circuit board may be electrically connected to a conductive terminal. The multiple inserts may be inserted in multiple recesses formed on the second thermal conductive member.

According to an example embodiment of the disclosure, the electronic device may further include a third thermal conductive member including a thermally conductive material (e.g., the third thermal conductive member 1130 in FIG. 10) positioned between the motor assembly (e.g., the motor assembly 1010 in FIG. 10) and the second support (e.g., the second support member 722 in FIG. 10). The electronic device may further include a circular gear (e.g., the circular gear 1030 in FIG. 12) connected to the rotation shaft (e.g., the second rotation shaft 1013 in FIG. 12) of the motor assembly. The electronic device may further include a linear gear (e.g., the linear gear 1040 in FIG. 12). The linear gear may be disposed on the first support (e.g., the first support member 721 in FIG. 10) and be engaged with the circular gear. The motor assembly may include a motor (e.g., the motor 1011 in FIG. 12), and a gear structure including a gear (e.g., the gear structure 1012 in FIG. 12) configured to connect the motor and the rotation shaft. The third thermal conductive member may include a first portion (e.g., the first portion 1131 in FIG. 19) and a second portion (e.g., the second portion 1132 in FIG. 18). The first portion may be positioned between the motor and the second support. The second portion may be configured to extend from the first portion and may be positioned between the gear structure and the second support.

According to an example embodiment of the disclosure, the electronic device may further include a fourth thermal conductive member including a thermally conductive material (e.g., the fourth thermal conductive member 1140 in FIG. 10). The fourth thermal conductive member may be positioned in the motor assembly (e.g., the motor assembly 1010 in FIG. 10). The fourth thermal conductive member may include multiple heat dissipation fins. The motor assembly may include a motor housing (e.g., the motor housing 1011a in FIG. 12), and a stator (e.g., the stator 1011b in FIG. 18) and a rotor (e.g., the rotor 1011c in FIG. 18) positioned in an inner space of the motor housing. The fourth thermal conductive member may include a first portion (e.g., the first portion 1141 in FIG. 19) and a second portion (e.g., the second portion 1142 in FIG. 20). The first portion may be positioned to correspond to an opening (e.g., the opening 1601 in FIG. 16) formed through the motor housing to face the stator. The second portion may be disposed in the motor housing.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing and a second housing slidable relative to the first housing;
a first support positioned in the first housing;
a second support positioned in the second housing;
a flexible display comprising a first area disposed on the first support and visible to the outside of the electronic device, and a second area configured to extend from the first area and, during sliding of the second housing, be withdrawn from or inserted into an inner space of the electronic device while being supported by the second support;
a motor assembly including a motor connected to the second support through a bracket disposed on the second support and configured to provide a drive force for sliding of the second housing; and
a first thermal conductive member including a thermally conductive material disposed on the first support,
wherein based on the second area being inserted in the inner space of the electronic device, the bracket is in contact with the first thermal conductive member.

2. The electronic device of claim 1, wherein the first support comprises a first surface on which the first thermal conductive member is disposed,
wherein the bracket comprises a second surface facing the first surface,
wherein a spaced distance between the first surface and the second surface is changed based on sliding of the second housing, and
wherein based on the second area being inserted in the inner space of the electronic device, the second surface is in contact with the first thermal conductive member.

3. The electronic device of claim 1, wherein the bracket is configured to be contacted by the first thermal conductive member disposed on the first support to limit sliding of the second support relative to the first support.

4. The electronic device of claim 1, wherein the first thermal conductive member comprises a flexible material.

5. The electronic device of claim 1, further comprising:
a circular gear connected to a rotation shaft of the motor assembly; and
a linear gear disposed on the first support and engaged with the circular gear,
wherein rotational motion of the circular gear is configured to be converted into linear motion of the linear gear so that sliding of the second housing occurs.

6. The electronic device of claim 5, wherein the motor assembly comprises a motor and a gear structure including a gear configured to connect the motor and the rotation shaft.

7. The electronic device of claim 1, wherein a rotation shaft of the motor assembly is rotatably supported by the bracket.

8. The electronic device of claim 1, further comprising a second thermal conductive member including a thermally conductive material positioned between the motor assembly and the second support,
wherein the motor assembly comprises a motor housing, a stator and a rotor positioned in an inner space of the motor housing, and
wherein the second thermal conductive member is positioned to correspond to an opening formed through the motor housing.

9. The electronic device of claim 8, further comprising:
a conductive terminal positioned in the opening of the motor housing to face the stator and electrically connected to the stator; and
a printed circuit board positioned between the conductive terminal structure and the second thermal conductive member, comprising multiple openings through which multiple inserts included in the conductive terminal are positioned, and is electrically connected to the conductive terminal,
wherein the multiple inserts are inserted in multiple recesses formed on the second thermal conductive member.

10. The electronic device of claim 1, wherein the second thermal conductive member comprises a flexible material.

11. The electronic device of claim 1, further comprising a third thermal conductive member including a thermally conductive material positioned between the motor assembly and the second support.

12. The electronic device of claim 11, further comprising:
a circular gear connected to a rotation shaft of the motor assembly; and
a linear gear disposed on the first support and engaged with the circular gear,
wherein the motor assembly comprises a motor and a gear structure including a gear configured to connect the motor and the rotation shaft, and
wherein the third thermal conductive member comprises a first portion positioned between the motor and the second support, and a second portion configured to extend from the first portion and positioned between the gear structure and the second support.

13. The electronic device of claim 11, wherein the second support comprises a first mounting area in which a battery is positioned, a second mounting area in which the motor assembly is positioned, and a support part configured to divide the first mounting area and the second mounting area, and
wherein the third thermal conductive member is positioned between the support part and the motor assembly.

14. The electronic device of claim 1, further comprising a fourth thermal conductive member positioned in the motor assembly and comprising multiple heat dissipation fins,
wherein the motor assembly comprises a motor housing, a stator and a rotor positioned in an inner space of the motor housing, and
wherein the fourth thermal conductive member comprises:
a first portion positioned to correspond to an opening formed through the motor housing to face the stator; and
a second portion disposed in the motor housing.

15. The electronic device of claim 14, further comprising:
a circular gear connected to a rotation shaft of the motor assembly; and
a linear gear disposed on the first support and engaged with the circular gear,
wherein the motor assembly comprises a gear structure including a gear configured to connect the motor and the rotation shaft, and wherein the fourth thermal conductive member further comprises a third portion disposed in the gear structure.

16. An electronic device comprising:
a first housing and a second housing slidable relative to the first housing;
a first support positioned in the first housing;
a second support positioned in the second housing;
a flexible display comprising a first area disposed on the first support and visible to the outside of the electronic device, and a second area configured to extend from the first area and, during sliding of the second housing, be withdrawn from or inserted into an inner space of the electronic device while being supported by the second support;
a motor assembly including a motor connected to the second support through a bracket disposed on the second support and configured to provide a drive force for sliding of the second housing; and
a first thermal conductive member including a thermally conductive material disposed on the bracket,
wherein based on the second area being inserted in the inner space of the electronic device, the first support is in contact with the first thermal conductive member.

17. The electronic device of claim 16, further comprising:
a circular gear connected to a rotation shaft of the motor assembly; and
a linear gear disposed on the first support and engaged with the circular gear,
wherein rotational motion of the circular gear is configured to be converted into linear motion of the linear gear so that sliding of the second housing occurs.

18. The electronic device of claim 16, wherein the motor assembly comprises a motor housing, a stator and a rotor positioned in an inner space of the motor housing, and
wherein the electronic device further comprises:
a second thermal conductive member including a thermally conductive material positioned between the motor assembly and the second support and positioned to correspond to an opening formed through the motor housing;
a conductive terminal positioned in the opening of the motor housing to face the stator and electrically connected to the stator; and
a printed circuit board positioned between the conductive terminal and the second thermal conductive member, comprising multiple openings through which multiple inserts included in the conductive terminal are positioned, and is electrically connected to the conductive terminal, and
wherein the multiple inserts are inserted in multiple recesses formed on the second thermal conductive member.

19. The electronic device of claim 16, further comprising:
a third thermal conductive member including a thermally conductive material positioned between the motor assembly and the second support;
a circular gear connected to a rotation shaft of the motor assembly; and
a linear gear disposed on the first support and engaged with the circular gear,
wherein the motor assembly comprises a motor and a gear structure including a gear configured to connect the motor and the rotation shaft, and
wherein the third thermal conductive member comprises a first portion positioned between the motor and the second support, and a second portion configured to extend from the first portion and positioned between the gear structure and the second support.

20. The electronic device of claim 16, further comprising a fourth thermal conductive member positioned in the motor assembly and comprising multiple heat dissipation fins,
wherein the motor assembly comprises a motor housing, a stator and a rotor positioned in an inner space of the motor housing, and
wherein the fourth thermal conductive member comprises:
a first portion positioned to correspond to an opening formed through the motor housing to face the stator; and
a second portion disposed in the motor housing.

* * * * *